(12) United States Patent
Steven et al.

(10) Patent No.: US 10,303,448 B2
(45) Date of Patent: May 28, 2019

(54) SYSTEMS AND METHODS FOR GRAPH-BASED ANALYSIS OF SOFTWARE

(71) Applicant: Synopsys, Inc., Mountain View, CA (US)

(72) Inventors: John Steven, Boston, MA (US); Chris Schmidt, Boston, MA (US); Jordan Tyler Thayer, North Billerica, MA (US)

(73) Assignee: Synopsys, Inc., Moutain View, CA (US)

( * ) Notice: Subject to any disclaimer, the term of this patent is extended or adjusted under 35 U.S.C. 154(b) by 0 days.

(21) Appl. No.: 15/595,683

(22) Filed: May 15, 2017

(65) Prior Publication Data
US 2017/0329582 A1 Nov. 16, 2017

Related U.S. Application Data

(60) Provisional application No. 62/336,735, filed on May 15, 2016.

(51) Int. Cl.
*G06F 8/20* (2018.01)
*G06F 8/34* (2018.01)
*G06F 8/36* (2018.01)
*G06F 8/41* (2018.01)
*G06F 11/36* (2006.01)
*G06F 17/30* (2006.01)

(52) U.S. Cl.
CPC ............ *G06F 8/43* (2013.01); *G06F 8/24* (2013.01); *G06F 8/34* (2013.01); *G06F 8/36* (2013.01); *G06F 8/41* (2013.01); *G06F 8/42* (2013.01); *G06F 11/3608* (2013.01); *G06F 17/30864* (2013.01)

(58) Field of Classification Search
CPC ..... G06F 8/24; G06F 8/34; G06F 8/36; G06F 8/41; G06F 8/42; G06F 8/43; G06F 11/3608; G06F 17/30864
USPC ................ 717/104, 105, 124–135; 707/769; 714/37, 38.1
See application file for complete search history.

(56) References Cited

U.S. PATENT DOCUMENTS

| | | | |
|---|---|---|---|
| 6,553,563 | B2 | 4/2003 | Ambrose et al. |
| 6,604,110 | B1 * | 8/2003 | Savage ............. G06F 17/30563 707/602 |
| 6,732,095 | B1 | 5/2004 | Warshaysky et al. |

(Continued)

OTHER PUBLICATIONS

International Search Report and Written Opinion of the International Searching Authority for International Application No. PCT/US2017/032713, dated Jul. 21, 2017, 18 pages.

(Continued)

*Primary Examiner* — Qing Chen
(74) *Attorney, Agent, or Firm* — Sterne, Kessler, Goldstein & Fox, P.L.L.C.

(57) ABSTRACT

Disclosed herein are methods, systems, and computer program products directed to a guidance engine. The guidance engine is configured to query a knowledge base for guidance with respect to a property of a software application. The guidance engine receives a responsive query from the knowledge base that is based on the property. The responsive query informs a user of the guidance engine how to address a vulnerability within the software application by performing a transform with respect to a property of the software application.

20 Claims, 41 Drawing Sheets

(56) References Cited

U.S. PATENT DOCUMENTS

| | | | |
|---|---|---|---|
| 7,448,022 B1 | 11/2008 | Ram et al. | |
| 2005/0050046 A1* | 3/2005 | Puz | G06F 17/30427 |
| 2005/0234755 A1 | 10/2005 | Baggett, Jr. et al. | |
| 2006/0225052 A1 | 10/2006 | Waddington et al. | |
| 2007/0250825 A1* | 10/2007 | Hicks | G06F 8/443 |
| | | | 717/151 |
| 2009/0327809 A1 | 12/2009 | Joy et al. | |
| 2014/0067781 A1 | 3/2014 | Wolchok et al. | |
| 2014/0095535 A1 | 4/2014 | Deshmukh et al. | |
| 2015/0026158 A1* | 1/2015 | Jin | G06F 17/30958 |
| | | | 707/722 |

OTHER PUBLICATIONS

Gemino et al., "Complexity and clarity in conceptual modeling: comparison of mandatory and optional properties," Data & Knowledge Engineering, Dec. 2005, Retrieved from <https://pdfs.semanticscholar.org/4cfb/14097adcce867ddeb37920096af2e03c5c55.pdf>, entire document, 30 pages.

"Worker," definition from *Wiktionary, the free dictionary*, http://en.wiktionary.org/wiki/worker, 3 pages, updated Sep. 26, 2012, retrieved Oct. 1, 2012.

* cited by examiner

FIG. 4

```
// Java Source Program using SpringMVC framework                    — 400 public class sql1 extends SequentialLessonAdapter
{
    private String accountName;                                      — 405

@RequestMapping(value = "/database", method = "get")             — 410
    protected Element injectableQuery(WebSession s) {                — 415
        ...;
        Connection connection = DatabaseUtilities.getConnection(s);
        accountName = s.getParser().getRawParameter(ACCT_NAME, "Your Name");
        String query = "SELECT * FROM user_data WHERE last_name = '" + accountName + "'";
        Statement statement = connection.createStatement(...);
        ResultSet results = statement.executeQuery(query);
    }
}
```

```
// Discovery query for SpringMVC routes:                             — 420

PERFORM
    _model.routes[N1][92].callbacks = [ $(
        <( @RequestMapping(value = $1, method
        = $2)
    )>
    $)
```

```
// resulting model:                                                  — 435

_model.routes["/database"]["get"].callbacks
    = [ injectableQuery ];
```

```
// Java Source Program
protected Element injectableQuery(WebSession s) {
520    ...;
       Connection connection = DatabaseUtilities.getConnection(s);

accountName = s.getParser().getRawParameter(ACCT_NAME, "Your
525    Name");

String query = "SELECT * FROM user_data WHERE last_name = '" +
       accountName + "'";

Statement statement = connection.createStatement(...);

ResultSet results = statement.executeQuery(query);
}
```

- 500 (figure label)
- 530, 535, 540, 545 (callouts)

```
// query 1
PERFORM $z.tainted = true
WHEN <( $z = getStringParameter() OR
getRawParameter() )>;

// query 2
MATCH <( $o.$f($1) )>
WHERE
    $o instanceof java.sql.Statement AND
    $f.ast.name.match(/execute.*/) AND
    $1.tainted == true
REWRITE
    $1 <= API.sanitize($1)
```

| | | |
|---|---|---|
| <query> | ::= | <syntax matching block> |
| | | <flow statement> |
| | | <semantics predicate> |
| | | <side-effect predicate> |
| | | <module statement> |
| <syntax matching block> | ::= | ( { <source syntax> } WHERE <semantics predicate> |
| | | MATCH <syntax matching block> |
| <source syntax> | ::= | <source program> | <source program> <syntax operator> <source syntax> |
| <syntax operator> | ::= | OR | FIRST | LAST | NEXT |
| <flow statement> | ::= | <syntax matching block> <flow operator> <syntax matching block> |
| | | <syntax matching block> <flow operator> <flow statement> |
| <flow operator> | ::= | -> | -AP-> | MISSING | FIRST | LAST |
| <semantics predicate> | ::= | <expression> <semantics operator> <semantics predicate> |
| <semantics operator> | ::= | AND | OR | >= | > | ... |
| <side-effect predicate> | ::= | PERFORM <statement> WHEN <syntax matching block> |
| | | PERFORM <statement> WHEN <syntax matching block> REWRITE statement |
| <module statement> | ::= | LET <id> = <statement> |
| | | DEFINE <id> { <statement> } |
| | | IMPORT <literal> |
| ... | : | ... (e.g. JavaScript syntax) |

FIG. 8

Source program:

```
public static boolean isEqual(byte[] a, byte[] b) {
    if (a.length != b.length) {
        return false;
    }
    for (int i = 0; i < a.length; i++) {
        if (a[i] != b[i])
            return false;
    }
}
```
↙ 1050

Query:

◁
```
function _(byte[] $a, byte[] $b) {
    for () {
        if ($1)
            return _;
    }
}
```
▷
```
WHERE
$1 USE $a AND
$1 USE $b
```
↙ 1055

FIG. 10

| MVC Noun | Description |
|---|---|
| <Framework> | Description of Behavior or Structural Patterns used by the application |
| <Model> | Set of classes that describes the data you're working with as well as the business rules that define how the data can be changed or manipulated |
| <View> | Set of classes which defines how the application's UI will be displayed |
| <Controller> | Set of classes that handles communication from the user, overall application flow, and application specific logic |
| <Action> | Controller method that is responsible for handling a specific user interaction |
| <Dispatcher> | Map requests to handlers |
| <Config> | Set of files, attributes and annotations that define the application attack surface and flow of data between components |
| <Request> | Object responsible for passing information from the User to the application or website |
| <Response> | Object responsible for passing information for the application of website to the User |
| <Route> | Mapping between incoming Request URL parameters and Controller actions as well as physical files on disk for non-MVC Frameworks |
| <Connection> | Current network connection of the app |
| <Session> | Current connection session |
| <Interceptor> | A class that is called implicitly before or after an action is performed |

FIG. 13

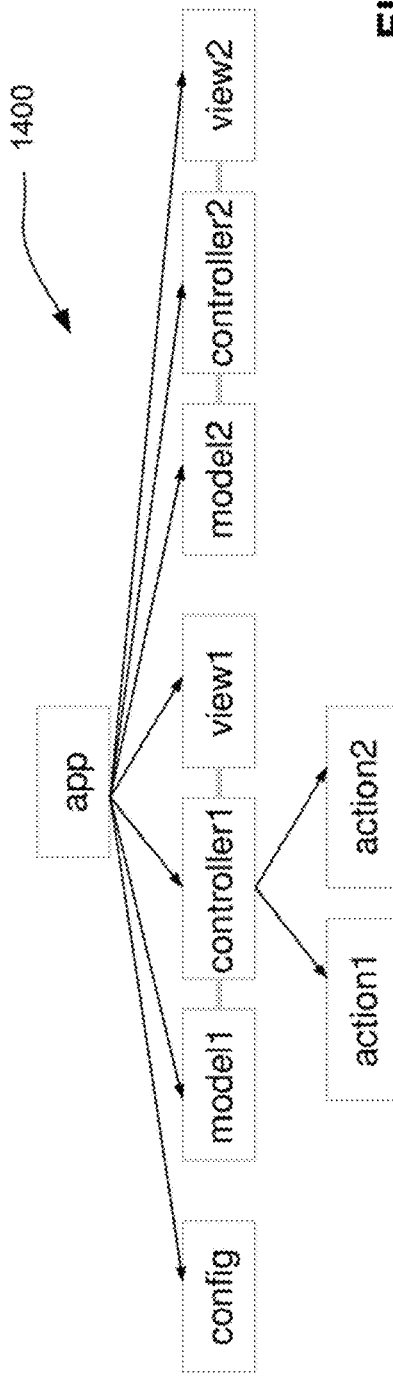

```
function login(req, res) {
  res.render('users/login', { title: 'Login' });
};

// route implementation for URI "/signup"
function signup(req, res, next) {
  var userName = req.body.userName;
  var password = req.body.password;
  var USER_RE = /^[1,20]$/;
  if (!USER_RE.test(userName)) {
    return res.render("signup", errors);
  }
  ...
  var info = userName + "," + password;
  return res.redirect("/users/register"+info);
}
```
↑ 1705

→ 1. "login" has two arguments "req" and "res"
2. "res" has a member function "render" of type
   String × Object
   ⟹ "login" is a route function → 1. "signup" has three arguments "req", "res" and "next"
2. "req" has a field "body"
3. "res" has a member function "render" of argument type
   String × Object
4. "res" has a member function "redirect" of argument type
   String
   ⟹ "signup" is a route function

```
function test(req, res, next) {
  if (res) {
    return res.x + res.y;
  }
  var info = req.body;
  return next("/users/register"+info);
}
```
↑ 1710

→ 1. "test" has three arguments "req", "res" and "next"
2. "req" has field "body"
3. "res" has no member function
   ⟹ it is unlikely that "test" is a route function

```
// use the "Express" framework
const express = require('express');
// use the "Express Session" middleware
const session = require('express-session');
// other middlewares
const http = require('http');
const path = require('path');
...
const app = express();
// configuration
var b = false;
app.use(session({
    cookie: {
        httpOnly: b,
        secure: true
    }
}));
...
// user routes
app.get('/login', login);
app.get('/logout', logout);
app.post('/users/signup', signup);
app.get('/users/updatetax', updatetax);
...
```
1800

```
configuration model:

session {
    cookie: {
        httpOnly: false,
        secure: true
    }
};
```
1805

```
route model:

route 1:
'/login' -> HTTP GET ->
function login(req, res) {
    res.render('users/login', { title: 'Login'});
};

route 2:
'/users/updatetax' -> HTTP GET ->
updatetax = function(req, res, next) {
    var preTax = eval(req.body.tax);
    var afterTax = eval(v1.afterTax);
    return res.render("contributions", preTax+afterTax);
}
...
```
1810

FIG. 18A

| Category | Area | Subject | Responsibility | MFG |
|---|---|---|---|---|
| SR-1: SR-1 - Identity and Access Management | 1 Identity | 1 Principal Identity | 1 | |
| | | 2 User Provisioning | 1 | |
| | | 3 Subject to Principal Mapping | 1 | |
| | | 4 Delegation | 1 | |
| | | 5 Impersonation | 1 | |
| | 2 SR-1.2 - Authentication | 1 SR-1.2.1 - Credential | 1 SR-1.2.1.1 - Secure Storage | 1 |
| | | | 2 Credential Strength Policy | 1 |
| | | 2 Username/Password Workflow | 1 Rigid Login Workflow | 1 |
| | | | 2 Rigid Forgot Password Workflow | 1 |
| | | | 3 Rigid Logout Workflow | 1 |
| | | | 4 Rigid Change Password Workflow | 1 |
| | | 3 Tokens | 1 | |
| | | 4 Multi-Factors | 1 | |
| | | 5 Reset | 1 | |
| | | 6 Mechanism/Protocol | 1 Secure Authentication Protocol | 1 |
| | 3 Authorization | 1 Role-Based Access Control | 1 | |
| | | 2 Policy Metadata | 1 | |
| | | 3 Policy Decision Point | 1 | |
| | | 4 Policy Enforcement Point | 1 Secure Configuration | |
| | | 5 Upstream Providers | 1 | |
| | | 6 Fail Closed | 1 | |
| | | 7 Principal of Least Privilege | 1 | |
| | | 8 Separation of Duties | 1 | |
| | | 9 Reauthentication | 1 | |
| SR-2 | SR-2 - Auditing | 1 SR-2.1 - Logging | 1 SR-2.1.1 - Security-Specific Logging | 1 SR-2.1.1.1 - Dedicated Security Event Target | 3 |
| | | | 2 Data Masking | 1 Sensitive data is masked in log messages | 3 |
| | | | 3 Message Detail | 1 Minimum default level | 1 |
| | | | | 2 Runtime level configuration | 3 |
| | | | | 3 Per-Context level configuration | 9 |
| | | 2 Monitoring | 1 Alerting | 1 Automatic notification of events | 2 |
| | | | 2 Incident Escalation | 1 Escalation policy implementation | 3 |
| | | 3 Responding | 1 Functionality Reduction | 1 | |
| | | | 2 Denial-of-Service | 1 | |
| | | | 3 Behavioral/Fraud Based Access Restrictions | 1 | |
| SR-3 | Contract Enforcement | 1 API Abuse | 1 Protocol Abuse | | |
| | | | 2 Request Forgery | 1 Repudiation | |
| | | 2 Appropriate Use | 1 Anti-Probing/Discovery | | |
| | | | 2 Proper Authorization | | |
| | | 3 Load Distribution | 1 Balancing load across resources | | |
| | | | 2 Rate-Limiting | | |
| SR-4 | Data Validation | 1 Canonicalization | 1 Character-Set Coverage | | |
| | | | 2 Multiple Character Encodings | | |
| | | | 3 Mixed Character Encodings | | |
| | | 2 Sanitization | 1 Black/White List | 1 Use whitelist validation first | |
| | | | 2 Reduction | | |
| | | | 3 Masking | | |
| | | | 4 Tokenization | | |
| | | 3 Encoding | 1 Character Set Coverage | | |
| | | 4 Remediation | 1 Escaping | | |
| | | | 2 Truncation | | |
| | | | 3 Substitution | | |
| | | | 4 Decoration | | |
| | | 5 Strong Typing | 1 | | |

FIG. 18C

| Category | | Area | | Subject | | Responsibility | | MFG |
|---|---|---|---|---|---|---|---|---|
| SR-5 | Application Flow | 1 | Error Handling | 1 | | | | |
| | | 2 | Invariants | 1 | | | | |
| | | 3 | Asynchronous Operations | 1 | Synchronization | 1 | Thread Safety | |
| | | 4 | Termination | 1 | | | | |
| | | 5 | Watchdog/Re-entrance | 1 | | | | |
| SR-6 | Language Concerns | 1 | Language Quirks | 1 | | | | |
| | | 2 | Zeroization | 1 | | | | |
| | | 3 | Cross-Language Semantics | 1 | | | | |
| SR-7 | Dynamic Inclusion | 1 | Provenance of Code | 1 | | | | |
| | | 2 | Visibility | 1 | Accessibility/Mutability | | | |
| | | | | 2 | Introspection | | | |
| | | | | 3 | Reflection | | | |
| | | 3 | Sandboxing | 1 | Isolation | | | |
| | | | | 2 | Namespace Management | | | |
| | | 4 | Import Restrictions | 1 | | | | |
| | | 5 | Dangerous APIs | 1 | | | | |
| | | 6 | Authenticated Redirect/Forward | 1 | | | | |
| SR-8 | State Management | 1 | Generation | 1 | Predictability | 1 | State-Token generated using CSPRNG | 1 |
| | | | | 2 | Re-generation | 1 | State-Token rotated upon session authentication | 1 |
| | | 2 | Validity | 1 | Timeout | 1 | Inactivity Timeout Enforcement | 1 |
| | | | | | | 2 | Hard Timeout Enforcement | 1 |
| | | | | 2 | Duration | | | |
| | | 3 | Scope | 1 | Visibility | 1 | Scope limited to cookie | 1 |
| | | 4 | Invalidation | 1 | Logout | 1 | State invalidated upon Logout | 1 |
| | | 5 | Persistence | 1 | | | | |
| SR-9 | Platform Security | 1 | Endpoint Authentication | 1 | | | | |
| | | 2 | Protocol Negotiation | 1 | | | | |
| | | 3 | Identity Distribution | 1 | | | | |
| | | 4 | Policy and Enforcement | 1 | | | | |
| SR-10 | Persistence and Object Marshaling | 1 | Type Safety | 1 | | | | |
| | | 2 | Provenance | 1 | | | | |
| | | 3 | Non-Repudiation | 1 | | | | |
| | | 4 | Durability | 1 | | | | |
| | | 5 | Integrity | 1 | | | | |
| | | 6 | Schema Validation | 1 | | | | |

| Application Component | App Types | Functional Responsibility | Security Responsibilities | Security Controls |
|---|---|---|---|---|
| View | All | User Interface, how the user interacts with the application | Access Management | Authorization |
| | | | Data Validation | Output Encoding |
| | | | | Sanitization |
| | | | Language Concerns | Avoiding Language Quirks |
| | | | Dynamic Inclusion | Provenance of Code |
| | | | | Sandboxing |
| | | | | Restrictions on code inclusion |
| Route | Web RPC Service | Code attached to a specific URI. Also can be thought of as the C (Controller) in MVC (Model-View-Controller). Generically a route is described as a block of code that is bound to some mapping of a URI. Historically these URI will be matched using a URI Template (i.e. /resource/{id}) or some type of matching pattern (i.e. /resource/[0-9]+). Routes can also be used to describe the endpoint that an RPC is bound to. | Access Management | Authentication |
| | | | | CSRF Protection |
| | | | Auditing | Logging |
| | | | Ensure Service API Contract | URI Pattern Matching |
| | | | Data Validation | Canonicalization |
| | | | | Sanitization |
| | | | | Strong Typing |
| | | | Handling Errors/Alternative Flow | |
| | | | Data Binding and Indirect Object References | Constrained Auto-Binding |
| | | | | Scope Validation |
| | | | | Precedence of Data |
| | | | | Enforcement of Indirect Object Reference |

FIG. 18F

| Application Component | App Types | Functional Responsibility | Security Responsibilities | Security Controls |
|---|---|---|---|---|
| State Management | All | State Management components are responsible for managing the state of the Application and the Users currently interacting with the Application. | Identity | Principal Management |
| | | | | Delegation/Impersonation |
| | | | Session Management | Generation |
| | | | | Timeout/Duration/Validity |
| | | | | Scope |
| | | | | Invalidation/Logout |
| | | | Trust Boundaries | Trust Boundary Enforcement |
| Repository | All | Repositories refer to a component that interacts with any type of data storage mechanism. The repository itself could interact with a traditional RDBMS, a NoSQL database, cache, or some remote webservice. The Repository is the bridge between the Application and the data storage mechanism that it is interacting with. | | |
| Factory | All | Factories are "builders" in that they take some input and produce a strongly typed object based off of the input. | | |
| Authentication | All | The Authentication component, as insinuated is responsible for authenticating a user to an application. | Identity/Access Management | Subject → Principal Mapping |
| | | | | Credential Storage |
| | | | | Login Workflow |
| | | | | Logout Workflow |
| | | | | Remember Me Workflow |
| | | | | Forgot Password Workflow |
| | | | | Reset/Change Credential |
| | | | | Token Management |
| | | | | Multi-Factor |
| | | | Auditing | Logging |
| | | | | Passive/Active Response |
| | | | Handling Errors | Fail-Open Protection |
| | | | Data Protection | Key Management |
| | | | | Protocol/Algorithm |

FIG. 18G

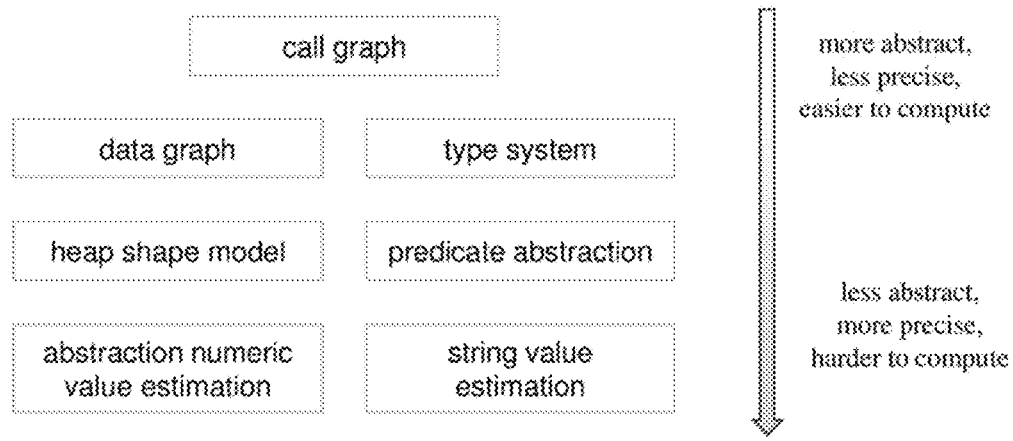

FIG. 19

| Property | Model Type |
|---|---|
| function call relation | call graph |
| injection, dependency | data flow graph |
| variable/object/function type | type system |
| Boolean/numeric/value | abstract numeric value estimation |
| configuration | abstract numeric value estimation |
| string value | string value estimation |
| variable data structure | heap shape analysis |
| Boolean formula on Boolean variable | predicate abstraction |

FIG. 20

```
// use the "Express" framework
const express = require('express');
// use the "Express" framework
const session = require('express-session');
const app = express();

// configuration
var b = true;  // previously: var b = false;
app.use(session({
    cookie: {
        httpOnly: b,
        secure: true
    }
}));

// user routes
app.get('/login', login);
app.get('/logout', logout);
app.post('/users/signup', signup);
app.get('/users/updatetax', updatetax);
```

```
...
// route implementation for URI "/users/updatetax"
function updatetax (req, res, next) {
    // previously: var preTax = eval(req.body.tax);
    var preTax = parseInt(req.body.tax);
    // previously: var afterTax = eval(v1.afterTax);
    var afterTax = parseInt(v1.afterTax);

return res.render("contributions", preTax+afterTax);
}
// route implementation for URI "/logout"
function logout(req, res) {
    ...
};
```

FIG. 26A

SYSTEMS AND METHODS FOR GRAPH-BASED ANALYSIS OF SOFTWARE

CROSS-REFERENCE TO RELATED APPLICATIONS

The present application claims the benefit of U.S. Provisional Application No. 62/336,735, entitled "Systems and Methods for Model-Based Analysis of Software," filed May 15, 2016, which is incorporated herein by reference in its entirety.

The present application incorporates by reference U.S. patent application Ser. No. 15/249,269, entitled "Systems and Methods for Model-Based Analysis of Software"; U.S. patent application Ser. No. 15/249,268, entitled "Systems and Methods for Adaptive Analysis of Software"; U.S. patent application Ser. No. 15/249,284, entitled "Systems and Methods for Analyzing Software Using Queries"; U.S. patent application Ser. No. 15/249,282, entitled "Systems and Methods for Utilizing Semantic Queries to Analyze Software"; and U.S. patent application Ser. No. 15/249,300, entitled "System and Methods for Incremental Analysis of Software," all filed on Aug. 26, 2016. The present application further incorporates by reference U.S. Provisional Application No. 62/335,619, entitled "Systems and Methods for Model-Based Analysis of Software," filed May 12, 2016.

BACKGROUND

Computer software has become an indispensable tool in many aspects of human life. Day-to-day activities (e.g., shopping, banking, signing up for health insurance, etc.) are often conducted via web and mobile applications. Virtually all organizations, both public and private, rely on software applications to process information and manage operations. Many of these software applications handle sensitive information such as personal financial records, trade secrets, classified government information, etc. Safety-critical systems in infrastructure, transportation, medicine, etc. are increasingly being controlled by software.

Every year, trillions of dollars are spent globally to develop and maintain software applications. Yet system failures and data breaches are constantly in the news. Decades of research has failed to produce scalable and accurate solutions for improving reliability and security of software applications.

DESCRIPTION OF DRAWINGS

The accompanying drawings are not necessarily drawn to scale. For clarity, not every component may be labeled in every drawing.

FIG. 4 shows an illustrative source program 400 and an illustrative discovery query 420, in accordance with some embodiments.

FIG. 5 shows an illustrative source program 500 and illustrative property queries 510 and 515, in accordance with some embodiments.

FIG. 8 shows Backus Normal Form (BNF) definitions of some components of an illustrative query language, in accordance with some embodiments.

FIG. 10 shows an illustrative source program 1050 and an illustrative property query 1055, in accordance with some embodiments.

FIG. 13 shows an illustrate set of nouns that may be used in a query language for accessing components in an MVC architecture, in accordance with some embodiments.

FIG. 14 shows an illustrative hierarchy 1400 of MVC components, in accordance with some embodiments.

FIG. 17 illustrates an approach for programming an analysis engine to perform a field and type analysis, in accordance with some embodiments.

FIG. 18A shows an illustrative application 1800 and illustrative component models 1805 and 1810, in accordance with some embodiments.

FIGS. 18C-E show an illustrative taxonomy of security responsibilities, in accordance with some embodiments.

FIG. 18F-G show an illustrative mapping from application components to security responsibilities, in accordance with some embodiments.

FIG. 19 shows a plurality of illustrative types of models that may be used by an analysis engine to check a property of interest, in accordance with some embodiments.

FIG. 20 shows an illustrative mapping from types of properties to types of models, in accordance with some embodiments.

FIG. 26A shows an illustrative application 2600 and an illustrative implementation 2605 of route functions in the application 2600, in accordance with some embodiments

DETAILED DESCRIPTION

Figure 1:
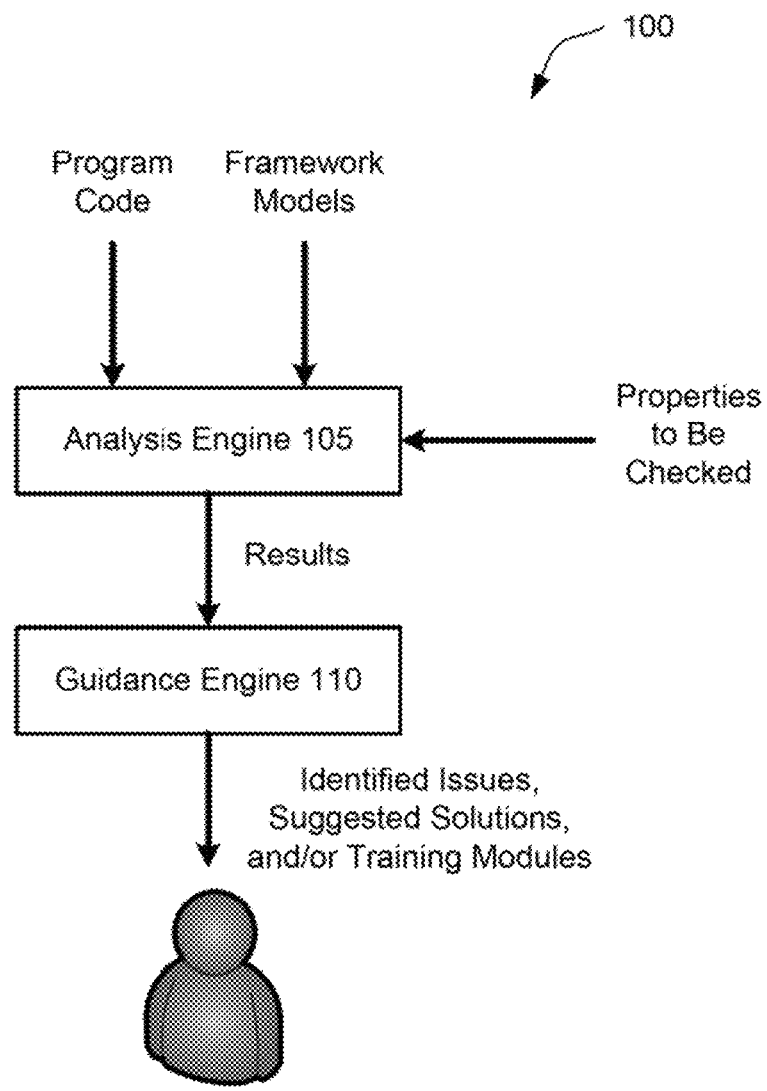
FIG. 1 shows an illustrative system 100 for software verification, in accordance with some embodiments.

The inventors have recognized and appreciated various disadvantages of existing approaches to software verification. For instance, the inventors have recognized and appreciated that some existing approaches focus solely on testing, which happens late in the system development life cycle, when an application or module has already been implemented to a large extent. At that late stage, correcting problems such as security vulnerabilities may involve rewriting not only the portion of code that directly gives rise to an identified problem, but also related portions of code. In some instances, it may be impractical to reverse certain design decisions made during the development stage. As a result, a developer may be forced to adopt a suboptimal solution to an identified problem.

Accordingly, in some embodiments, techniques are provided for detecting potential problems during the development stage, so that an identified problem may be corrected before additional code is written that depends on the problematic code, and a developer may have greater freedom to implement an optimal solution to the identified problem. For instance, a verification tool may be built into an integrated development environment (IDE) and may be programmed to analyze code as the code is being written by a developer. Alternatively, or additionally, a verification tool may be accessed via a web user interface. In either scenario, the verification tool may be able to provide feedback sufficiently quickly (e.g., within minutes or seconds) to allow the developer to make use of the feedback while the developer is still working on the code.

The inventors have recognized and appreciated that some existing approaches of software verification may be unhelpful to software developers. Software development teams are under pressure to deliver products on time and within budget. When a problem is identified through testing, a developer may be given little or no guidance on how to address the problem. As a result, the developer's attempted fix may be ineffective, or may even create new problems. This frustrating process may repeat until the developer stumbles upon a correct solution, often after spending valuable time searching online resources and consulting with peers.

Accordingly, in some embodiments, techniques are provided for integrating training and quality assessment. As an example, a verification tool may be programmed to link an identified problem to one or more targeted training modules. As another example, a verification tool may be programmed to analyze software code to understand a developer's intent and proactively suggest one or more training modules on common problems related to that intent. As yet another example, a verification tool may be programmed to analyze code written by a developer for a particular type of quality issue (e.g., a particular security vulnerability) after the developer views, reads, or otherwise completes a training module on that type of quality issue.

In some embodiments, techniques are provided for presenting verification results to a software developer. The inventors have recognized and appreciated that it may be beneficial to present verification results in a streamlined fashion so that verification may become an integral part of a software developer's work, rather than an interruption. As an example, a verification tool may be programmed to deliver results incrementally, for instance, by first delivering results from easy checks (e.g., syntactic pattern matching), while the system is still performing a deep analysis (e.g., model checking). In this manner, the developer may immediately begin to review and address the results from the easy checks, without having to wait for the deep analysis to be completed.

The inventors have further recognized and appreciated that it may be beneficial to present suggested code transforms in an unobtrusive fashion, so that a software developer may come to view the verification tool as a helpful peer, rather than just an annoying issue-flagging feature. For example, a verification tool may be programmed to analyze software code to understand a developer's intent and provide suggested code modifications based on the identified intent. Additionally, or alternatively, the verification tool may allow the developer to test a piece of suggested code in a sandbox.

In some embodiments, a verification tool may be programmed to select, from a variety of different modes, an appropriate mode for delivering guidance to a software developer. For instance, the verification tool may select from static content (e.g., text, video, etc. retrieved from a content store), dynamically generated content (e.g., content that is customized based on current code context), coding suggestions (e.g., suggested fixes to identified problems, or best practice tips based on identified intent), a suggested version of code to be tested in a sandbox, etc.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the present disclosure are not limited to the use of any particular technique or combination of techniques.

I. Software Verification

Some techniques have been developed to automatically analyze program behavior with respect to properties such as correctness, robustness, safety, and liveness. For instance, static analysis techniques have been developed to analyze program code without executing the code, whereas dynamic analysis techniques have been developed to analyze program code by observing one or more executions of the code. Some software verification tools use a combination of static and dynamic analysis techniques.

Examples of static analysis techniques include, but are not limited to, control flow analysis, data flow analysis, abstract interpretation, type and effect analysis, and model checking. An analysis engine implementing one or more of these techniques may receive as input program code and one or more properties to be checked, and may output one or more results (e.g., indicating a property is violated).

Model checking techniques were developed initially for hardware verification, and have been used to some extent for software verification, albeit with lesser success, as software systems tend to be significantly more complex than hardware systems. To verify a program for compliance with a certain specification, a formal model of the program may be constructed, and the model may be checked against the specification. For instance, a model may be formulated as a finite state machine, and a property may be expressed as a formula in a suitable logic. A state space of the finite state machine may be explored to check whether the property is satisfied.

In some implementations, states in a finite state machine may be explicitly enumerated. Alternatively, or additionally, states may be symbolically enumerated, by encoding sets of states into respective symbolic states. In some implementations, a symbolic execution technique may be used, where an interpreter may simulate how a program executes and maintain program state with symbolic data.

II. Programmable Analysis of Software Applications

Many software applications are complex and difficult to analyze. For instance, an application may include hundreds of modules and millions of lines of code, and may make use of external components (e.g., frameworks, libraries, middleware, etc.) that may or may not be open sourced. The inventors have recognized and appreciated that it may be beneficial to provide techniques for abstracting a software application in a manner that focuses on one or more properties of interest, and that it may also be beneficial to provide techniques for abstracting a framework or library.

The inventors have additionally recognized and appreciated various disadvantages of existing approaches for abstraction. For instance, some approaches are purely syntactic, such as using a utility like grep to search through source code for a match of a regular expression, or rely on simple abstractions such as performing a data flow analysis (e.g., based on bit propagation) to abstract a program, and making Boolean marks on library functions in abstractions. The inventors have recognized and appreciated that these approaches may fail to capture program semantics sufficiently, and hence may incur high inaccuracies (e.g., false positives). Furthermore, behaviors of external components such as frameworks and libraries may be modeled poorly, if at all, and precise semantics of a programming language in which an application is written may not be taken into account.

The inventors have further recognized and appreciated that some software verification tools rely on limited methods for specifying properties to be checked. For instance, specification methods based on XML (Extensible Markup Language) or JSON (JavaScript Object Notation) may be cumbersome to use, and may allow only a limited set of constructs, so that many interesting properties cannot be expressed. Furthermore, these methods may not allow a user to specify a modification to be made to an application, for example, when a certain issue is identified.

The inventors have recognized and appreciated that it may be beneficial to provide improved techniques for abstracting an application and/or external components such as frameworks and libraries, and for specifying properties to be checked and/or modifications to be made to an application to satisfy the properties. In some embodiments, a unified method may be provided to allow a user to program any one or more, or all, of the above aspects of a software analysis engine. For example, a universal query language may be provided to allow a user to: (1) model software components including code written by the user and/or external components such as frameworks and libraries, (2) specify properties to be checked, and/or (3) mutate programs to satisfy properties.

FIG. 1 shows an illustrative system 100 for software verification, in accordance with some embodiments. In this example, the system 100 includes an analysis engine 105 and a guidance engine 110. The analysis engine 105 may receive as input program code of a software application to be analyzed. In some embodiments, the input program code may include source code. Alternatively, or additionally, the input program code may include object code. The analysis engine 105 may further receive as input one or more properties to be checked, and may output one or more results of checking the one or more properties against the program code. The one or more results may include a finding indicating whether a property is satisfied, an identification of one or more portions of the input program code that violate a property, and/or a suggested modification to the program code to satisfy a property. For instance, if the program code does not satisfy a particular property, the analysis engine 105 may be programmed to suggest a modification so that the modified program code will satisfy that property.

In some embodiments, the analysis engine 105 may further receive as input one or more framework models. As one example, the analysis engine 105 may be programmed to select and retrieve (e.g., from a database) one or more previously constructed framework models. The selection may be based on any suitable information about the input program code, such as one or more programming languages in which the input program code is written, and/or one or more external components (e.g., frameworks, libraries, and/or middleware) used by the input program code. As another example, one or more framework models may be selected by a user and retrieved by the analysis engine 105 (e.g., from a database). As yet another example, one or more framework models may be constructed by a user and provided to the analysis engine 105.

In some embodiments, a framework model may include one or more discovery queries written in a query language. The inventors have recognized and appreciated that a deep understanding of a software application, such as an architecture of the application, high-level functionalities of various components in the architecture, and/or intrinsic connections among the components, may facilitate accurate and efficient analysis of the application. Accordingly, in some embodiments, techniques are provided for automatically discovering one or more aspects of a software application. For instance, a discovery query may be applied to the application to discover one or more portions of code corresponding to a component in an architecture, one or more functionalities of the discovered component, and/or how the discovered component interact with one or more other components in the architecture.

In some embodiments, discovery queries may be written by a user in a query language. Alternatively, or additionally, discovery queries for particular external components (e.g., frameworks, libraries, and/or middleware) may be developed in advance and retrieved on demand (e.g., from a database) when input program code is to be evaluated.

In some embodiments, a discovery query may include one or more statements instructing the analysis engine 105 how to look for a portion of code that is relevant for a certain analysis (e.g., looking for security vulnerabilities in general, or one or more specific types of security vulnerabilities). Additionally, or alternatively, a discovery query may instruct the analysis engine 105 what information to extract from the program code and store in a model, once a relevant portion of code has been located. Thus, a discovery query may be an executable program that takes as input the program code to be analyzed and produces as output one or more models.

In some embodiments, the analysis engine 105 may be programmed to interpret discovery queries written in a query language. For instance, the analysis engine 105 may execute one or more discovery queries according to semantics of the query language, which may cause the analysis engine 105 to gather certain information from source code elements of a program to be analyzed. However, that is not required, as in some embodiments discovery queries may be compiled into machine code and then the machine code may be executed.

In some embodiments, the analysis engine 105 may be programmed to apply one or more discovery queries to program code and output a model of the program code that is specific to such discovery queries. The model thus represents only a subset of the program code that is relevant to the discovery queries. The analysis engine 105 may then analyze the model and/or a subset of the program code to determine if a certain property of interest is satisfied. In some embodiments, this analysis of the model and/or the subset of the program code may be performed using property queries written in the same query language that is used for the discovery queries.

With the above approach, particular portions of a large application program that are relevant to one or more issues of interest (e.g., security) may be identified and represented by a model, while irrelevant portions of the application may be ignored. The resulting model may then be evaluated, and/or be used to identify relevant portions of the program code that should be evaluated, using one or more property queries relating to the issue(s) of interest. By employing such a divide-and-conquer approach, a highly complex application may be effectively and efficiently evaluated for one or more specific issues of concern.

The inventors have recognized and appreciated that discovery queries may provide a convenient way to capture knowledge regarding a programming language, framework, library, middleware, etc. For instance, a user who understands semantics of a programming language (or framework, library, middleware, etc.) may write discovery queries that help the analysis engine 105 identify portions of program code that are relevant for a certain analysis that is being performed (which may, although need not, be a security analysis). A model that results from applying a discovery query to program code may be an abstraction of the program code with respect to the analysis that is being performed. In this manner, property checking may be performed more efficiently, because much of the program code may be irrelevant for the analysis that is being performed, and may simply be ignored.

The inventors have further recognized and appreciated that framework models may be managed advantageously as reusable assets. For example, once a discovery query is written by a user for a certain analysis on a program written in a certain programming language (or using a certain framework, library, middleware, etc.), the discovery query may be appropriately indexed and stored. In this manner, when the same user or another user wishes to perform the same analysis on a different program written in the same programming language (or using the same framework, library, middleware, etc.), the previously written discovery query may be retrieved and applied.

Returning to the example shown in FIG. 1, one or more results output by the analysis engine 105 may be consumed by the guidance engine 110. The inventors have recognized and appreciated that it may beneficial to provide customized and actionable guidance to a developer when a problem is identified. Accordingly, in some embodiments, the guidance engine 110 may be programmed to select, based on the one or more results output by the analysis engine 105, an appropriate modality for aiding a user who wrote the input program code. Additionally, or alternatively, the guidance engine 110 may be programmed to select, based on the one or more results, appropriate content from a content store. For instance, if the one or more results includes a finding indicative of a security vulnerability, the guidance engine 110 may present to the user a textual or video message explaining the vulnerability, and/or an in-depth training module. Additionally, or alternatively, if the one or more results includes a suggested modification to the input program code, the guidance engine 110 may present to the user a textual or video message explaining the suggested modification, and/or modified program code ready to be tested in a sandbox.

In some embodiments, the guidance engine 110 may automatically determine and present to a user a suggested technique for solving a problem. For example, the guidance engine 110 may determine a solution based on user preferences, an intended use for a software application, and/or other context information about the software application.

It should be appreciated that the system 100 is shown in FIG. 1 and described above solely for purposes of illustration. A software verification tool embodying one or more of the inventive aspects described herein may be implemented in any of numerous ways. For instance, in some embodiments, one or more of the functionalities described above in connection with the analysis engine 105 may instead be implemented by the guidance engine 110, or vice versa. In some embodiments, a software verification tool may be implemented with a single engine programmed to analyze program code and to render guidance to a developer. In some embodiments, the analysis engine 105 and the guidance engine 110 may be independently implemented, each as a stand-alone tool. Aspects of the present disclosure are not limited to the use of both the analysis engine 105 and the guidance engine 110.

As discussed above, the inventors have recognized and appreciated that a deep understanding of a software application, such as an architecture of the application, high-level functionalities of various components in the architecture, and/or intrinsic connections among the components, may facilitate accurate and efficient analysis of the application. In some embodiments, a software architecture may be represented using a framework model comprising one or more discovery queries. By applying such discovery queries to program code, an application architecture model may be generated that includes models for individual components in the architecture. The application architecture model may then be used to facilitate verification of the program code with respect to one or more properties of interest.

Figure 2:
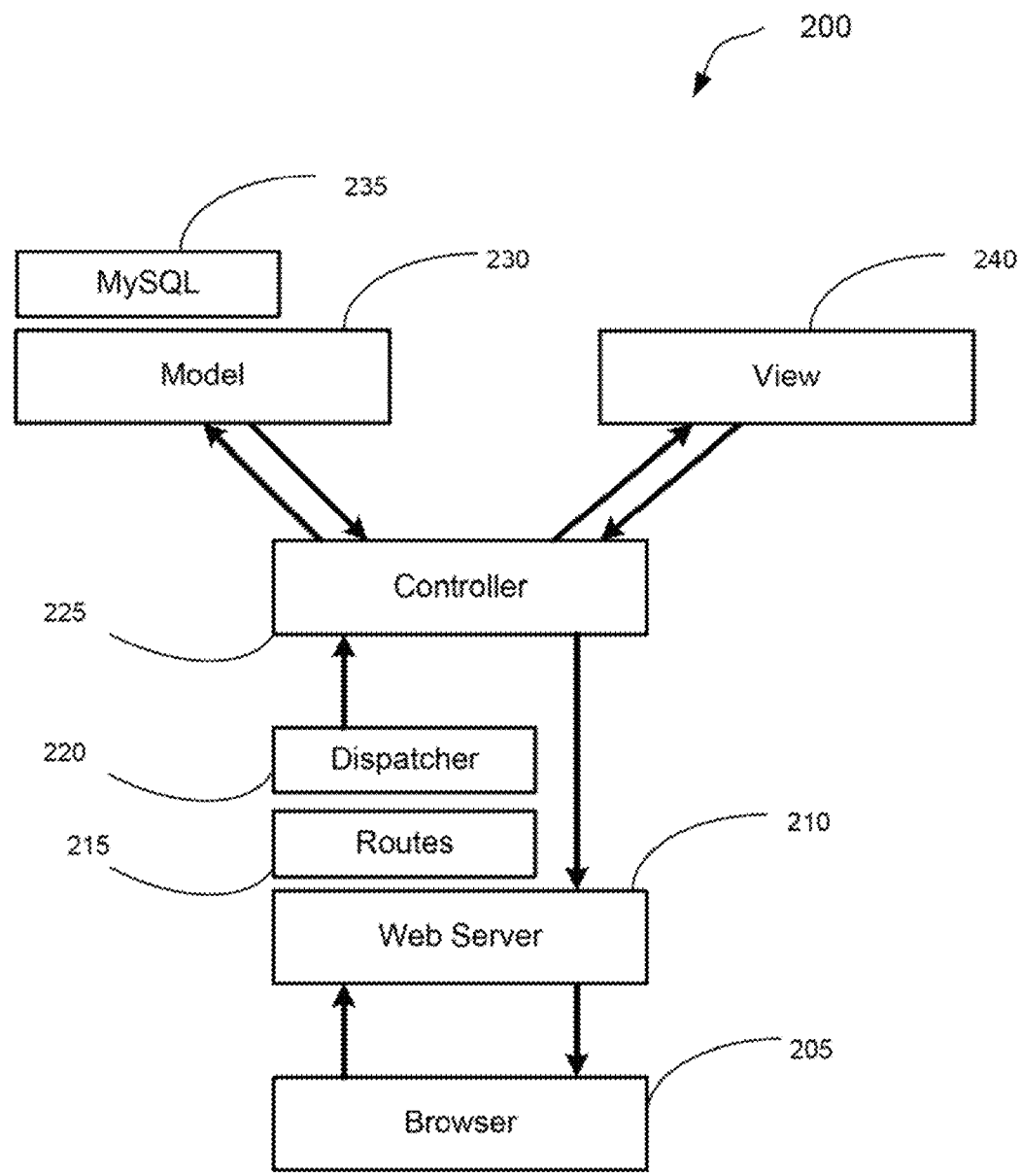
FIG. 2 shows an illustrative model-view-controller (MVC) architecture 200 that may be modeled using one or more discovery queries, in accordance with some embodiments.

FIG. 2 shows an illustrative model-view-controller (MVC) architecture 200 that may be modeled using one or more discovery queries, in accordance with some embodiments. An MVC architecture may be used to build a web application comprising various components having separate responsibilities. In the example shown in FIG. 2, the MVC architecture 200 includes a web server component 210, a routes component 215, a dispatcher component 220, a controller component 225, a model component 230, a database component 235, and a view component 240. The web server component 210 may receive a web request from a browser 205 and the routes component 215 may map the request to one or more actions to be taken by the controller component 225. The dispatcher component 220 may inform the controller component 225 of the one or more actions to be taken, and the controller component 225 may issue one or more commands to be executed by the model component 230. The model component 230 may execute the one or more commands according to logic of the web application and may manage data stored in the database component 235. The controller component 225 may receive an execution result from the model component 230 and may cause the view component 240 to generate an updated view based on the execution result. The controller component 225 may then cause the web server component 210 to respond to the browser 205 with the updated view.

Figure 3:
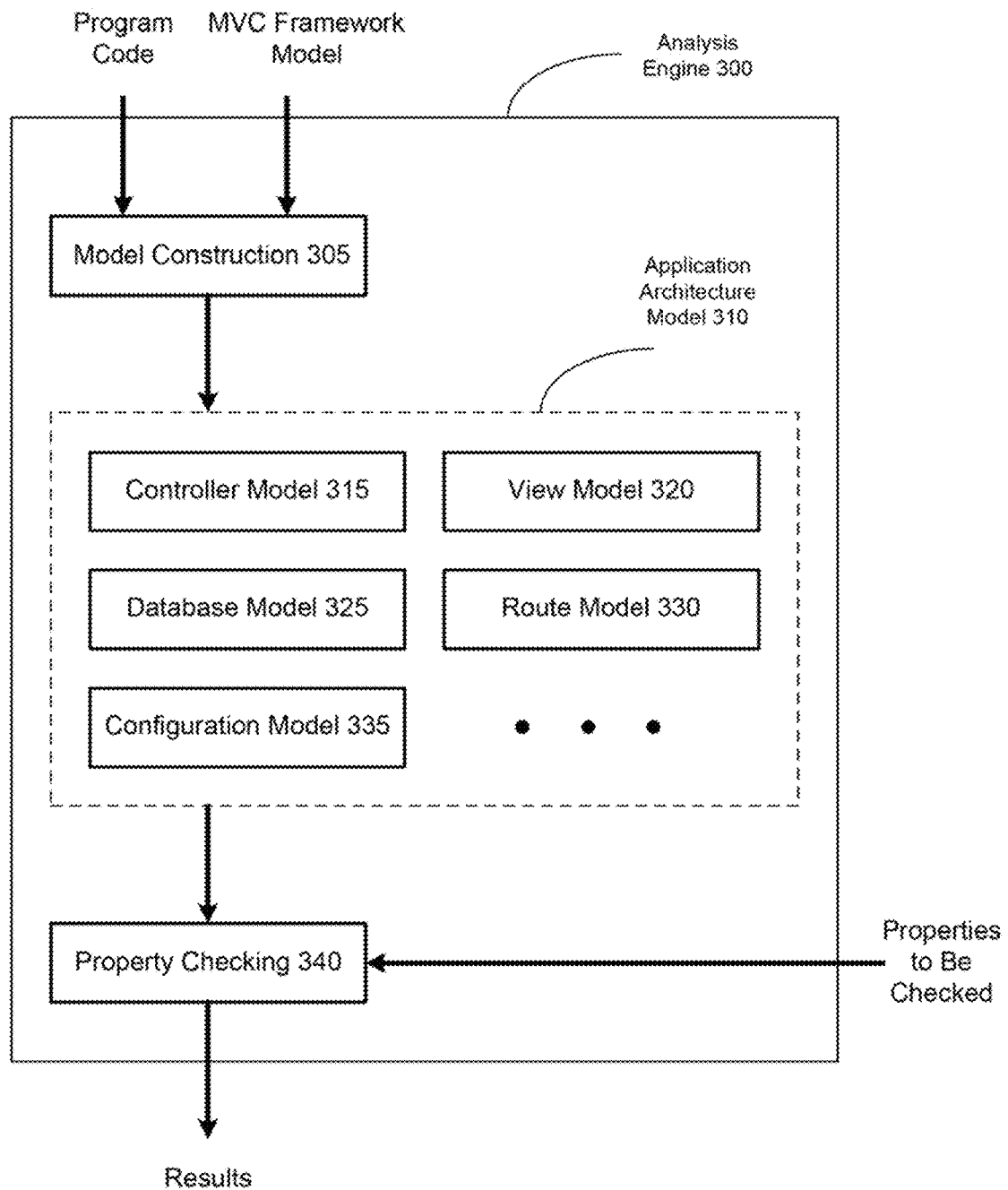
FIG. 3 shows an illustrative analysis engine 300 programmed to generate an application architecture model based on program code and one or more framework models, in accordance with some embodiments.

FIG. 3 shows an illustrative analysis engine 300 programmed to generate an application architecture model based on program code and one or more framework models, in accordance with some embodiments. For instance, the analysis engine 300 may be an implementation of the illustrative analysis engine 105 shown in FIG. 1.

In the example shown in FIG. 3, the analysis engine 300 includes a model construction component 305 and a property checking component 340. The model construction component 305 may receive as input program code (which may include source code and/or object code) and one or more framework models. In some embodiments, the one or more framework models may include one or more discovery queries.

In some embodiments, a framework model may reflect a software architecture, such as the illustrative MVC architecture 200 shown in FIG. 2. The model construction component 305 may be programmed to use the framework model to understand the input program code, for example, by extracting relevant information from the input program code and storing the information in one or more models. In some embodiments, a model may correspond to a component in the software architecture captured by the framework model.

For instance, in the example shown in FIG. 3, the model construction component 305 may be programmed by an MVC framework model to generate an application architecture model 310 that includes a controller model 315, a view model 320, a database model 325, and a route model 330, which may correspond, respectively, to the controller component 225, the view component 240, the database component 235, and the routes component 215 of the illustrative MCV architecture 200 shown in FIG. 2. Additionally, or alternatively, the application architecture model 310 may include a configuration model 335, which may not correspond to any component in the illustrative MCV architecture 200, but may store configuration information extracted from the input program code. Examples of configuration information that may be extracted and stored, include, but are not limited to, session and cookie configurations in web server code.

It should be appreciated that the MVC architecture 200 shown in FIG. 2 and the application architecture model 310 shown in FIG. 3 are provided solely for purposes of illustration, as the inventive aspects described herein may be used to model any software architecture.

FIG. 4 shows an illustrative source program 400 and an illustrative discovery query 420, in accordance with some embodiments. For instance, the source program 400 may be a portion of the input program code shown in FIG. 3, and the discovery query 420 may be included in the MVC framework model shown in FIG. 3.

In the example shown in FIG. 4, the discovery query 420 includes a PERFORM statement with a WHEN clause. The PERFORM statement may specify one or more actions to be performed if a condition specified in the WHEN clause is satisfied. In some embodiments, the WHEN clause may specify a pattern and the one or more actions specified in the PERFORM statement may be performed if the pattern specified in the WHEN clause is detected in the input program code.

For instance, in the example shown in FIG. 4, the WHEN clause specifies a pattern including a call to @RequestMapping with a URL $1, an HTTP method $2, and a function $f. A model construction component (e.g., the illustrative model construction component 305 shown in FIG. 3) may search through the input program code to identify a match of the pattern specified in the WHEN clause. If a match is found, the PERFORM statement may be executed to extract relevant information and store the extracted information in a model (e.g., the illustrative route model 330 shown in FIG. 3).

For example, in the source program 400 shown in FIG. 4, the URL $1 may be matched to the string "/database" at 405, the HTTP method $2 may be matched to the string "get" at 410, and the function $f may be matched to the declaration of injectable Query at 415. As shown at 435, the model construction component may execute the PERFORM statement and store the declaration of injectable Query in a resulting model at the following.

_model.routes["/database"]["get"].callbacks

In this manner, the model construction component may be programmable via a discovery query (e.g., the discovery query 420 tells the model construction component what to look for in the input program code and, once a relevant portion of code is found, what information to extract). For instance, one or more discovery queries (e.g., the illustrative discovery 420 shown in FIG. 4) may be written to model how a particular framework (e.g., a SpringMVC framework) interprets program annotations (e.g., @RequestMapping). Thus, the one or more discovery queries may represent semantics given to such annotations by the particular framework. One or more models (e.g., the illustrative model 435 shown in FIG. 4) that are constructed by applying the one or more discovery queries may then replace source code of the particular framework for purposes of checking whether one or more properties are satisfied.

Figure 16:
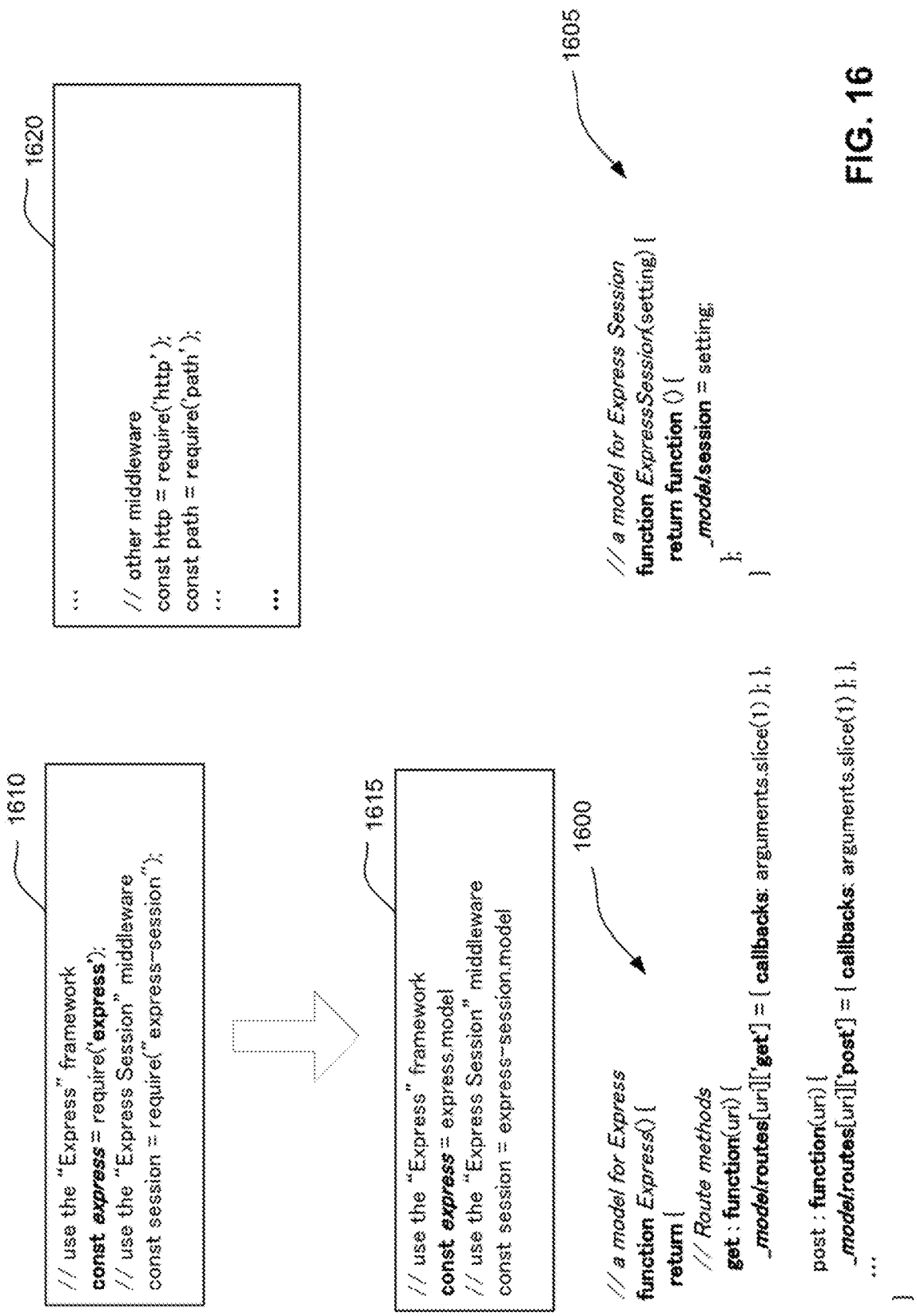
FIG. 16 shows illustrative framework models 1600 and 1605, in accordance with some embodiments.

It should be appreciated that the discovery query 420 is shown in FIG. 4 and described above solely for purposes of illustration. In some embodiments, other types of conditions may be specified, in addition to, or instead of, syntactic pattern matching. Furthermore, aspects of the present disclosure are not limited to the use of a discovery query in a framework model. For instance, in some embodiments (e.g., as shown in FIG. 16 and discussed below), a framework model may include a model that is written directly to replace framework source code. Such a model need not be a result of applying one or more discovery queries.

Returning to the example shown in FIG. 3, the application architecture model 310 may be analyzed by the property checking component 340 of the analysis engine 300 to determine if one or more properties are satisfied. Any suitable combination of one or more property checking techniques may be used, including, but not limited to, data flow analysis, control flow analysis, and/or model checking. The property checking component 340 may then output one or more results, which may include a finding indicating an identified problem (e.g., a security vulnerability), a suggested modification to the input program code to fix an identified problem, an indication that the property checking component 340 is unable to reach a conclusion with respect to a certain property, and/or any other observation of interest. For instance, a result may flag a portion of code that, based on information available to the property checking component 340, does not yet amount to a problem but merits further investigation. In some embodiments, a result output by the property checking component 340 may be processed by a guidance engine, such as the illustrative guidance engine 110 shown in FIG. 1, to provide appropriate feedback advice to a user.

FIG. 5 shows an illustrative source program 500 and illustrative property queries 510 and 515, in accordance with some embodiments. For instance, the source program 500 may be a portion of the input program code shown in FIG. 3, and the property queries 510 and 515 may be included in the properties to be checked shown in FIG. 3.

In the example shown in FIG. 5, the property query 505 includes a PERFORM statement with a WHEN clause. The PERFORM statement may specify one or more actions to be performed if a condition specified in the WHEN clause is satisfied. In some embodiments, the WHEN clause may specify a pattern and the one or more actions specified in the PERFORM statement may be performed if the pattern specified in the WHEN clause is detected in the input program code.

For instance, in the example shown in FIG. 5, the WHEN clause specifies a pattern where an assignment of a variable $x includes a call to getStringParameter or getRawParameter. A property checking component (e.g., the illustrative property checking component 340 shown in FIG. 3) may search through the input program code to identify a match of the pattern specified in the WHEN clause. If a match is found, the property checking component may perform the PERFORM statement to add a field named tainted to the matched variable and set the value of that field to be true. In this manner, the property checking component may be programmable via a property query (e.g., the property query 510 tells the property checking component what to look for in program code and, once a relevant portion of code is found, what information to maintain).

For example, in the source program 500 shown in FIG. 5, the variable $x may be matched to accountName because the assignment of accountName at 520 includes a call to getRawParameter. This may cause the property checking component to execute the PERFORM statement, adding the field accountName.tainted and setting the value of that field to be true.

In some embodiments, a property checking component may be programmed to propagate the value of an added field such as accountName.tainted. For instance, in the source program 500 at 525, the variable accountName is used in an assignment of the variable query. This may cause a field query.tainted to be added and the value of that field set to true. Thus, in this example, the property checking component is programmed to analyze the source program 500 both syntactically (e.g., via syntactic pattern matching on getRawParameter) and semantically (e.g., via data flow analysis on the field tainted).

In some embodiments, a property checking component may be programmed to detect and maintain type information. For instance, in the source program 500 at 530, an assignment of the variable statement includes an invocation of connection.createStatement. The property checking component may be programmed to determine type information based on this assignment and associate the type information with the variable statement.

In the example shown in FIG. 5, the property query 515 includes a MATCH clause, a WHERE clause, and a REWRITE clause. The REWRITE clause may specify one or more modifications to be made to the program code if a condition specified by the MATCH and WHERE clauses is satisfied.

For instance, in the source program 500 shown in FIG. 5, the object $o may be matched to statement at 535, the method $f may be matched to executeQuery at 540, and the parameter $1 may be matched to the variable query at 545. The property checking component may then use the type information associated with the variable statement to determine that the object $o, which is matched to statement, is an instance of java.sql.Statement. The property checking component may further determine that the name of the method $f, which is matched to executeQuery, matches the regular expression "execute.*," and that the value of the tainted field of the parameter $1, which is matched to the variable query, is true. Since all of the conditions in the WHERE clause are satisfied, the property checking component may execute the REWRITE clause, which may replace the variable query with API.sanitize(query), so that the last line in the source program 500 may become:

ResultSet results=statement.executeQuery(API.sanitize (query)).

Thus, in this example, the property query 515 programs the property checking component to use syntactic information (e.g., presence of the substring execute), data flow information (e.g., propagation of the field tainted), and type information (e.g., a type of the variable statement) to determine whether to make a particular modification to the input program code.

It should be appreciated that the property queries 510 and 515 are shown in FIG. 5 and described above solely for purposes of illustration. Aspects of the present disclosure are not limited to the use of syntactic analysis, data flow analysis, or type analysis. Furthermore, aspects of the present disclosure are not limited to the use of a REWRITE clause, as a property checking component may sometimes report a finding without suggesting a modification to the input program code.

Figure 6:
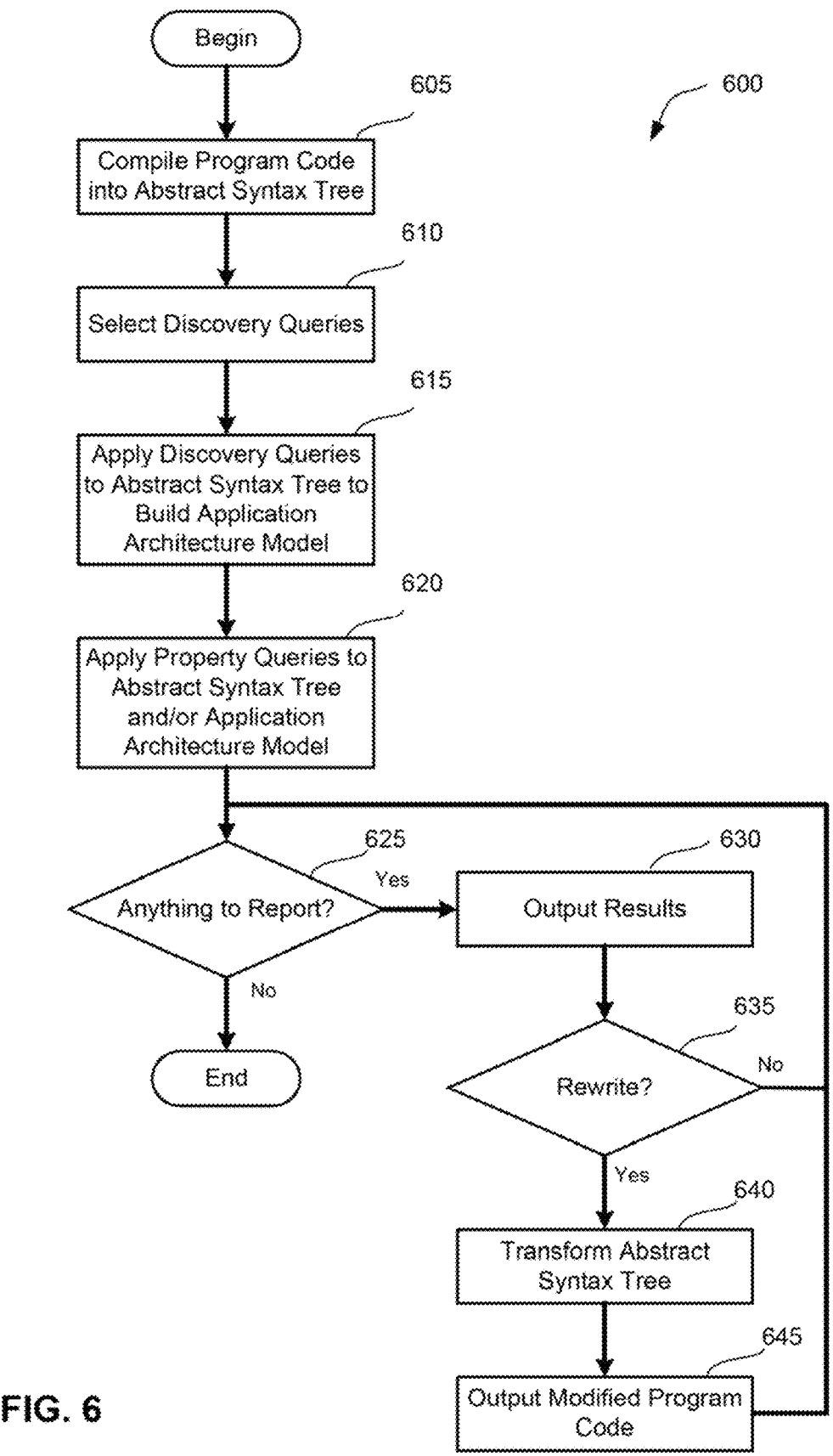
FIG. 6 shows an illustrative process 600 that may be performed by an analysis engine, in accordance with some embodiments.

FIG. 6 shows an illustrative process 600 that may be performed by an analysis engine, in accordance with some embodiments. For example, the process 600 may be performed by the illustrative analysis engine 300 shown in FIG. 3 to construct the illustrative application architecture model 310 and check one or more properties.

Figure 7:
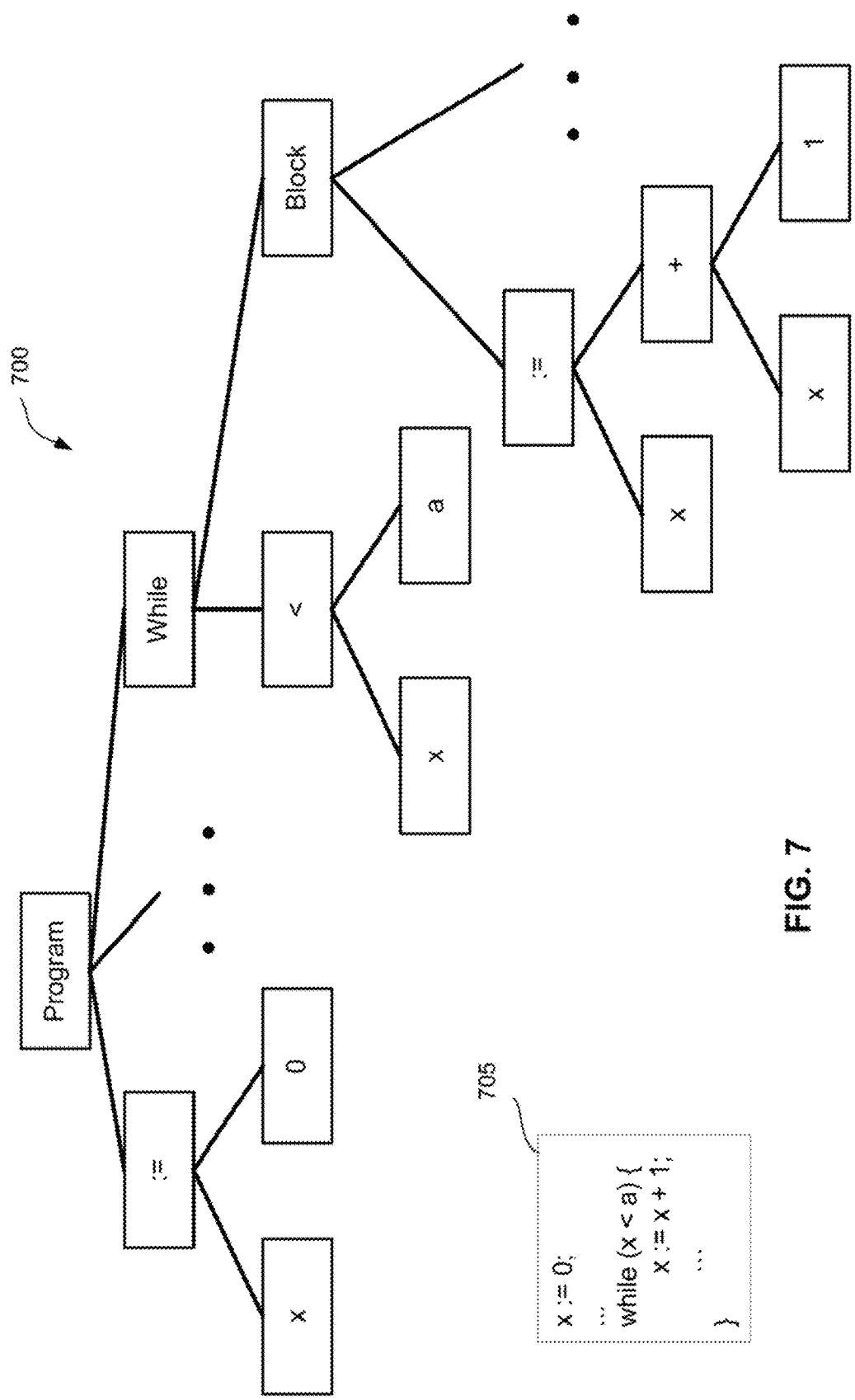
FIG. 7 shows an illustrative Abstract Syntax Tree (AST) 700 for an illustrative program 705, in accordance with some embodiments.

At act 605, the analysis engine may compile input program code into a suitable representation, such as an abstract syntax tree (AST). FIG. 7 shows an illustrative AST 700 for an illustrative program 705, in accordance with some embodiments. The inventors have recognized and appreciated that an AST may be used to capture the structure of a program and facilitate manipulations such as annotations and/or modifications. However, it should be appreciated that aspects of the present disclosure are not limited to the use of an AST, or any representation at all. Examples of representations that may be used instead of, or in additional to, ASTs include, but are not limited to, byte-code, machine code, control flow graphs, logic formulas modeling the semantics, etc.

At act 610, the analysis engine may select one or more discovery queries to be applied to the AST constructed at act 605. For instance, in some embodiments, the analysis engine may be programmed to select and retrieve (e.g., from a database) a previously constructed framework model that includes one or more discovery queries. The selection may be based on any suitable information about the input program code, such as one or more programming languages in which the input program code is written, and/or one or more external components (e.g., frameworks, libraries, and/or middleware) used by the input program code. Additionally, or alternatively, the analysis engine may be programmed to select and retrieve (e.g., from a database) one or more discovery queries based on a type of analysis to be performed (e.g., looking for security vulnerabilities in general, or one or more specific types of security vulnerabilities).

In some embodiments, the analysis engine may retrieve (e.g., from a database) a discovery query selected by a user. Additionally, or alternatively, the analysis engine may receive, via a user interface, a discovery query written by a user. In some embodiments, the user interface may be part of an IDE, although that is not required.

At act 615, the analysis engine may apply the one or more discovery selected at act 610 to the AST constructed at act 605. An illustrative application of a discovery query is shown in FIG. 4 and discussed above.

In some embodiments, the analysis engine may first apply one or more discovery queries to extract relevant information from the AST constructed at act 605, thereby constructing a reduced AST. The analysis engine may then apply one or more discovery queries to the reduced AST to construct an application architecture model. Alternatively, or additionally, the analysis engine may apply one or more discovery queries directly to the AST constructed at act 605 to construct an application architecture model. Any suitable method may be used to traverse an AST. For instance, in some embodiments, AST nodes may be visited based on control flow, and relationships between the AST nodes may be examined to check a query. In some embodiments, an analysis state may be maintained during such a traversal. For example, when an AST node is visited, semantic information may be recorded in the analysis state, which may be made available when a next AST node is processed. The query may then be checked over the information stored in the analysis state.

At act 620, the analysis engine may apply one or more property queries to the application architecture model constructed at act 615. Additionally, or alternatively, the analysis engine may apply one or more property queries to the AST constructed at act 605, and/or any reduced AST constructed at act 605 (e.g., portions of the AST constructed at act 605, and/or any reduced AST constructed at act 605, that correspond to component models in the application architecture model constructed at act 615). An illustrative application of property queries is shown in FIG. 5 and discussed above.

At act 625, the analysis engine may determine if the application of one or more property queries at act 620 has resulted in any observation of interest. If there is an observation of interest, the analysis engine may, at act 630, output one or more results. The one or more results may include an indication of an identified problem (e.g., a security vulnerability), a suggested modification to the input program code to fix an identified problem, an indication that the analysis engine is unable to reach a conclusion with respect to a certain property, a portion of code that merits further investigation, and/or any other observation of interest.

At act 635, the analysis engine may determine if the application of one or more property queries at act 620 has resulted in a suggested modification to the input program code. If there is a suggested modification to the input program code, the analysis engine may, at act 640, transform the AST constructed at act 605. For example, the analysis engine may execute a mutation query (e.g., with a REWRITE clause) to replace a portion of code (e.g., the variable query in the example of FIG. 5) with another portion of code (e.g., sanitize(query) in the example of FIG. 5).

At act 645, the analysis engine may use the transformed AST to modify the input program code and output the modified program code. In some embodiments, a user interface may be provided to allow a user to authorize use of the modified program code and/or to test the modified program code in a sandbox. Alternatively, or additionally, a branch may be created in a version control system for the modified program code generated by the analysis engine.

Upon outputting the modified program code, or if it is determined at act 635 that there is no suggested modification to the input program code, the analysis engine may return to act 625 to determine if there is any additional observation of interest. The inventors have recognized and appreciated that some property queries may take more computing time to answer. Accordingly, in some embodiments, the analysis engine may be programmed to output results incrementally. For example, the analysis engine may first deliver results from easy checks (e.g., syntactic pattern matching), while the analysis engine is still performing a deep analysis (e.g., model checking). In this manner, the user may immediately begin to review and address the results from the easy checks, without having to wait for the deep analysis to be completed.

It should be appreciated that details of implementation are described above solely for purposes of illustration, as aspects of the present disclosure are not limited to any particular manner of implementation. For instance, in some embodiments, a separate guidance engine may be provided that consumes outputs of the analysis engine and renders guidance to a developer based on the analysis engine's outputs.

III. Query Language

The inventors have recognized and appreciated that it may be beneficial to provide a unified method for understanding, modeling, checking, and/or fixing software applications with respect to one or more properties of interest (e.g., security vulnerabilities in general, or one or more specific types of security vulnerabilities).

In some embodiments, a query language may be provided to allow a user to program any one or more aspects of software verification, which may include, but are not limited to:

modeling one or more external components (e.g., frameworks, libraries, and/or middleware) used by a software application;

constructing models of the application that abstract away irrelevant information (e.g., information that is irrelevant for a certain type of analysis such as security analysis);

specifying one or more properties to be checked against the application;

specifying how the application should be fixed if a problem is identified; and/or controlling how an analysis engine analyzes the application.

In some embodiments, a query language may be provided that is more expressive than existing techniques for verifying software applications. For example, the query language may be a superset of a full realistic programming language (e.g., JavaScript). In some embodiments, a query language may be provided that is more powerful than existing techniques for verifying software applications. For example, the query language may be used to define semantic abstractions of a program and/or external components (e.g., frameworks, libraries, and/or middleware) used by the program. Additionally, or alternatively, the query language may be used to query program semantics. In some embodiments, a query language may be provided that is more convenient to use than existing techniques for modeling software applications. For example, the query language may have a succinct syntax and may allow modular definitions.

FIG. 8 shows Backus Normal Form (BNF) definitions of some components of an illustrative query language, in accordance with some embodiments. Such a query language may be used, for example, to write the illustrative discovery query 420 shown in FIG. 4 and the illustrative property queries 510 and 515 shown in FIG. 5.

The inventors have recognized and appreciated that a query language having the illustrative constructs shown in FIG. 8 and/or described herein may advantageously provide an expressive, powerful, and convenient method for software verification. For example, these constructs may allow different types of analyses (e.g., static scanning, data flow analysis, fuzzing, dynamic scanning, etc.) to be specified using the same query language, so that the different types of analyses may be combined in a deep way. Furthermore, these constructs may allow different data sources to be queried using the same query language, so that query results regarding the different data sources may be assessed collectively.

However, it should be appreciated that aspects of the present disclosure are not limited to the use of a query language having all of the constructs shown in FIG. 8 and/or described herein. In various embodiments, any one or more of these constructs, and/or other constructs, may be included in a query language.

A. Syntax Matching Blocks

In some embodiments, a query language may include constructs for syntax matching blocks, flow operators, semantic predicates, side-effect statements, and/or application programming interface (API) functions for an analysis engine.

Syntax matching blocks may be based on source code syntax for any one or more programming languages, such as JavaScript, Java, C/C++/Objective-C, SWIFT, ASP.NET, Python, Ruby, etc.

Flow operators may be used to connect syntax matching blocks to describe flows between different portions of a program.

Semantic predicates may be built using first order logic and/or native constructs and may be used for semantics queries.

Side-effect statements may be used to instruct the analysis engine to perform specific actions, such as building models for a program and/or modifying input program code.

API functions may be used to access internal state of the analysis engine and/or program how the analysis engine performs an analysis.

In some embodiments, a query language may be provided that uses source language syntax directly for syntax matching. For instance, in the example shown in FIG. 8, the notation <{<source syntax>}> describes a syntax matching block for matching a syntactic element in a source language, where free variables (which are prefixed by "$") are assigned if a match is found. Thus, syntax matching in this query language may depend on the syntax of a source language (e.g., JavaScript, Java, C/C++/Objective-C, SWIFT, ASP.NET, Python, Ruby, etc.).

As an example, if variable assignment is denoted by "=" in a source language, then the syntax matching block <{a=$b}> may match any assignment statement that assigns a value to the variable a. For instance, the syntax matching block <{a=$b}> may match the statement, a=a+x, where the syntactic element a+x may be assigned to the free variable $b.

As another example, the following syntax matching block may be specific to the syntax of Java SpringMVC.

```
<{ @RequestMapping(value =$1, method = $2)
   $f
}>
```

This syntax matching block may match a function declaration with an annotation of route information, where the route's URL may be assigned to the free variable $1, the name of the HTTP method may be assigned to the free variable $2, and the function declaration may be assigned to the free variable $f.

In some embodiments, a syntax matching block may include OR as a syntax operator. For instance, the syntax matching block <{getStringParameter( ) OR getRawParameter( )}> may match a function call to getStringParameter or getRawParameter.

In some embodiments, a syntax matching block may include a character (e.g., "_") for a "don't care" element. For instance, the following pattern may match any for loop regardless of the condition, as long as the body of the for loop matches.

```
//pattern
for (_) {
    if ($1)
        $2;
}
```

In some embodiments, a syntax matching block may include a syntax operator AS. For instance, the syntax matching block <{$f(_,$2)}> AS $call may match a function call of two arguments. When a match is found, the function name may be assigned to $f and the second argument may be assigned to $2, while the first argument may not be stored. Because of the use of the AS operator, the entire function call information, including function name, function declaration, and/or one or more matched arguments, may be stored in $call.

In some embodiments, a syntax matching block may include multilayer static scopes. For instance, nested scopes may be expressed using braces and may be matched according to the syntax of a source language (e.g., JavaScript, Java, C/C++/Objective-C, SWIFT, ASP.NET, Python, Ruby, etc.).

As an example, the illustrative for loop pattern above may have two matches in the following program code.

```
// program
if (b) {
    for (var i = 1; i < 10; i++) {
        for (var k in [1,2,3]) {
            if (x > A[i]) {
                if (b[k])
                    x = 1;
            }
        }
    }
}
```

In the first match, the syntactic element x>A[i] is assigned to $1, and the syntactic element if (b[k]) x=1 is assigned to $2. In the second match, the syntactic element b[k] is assigned to $1, and the syntactic element x=1 is assigned to $2. In both matches, both scopes (i.e., for loop and if branch) are matched syntactically.

B. Flow Operators

In some embodiments, a query language may include one or more flow operators, for example, to describe relationships between syntactic elements. For instance, one or more temporal operators may be used to describe how a syntactic element flows to another syntactic element. In some embodiments, an analysis engine may match a flow statement through a finite state machine algorithm. For instance, a finite state machine may be defined that includes at least two states. At the first state, the analysis engine may analyze portions of input program code, looking for a first syntactic element. The analysis engine may stay in the first state until the first syntactic element is matched. Once the first syntactic element is matched, the analysis engine may move to the second state, where the analysis engine may analyze further portions of the input program code, looking for a second syntactic element.

In some embodiments, a basic flow operator (→) may be used to express that a syntactic element is followed by another syntactic element in at least one program path. As one example, the flow statement <{$ƒ1($a1)→$ƒ2($a2)}> may be matched if one function call is followed by another function call in at least one program path, where the two functions may be different, but each of the two functions has a signal argument. The name of the function that is called earlier may be assigned to $ƒ1, and the argument of that function may be assigned to $a1, while the name of the function that is called later may be assigned to $ƒ2, and the argument of that function may be assigned to $a2.

As another example, the following flow statement may be matched if there is at least one program path in which a method of an object is invoked on a variable which was previously assigned the return value of a call to getStringParameter or getRawParameter. The name of the variable may be assigned to $x, the name of the object may be assigned to $o2, and the name of the function of the object may be assigned to $ƒ.
<{$x=_.getStringParameter( ) OR _.getRawParameter( )→$o2.$ƒ($x)}>

In some embodiments, an all-path flow operator (-AP→) may be used to express that a syntactic element is followed by another syntactic element in all program paths. For instance, the flow statement <{$ƒ1($a1)-AP→$ƒ2($a2)}> may be matched if a call to a first function with a first argument is followed by a call to a second function with a second argument in all program paths. The name of the first function may be assigned to $ƒ1, and the first argument may be assigned to $a1, while the name of the second function may be assigned to $ƒ2, and the second argument may be assigned to $a2.

In some embodiments, an absence operator (MISSING) may be used to express that in no program path a first syntactic element happens between a second syntactic element and a third syntactic element. For instance, the flow statement <{$ƒ1($a1)→MISSING $a2=_→$ƒ2($a2)}> may be matched if there is a program path in which a first function call is followed by a second function call, and there is no assignment to the argument of the second function call between the two function calls.

In some embodiments, operators FIRST and LAST may be used to match, respectively, the first and last occurrences of a syntactic element. For instance, the flow statement <{FIRST ƒ1($a1)→LAST ƒ2($a2)}> may be matched if the first call to ƒ1 precedes the last call to ƒ2 in at least one program path, where other calls to ƒ1 and ƒ2 in that program path may be ignored.

C. Semantic Predicates

In some embodiments, a query language may be provided that includes one or more semantics predicates for expressing properties relating to variable values, types, etc. Unlike syntax matching blocks, which may be used to query the syntax of a program, semantic predicates may be used to query semantics of a program, such as values of variables, types of variables, and/or semantic relationships between variables.

In some embodiments, semantic predicates may be built using first order logic and/or native constructs. Examples of operators for building semantic predicates include, but are not limited to:
- arithmetic operators (e.g., +, −, *, /, %, etc.);
- relational operators (e.g., >=, >, ==, etc.);
- propositional logic operators (e.g., AND, OR, NOT, IMPLY, etc.);
- first-order logic quantifiers (e.g., EXIST, FORALL, etc.);
- domain-specific operators (e.g., RegExp.match, string.indexOf, etc.);
- type operators (e.g., instanceof, ISCONSTANT, etc.); and/or
- flow operators (e.g., USE, CALL, etc.).

In some embodiments, an existentially quantified expression EXIST v IN c:body may evaluate to true if there is a value v in the set c such that a condition specified in the body is true. As one example, the expression EXIST x IN [1,2]: x>0 may evaluate to true because there is a value x in the range [1,2] such that x is greater than 0. As another example, the expression EXIST arg IN ƒ.arguments:arg.taint==true may evaluate to true if there is an argument in the set of arguments/arguments such that the taint field of the argument is set to true.

In some embodiments, a universally quantified expression FORALL v IN c:body may evaluate to true if for every value v in the set c, a condition specified in the body is true. For example, the following expression may evaluate to true if for every index y in the object _model.routes, the route indexed by y, _model.routes[y], is not null.
FORALL y IN _model.routes:_model.routes[y] !=null In some embodiments, a data flow operator USE may be used to express that a value of a second syntactic element is used to compute a value of a first syntactic element. For example, the expression $arg USE $input may evaluate to true if a value of the syntactic element assigned to $input is used to compute a value of the syntactic element assigned to $arg.

In some embodiments, a control-flow operator CALL may be used to express that a call to a first function includes a call to a second function. For example, the expression $f1 CALL $f2 may evaluate to true if a call to the function assigned to $f1 includes a call to the function assigned to $f2.

D. Side-Effect Statements

In some embodiments, a query language may be provided that includes one or more side-effect constructs. For instance, a side-effect construct may be used to define a discovery query, such as the illustrative discovery query 420 shown in FIG. 4.

In some embodiments, the following illustrative side-effect construct may be used, where the PERFORM statement may specify one or more actions to be performed if a condition specified in the WHEN clause is satisfied.
PERFORM <statement> WHEN <syntax matching block>

In some embodiments, the WHEN clause may specify a pattern and the one or more actions specified in the PERFORM statement may be performed if the pattern specified in the WHEN clause is detected in input program code. For instance, the PERFORM statement may include a piece of executable code, where the WHEN clause may include a syntax matching block (which may in turn include a semantic predicate). In some embodiments, a query language may be a superset of the syntax of a high-level programming language (e.g., JavaScript), so the PERFORM statement may use any one or more constructs provided by the high-level programming language.

For example, the following discovery query, when executed by an analysis engine, may cause the analysis engine to search input program code for a declaration of a route function in an MVC architecture, where the HTTP method in the declaration is a method of a RequestMethod object. The route's URL may be assigned to the free variable $1, the name of the method may be assigned to the free variable $2, the name of the route function may be assigned to the free variable $3, and the entire function declaration may be assigned to the free variable $f (using the AS operator). The PERFORM statement may cause the analysis engine to store the function declaration in a route model (e.g., such as the illustrative route model 330 shown in FIG. 3).
PERFORM ≤model.routes[$1][$2].callbacks=[$f]
WHEN <{@RequestMapping(value=$1, method=RequestMethod. $2) function $3(_){ } AS $f}>

Additionally, or alternatively, a PERFORM statement may be used to inject data into an AST (e.g., an AST compiled directly from input program code, or a reduced AST constructed by removing certain information). For instance, in the following illustrative PERFORM statement, the WHEN clause may specify a pattern where an assignment of a variable $x includes a call to getStringParameter or getRawParameter. If an analysis engine finds a match of this pattern, the analysis engine may add a field named tainted to the matched variable and set the value of that field to be true. In some embodiments, the analysis engine may be programmed to propagate the value of the tainted field.
PERFORM $x.tainted=true
WHEN <{$x=getStringParameter( ) OR getRawParameter( )}

In some embodiments, data maintained in an added field may be used to facilitate property checking and/or code editing. For instance, the following illustrative property query may be used to check if an argument of a call to a method of an object is tainted, and if so, replace the argument with a sanitized version of the argument.
<{$o.$f($1)}>
WHERE $1.tainted==true
REWRITE $1<=SanitizerAPI.sanitize($1)

Figure 9:
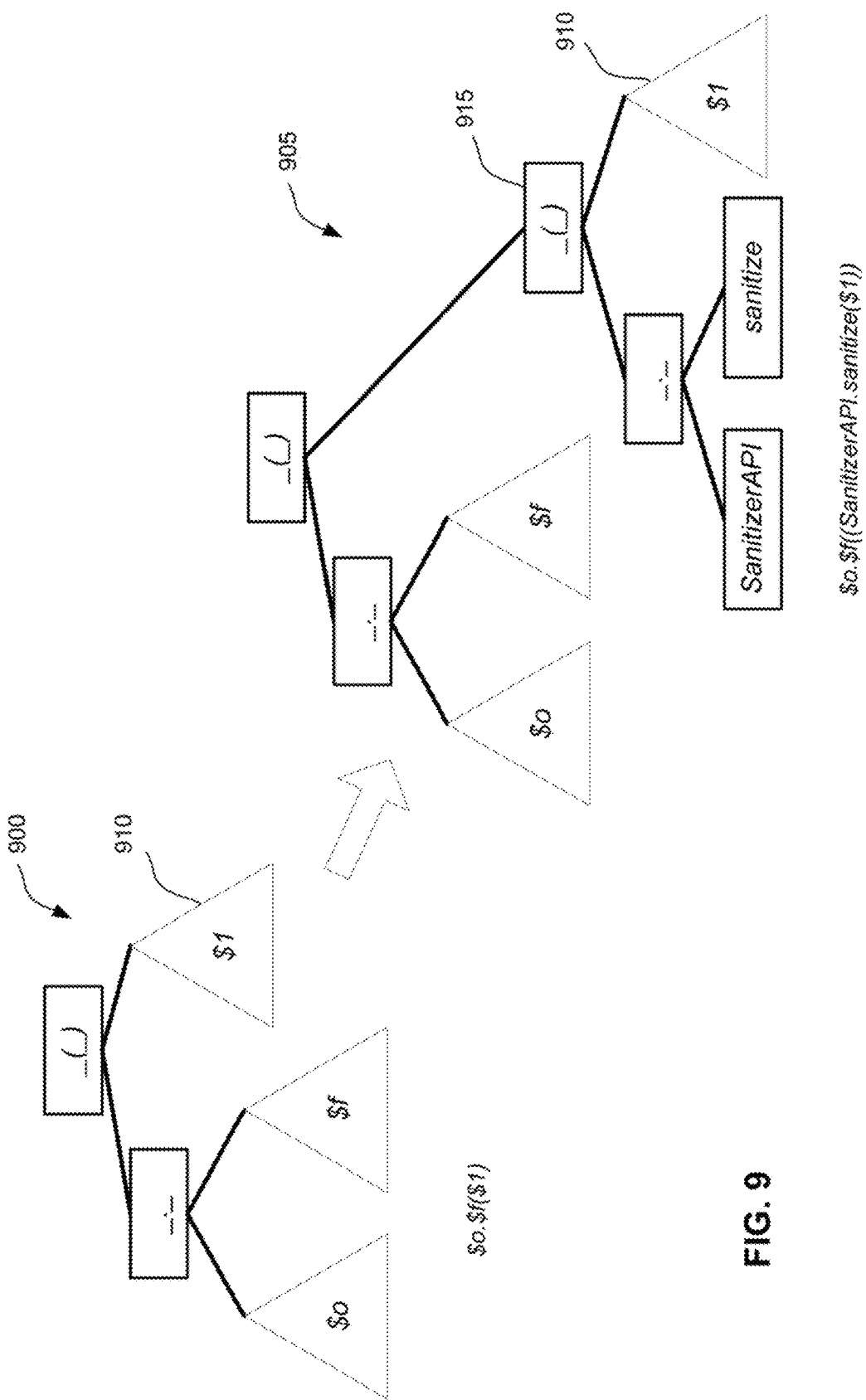
FIG. 9 shows a transformation of an illustrative AST 900 to a transformed AST 905, in accordance with some embodiments.

FIG. 9 shows a transformation of an illustrative AST 900 to a transformed AST 905, in accordance with some embodiments. For instance, this transformation may be performed by an analysis engine in executing the illustrative property query described above to syntactically replace a subtree 910 assigned to the free variable $1 with a different subtree at a node 915. The new subtree may correspond to applying the sanitize function in the SanitizerAPI library to the argument $1, and may be constructed by attaching the subtree 910 to the node 915 as the argument of SanitizerAPI.sanitize.

FIG. 10 shows an illustrative source program 1050 and an illustrative property query 1055, in accordance with some embodiments. In this example, the source program 1050 may implement a bitwise comparison between two bit strings, which may be cryptographic digests such as CRCs (cyclic redundancy checks) or HMACs (keyed-hash message authentication codes). This particular implementation may be vulnerable to side-channel attacks because execution time of the for loop may be input dependent. For instance, the for loop may exit early if a difference is detected early in the bit strings, and may run through the entire lengths of the bit strings if the bit strings are identical. This type of comparison is sometimes called a "fail fast" comparison.

In some embodiments, a property query may program an analysis engine to detect "fail fast" comparisons. For instance, in the example shown in FIG. 10, the property query 1055 may be written using a data flow operator USE, which may cause the analysis engine to search for a function declaration that has two byte arrays as arguments ($a and $b) and includes a for loop with an if statement in the body of the for loop, where the condition ($1) of the if statement depends on both of the byte array arguments ($1 USE $a AND $2 USE $b). Thus, the property query 1055 may cause the analysis engine to perform a combination of syntactic matching and data flow analysis to detect a "fail fast" comparison.

Figure 11:
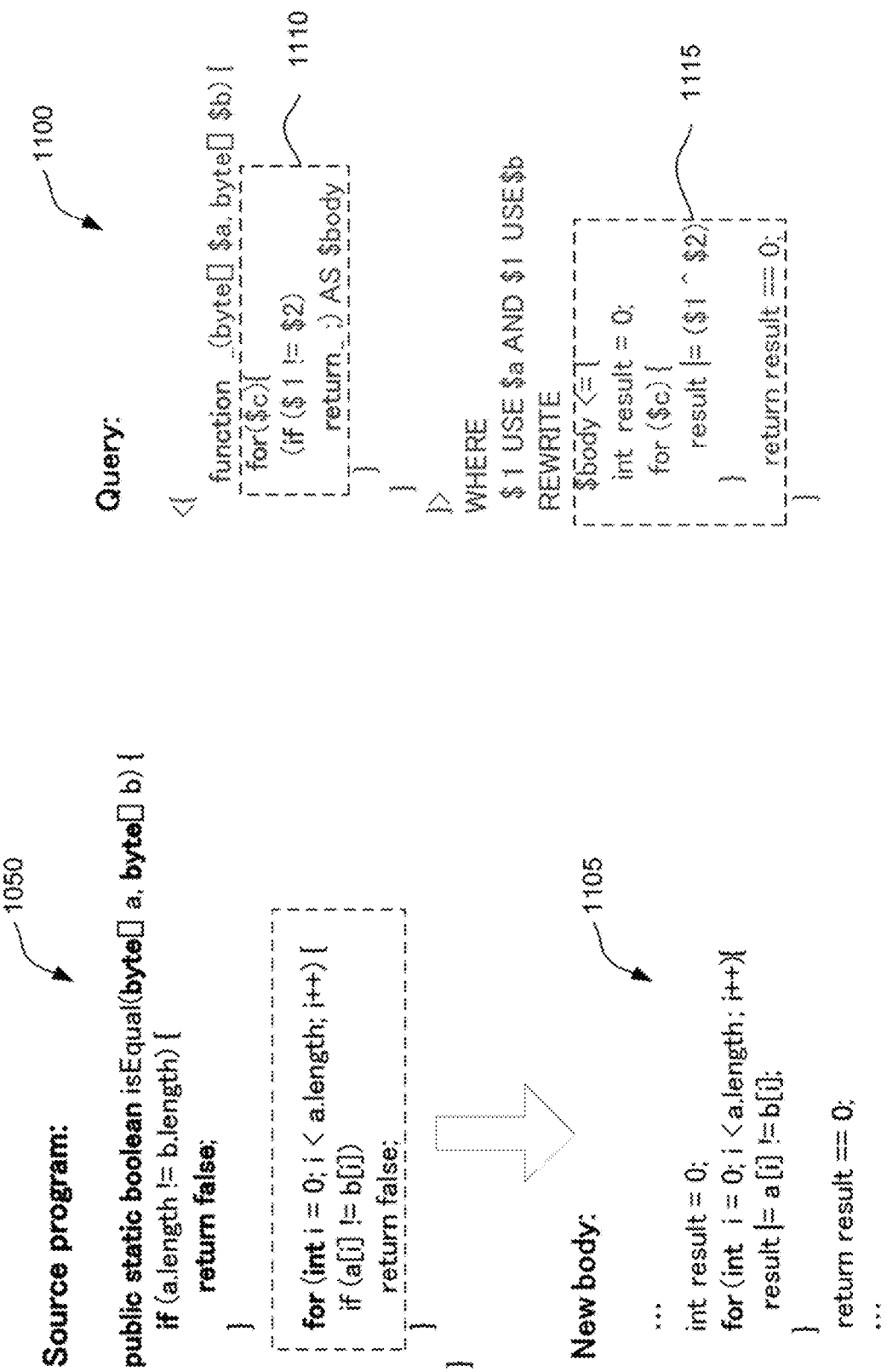
FIG. 11 shows an illustrative property query 1100, in accordance with some embodiments.

In some embodiments, a property query may program an analysis engine to remove a vulnerability caused by a "fail fast" comparison. FIG. 11 shows an illustrative property query 1100, in accordance with some embodiments. Like the illustrative property query 1055 shown in FIG. 10, the property query 1100 may program an analysis engine to detect a "fail fast" comparison. Additionally, the property query 1100 may cause the analysis engine to assign a syntactic element (e.g., a subtree in an AST) corresponding to the for loop to a free variable $body, for example, using an AS operator at 1110. At 1115, the property query 1100 may cause the analysis engine to replace the syntactic element assigned to $body with a new body 1105, resulting in a transformed function declaration. The transformed for loop may not exit early, even if a difference has been detected, thereby removing the vulnerability to side-channel attacks.

E. Analysis Engine API Functions

In some embodiments, a query language may be provided that includes one or more API functions for accessing internal state of an analysis engine and/or programming how the analysis engine performs an analysis. The inventors have recognized and appreciated that an analysis engine may maintain useful information, such as ASTs (e.g., ASTs compiled directly from input program code, and/or reduced ASTs constructed by removing certain information), variable values, variable types, analysis results, internal data structures, relationships between internal data, etc. Accordingly, a query language may implement a protocol for exposing some or all of the information maintained by the analysis engine.

For example, an analysis engine may maintain a function closure as an internal representation of a function in an AST. This closure may include information such as an original AST, parent scope, type information, member declarations within a body of the function body, etc. In some embodiments, an API construct, $f.ast, may be used to obtain an AST stored by the analysis engine for the syntactic element assigned to $f, and an API construct, $f.ast.name, may be used to obtain the function name in the AST. Additionally, or alternatively, the statement, FORALL v IN $f:v instanceof String, may be used to enumerate all data members in a function closure that are of the type String.

F. Aliases, Macros, and Modules

In some embodiments, a query language may allow definitions of aliases, macros, and/or modules. The inventors have recognized and appreciated that such definitions may be used to enhance reusability and modularization. However, it should be appreciated that aspects of the present disclosure are not limited to the use of any alias, macro, or module.

In some embodiments, a keyword let may be used to introduce an alias. An example is as follows.
let source=getStringParameter( ) OR getRawParameter( )

With this illustrative alias, the following queries are equivalent.
    PERFORM $x.tainted=true
    WHEN <{$x=source>}
    PERFORM $x.tainted=true
    WHEN <{$x=getStringParameter( ) OR getRawParameter( )>}

In some embodiments, a keyword DEFINE may be used to introduce a macro. An example is as follows.
DEFINE isStatement(v) {v instanceof java.sql.Statement;}
With this illustrative macro, the following queries are equivalent.
    MATCH <{$o.$f($1)}>
    WHERE isStatement($o)
    MATCH <{$o.$f($1)}>
    WHERE $0 instanceof java.sql.Statement;

In some embodiments, a keyword IMPORT may be used to load one or more query definitions from a query source file. This construct may advantageously allow query definitions to be modularized.

Figure 12:
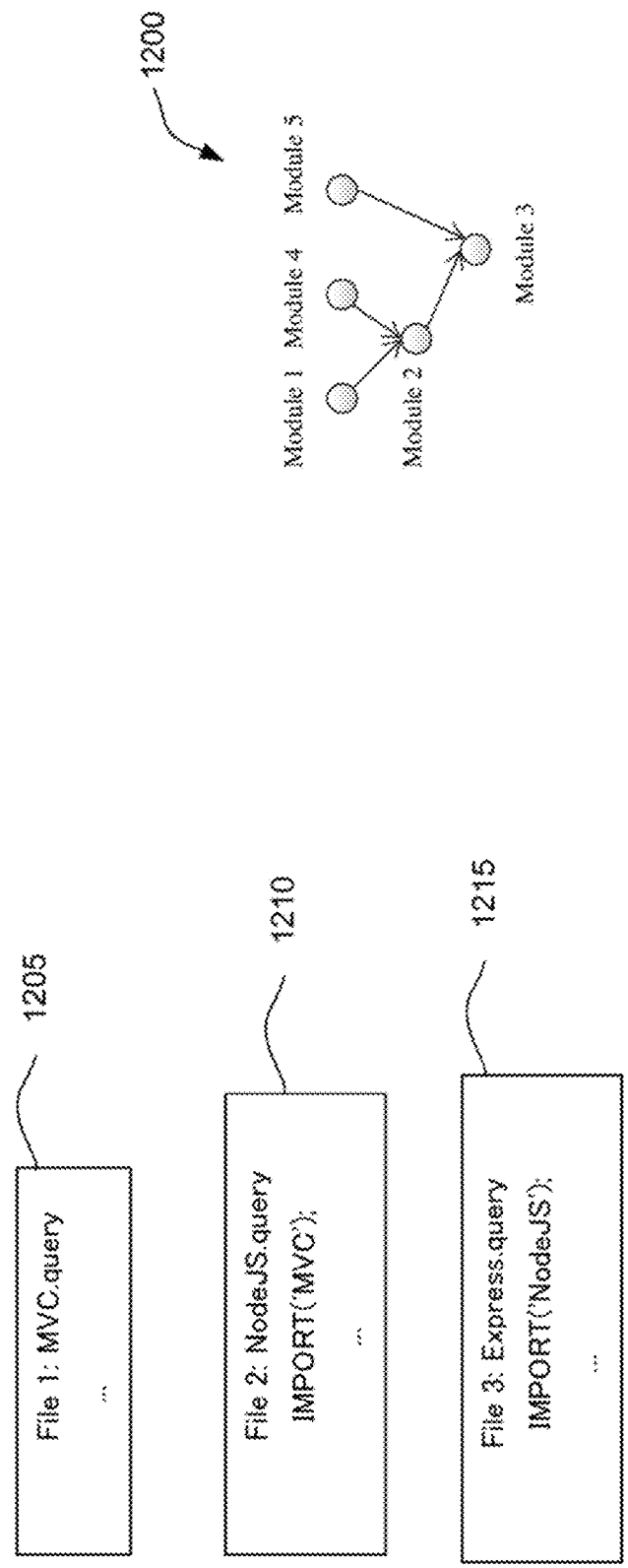
FIG. 12 shows an illustrative network 1200 of modules, in accordance with some embodiments.

FIG. 12 shows an illustrative network 1200 of modules, in accordance with some embodiments. The network 1220 may include a node Module 1 corresponding to a first query source file 1205, a node Module 2 corresponding to a second query source file 1210, and a node Module 3 corresponding to a third query source file 1215. The first query source file 1205 may include a framework model for an MVC architecture, the second query source file 1210 may include a framework model for a Node.js runtime environment, and the third query source file 1215 may include a framework model for an Express framework.

In example shown in FIG. 12, the first query source file 1205 may be imported into the second query source file 1210 via an IMPORT statement, so that queries in the Node.js framework model may make use of query definitions in the MVC framework model. Similarly, the second query source file 1210 may be imported into the third query source file 1215 via an IMPORT statement, so that queries in the Express framework model may use of query definitions in the Node.js framework model and/or the MVC framework model.

The inventors have recognized and appreciated that an organization of modules such as that shown in FIG. 12 may improve reusability of query definitions. However, it should be appreciated that aspects of the present disclosure are not limited to the use of modules for organizing query definitions.

F. Libraries and High-Level Queries

The inventors have recognized and appreciated that it may be beneficial to store certain commonly used query definitions in a library, so that these definitions may be accessed by simply loading the library. For example, query definitions for discovering and/or manipulating MVC components for web applications may be stored in a library, and definitions for discovering and/or manipulating MVC components for mobile apps (e.g., for an Android™ operating system and/or an iOS™ operating system) may be stored in the same or a different library.

FIG. 13 shows an illustrate set of nouns that may be used in a query language for accessing components in an MVC architecture, in accordance with some embodiments. In some embodiments, an MVC library may be provided that includes one or more predefined queries for discovering and/or manipulating MVC components. The MVC library may allow a user to use the nouns shown in FIG. 13 as high-level keywords in the query language.

In some embodiments, an MVC library may include one or more discovery queries that program an analysis engine to build MVC component models. For instance, an analysis engine may run the discovery queries on input program code and build the following illustrative model.

```
_model = {
    config: { ... },
    MVC: [
        {model: ..., controller: {action1: ..., action2: ... }, view: ...},
        model: ..., controller: {action1: ..., action2: ... }, view: ...},
    ]
}
```

FIG. 14 shows an illustrative hierarchy 1400 of MVC components, in accordance with some embodiments. For example, the hierarchy 1400 may represent MVC components from the above illustrative model, where two actions have been discovered for controller1, but no action has been discovered for controller 2 yet.

In some embodiments, the nouns shown in FIG. 13 may be used to access MVC component models such as those shown in FIG. 14. Any suitable high-level language constructs may be used to query MVC nouns. For example, a query may use Xpath, Jquery, or CSS-like search, and may conveniently return a set of one or more elements.

As one example, the following high-level query written using an Xpath syntax may be used to select all routings implementing a method for a GET request.
//route[@method='get']

In some embodiments, this high-level query may be implemented as follows.

```
var res = [ ];
for (var r of _model.route) {
    (if r['get'] != null)
        res.push[r] ;
}
return res;
```

As another example, the following high-level query written using an Xpath syntax may be used to select the last view in an application. A low-level implementation may be similar to the illustrative implementation shown above for //route[@method='get'].
/app/view[last( )]

As another example, the following high-level query written using an Xpath syntax may be used to select all views having a parent in an AST such that the parent has at least three child nodes. A low-level implementation may be based on how an Xpath interpreter processes such a query.
//view[@ast.parent.children.num>2]

In some embodiments, relationships between nouns may be expressed using verbs, where a verb may be syntactic sugar for a low-level implementation. As one example, a verb bound may have the following syntax.
<View(v)>bound<Controller(_)>

This statement may be implemented as follows.
EXISTS c IN _model.controller:_model.controller[c].view==v As another example, a verb manipulate may have the following syntax.
<ViewResolver(_)> manipulate <View (v)>

This statement may be implemented as follows.
EXISTS r IN _model.view[v]:_model.view[v][r].resolver !=null As another example, a verb call may have the following syntax.
<Request(r)> call <Function(f)>

This statement may be implemented as follows.
_model.request[r].handler=f

As another example, a verb phrase set . . . to . . . may have the following syntax.
<Session> set <Field(f)> to <Value(v)>

This statement be implemented as follows.
_model.session[f]=v

The inventors have appreciated that, in some instances, nouns and verbs may be more convenient to use than the basic constructs of a query language. However, it should be appreciated that aspects of the present disclosure are not limited to the use of nouns or verbs to supplement the syntax of a query language. Furthermore, the techniques described here may be applied to software architectures other than MVC, as aspects of the present disclosure are not so limited.

IV. Model-Based Analysis of Software Applications

Scalable analysis of complex and large software applications has remained a challenge for a long time. An application may contain many components, use various external components (e.g., frameworks, libraries, middleware, etc.), and exhibit a complex architecture. The inventors have recognized and appreciated that there may be a tradeoff between scalability and accuracy. Accurate analysis often involve detailed modeling and rigorous checking, which may provide a deep understanding of semantics of an application, but may require significant time and effort (e.g., both for a human to formulate an analysis and for a machine to perform the analysis). Accordingly, it may be beneficial to provide analysis techniques with improved scalability and accuracy.

The inventors have recognized and appreciated that some solutions may sacrifice accuracy for scalability, while others may sacrifice scalability for accuracy. For example, syntactic analysis (e.g., based on grep) may be used to retrieve information from source code, and data flow analysis (e.g., based on bit propagation) may be used to understand how data is used by an application. The inventors have recognized and appreciated that these techniques may involve over-approximations, which may lead to false positives.

On the other hand, dynamic analysis techniques may apply fewer approximations (e.g. on relationships between components or on variables values) and therefore may be more accurate. However, the inventors have recognized and appreciated that dynamic analysis techniques may have low coverage (e.g., due to computational constraints), which may lead to false negatives.

The inventors have recognized and appreciated that, as more external components such as frameworks and libraries are used in software applications, and as software architectures become more complex, it may be more difficult to achieve both accuracy and scalability. Although a user may model and analyze various portions of an application separately, such an ad hoc approach may be not only tedious, but also unreliable, as interactions between the separately modeled portions may not be modeled adequately.

Accordingly, in some embodiments, techniques are provided for achieving a desirable balance between scalability and accuracy. For example, one or more pieces of information, including, but not limited to, software architecture (e.g., presence of one or more components and/or connections between components), program semantics, domain knowledge (e.g., regarding one or more frameworks, libraries, middleware, etc.), may be used to focus an analysis engine on one or more portions of an application that are relevant for a particular analysis. In some embodiments, such information may be explicitly recorded in one or more models.

In some embodiments, an analysis engine may be programmed to construct an application architecture model for a software application. The application architecture model may include models for individual components in an architecture. Given a certain property of interest, the analysis engine may select one or more relevant component models. The analysis engine may then check the property of interest against the selected component models. Using such a divide-and-conquer approach, the amount of information analyzed by the analysis engine may be reduced, while the risk of missing some relevant information may also be reduced because the component models are constructed based on knowledge of the application's architecture.

In some embodiments, an analysis engine may be programmed to perform incremental analysis as a software application evolves. For example, when a portion of source code is revised or added, the analysis engine may determine one or more component models that are affected, and may re-generate and/or re-analyze only the affected component models. This may significantly improve the analysis engine's response time and hence user acceptance.

In some embodiments, an analysis engine may be programmed to analyze an application adaptively. For instance, given a certain property of interest, the analysis engine may select one or more types of models that may be suitable for use in checking that property. The analysis engine may then construct and analyze one or more models of a selected type. In some embodiments, a model may be constructed by abstracting away information that is irrelevant for the property to be checked, thereby improving efficiency of the analysis engine.

Figure 15:
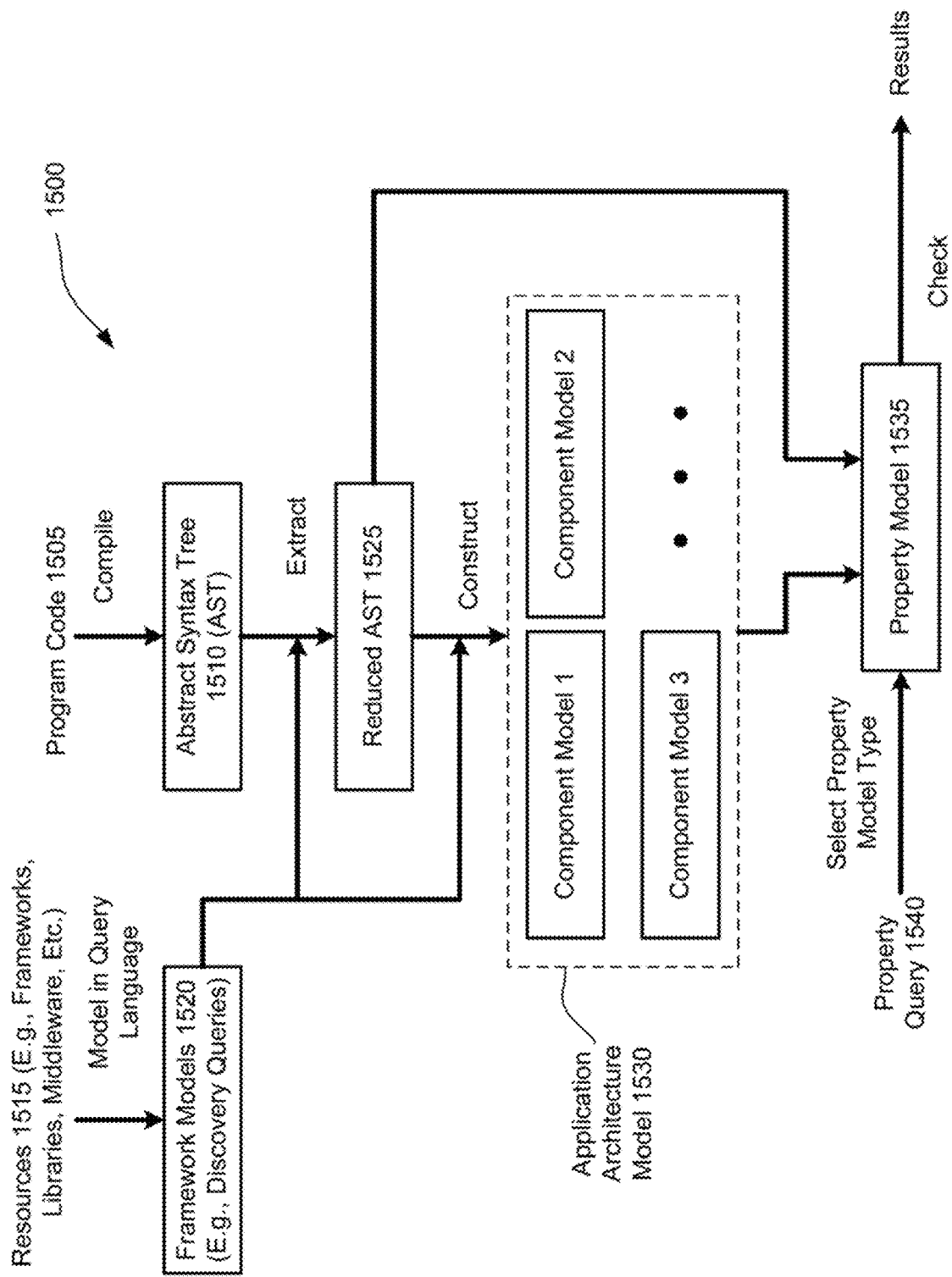
FIG. 15 shows an illustrative network 1500 of models that may be used to facilitate analysis of a software application, in accordance with some embodiments.

FIG. 15 shows an illustrative network 1500 of models that may be used to facilitate analysis of a software application, in accordance with some embodiments. For instance, the illustrative models shown in FIG. 15 may be used by an analysis engine (e.g., the illustrative analysis engine 105 shown in FIG. 1) to check input program code 1505 with respect to one or more properties of interest.

In the example shown in FIG. 15, the input program code 1505 may use one or more external components 1515. Examples of external components include, but are not limited to, frameworks, libraries, middleware, etc. Framework models 1520 for the external components 1515 may be built using a query language (e.g., via discovery queries), and may represent abstractions of the external components 1515 (e.g., for purposes of security analysis) and/or interactions between the external components 1515. In some embodiments, framework models may be indexed and stored in a database, and may be retrieved as needed.

In some embodiments, the input program code 1505 may be compiled into a suitable representation, such as an AST 1510. A reduced AST 1525 may then be constructed by applying one or more discovery queries from the framework models 1520 to extract relevant information from the AST 1510. For instance, the discovery queries may be used to identify and extract information in the AST 1510 that is relevant for security analysis, and the extracted information may be stored in the reduced AST 1525.

In the example shown in FIG. 15, the framework models 1520 and the reduced AST 1525 are used to construct an application architecture model 1530. The application architecture model 1530 may include high-level information such as software architecture (e.g., one or more components and/or connections between the components), program semantics, and/or domain knowledge (e.g., regarding one or more frameworks, libraries, middleware, etc.). For example, the application architecture model 1530 may include models for individual components in a software architecture, such as component model 1, component model 2, component model 3, etc. shown in FIG. 15.

In the example shown in FIG. 15, the network 1500 further includes a property model 1535. In some embodiments, an analysis engine may receive as input a property query 1540, which may capture semantics of a property of interest (e.g., a certain security property). Based on the property query 1540, the analysis engine may select an appropriate property model type and construct a property model of the selected type. For instance, the property model 1535 may be of the selected type, and may be derived by the analysis engine from the reduced AST 1525 and/or the application architecture model 1530. The analysis engine may then check the property model 1535 to determine if the property of interest is satisfied.

In some instances, the application architecture model 1530 may include sufficient high-level information to allow an analysis engine to determine if a certain property is satisfied, without analyzing low-level source code. This may allow the analysis engine to produce a result more quickly, thereby improving user experience. For example, values of configuration parameters may be extracted from input program code and may be stored in the application architecture model 1530 (e.g., in a table). When one or more such values are needed, an analysis engine may simply retrieve the one or more needed values from the application architecture model 1530, without having to look for such values in the input program code. However, it should be appreciated that aspects of the present disclosure are not limited to storing configuration parameter values in an application architecture model.

It should be appreciated that details of implementation are shown in FIG. 15 and described above solely for purposes of illustration, as aspects of the present disclosure are not limited to any particular manner of implementation. For instance, aspects of the present disclosure are not limited to the use of any reduced AST. In some embodiments, the AST 1510, instead of the reduced AST 1525, may be used to generate the application architecture model 1530.

FIG. 16 shows illustrative framework models 1600 and 1605, in accordance with some embodiments. The framework models 1600 and 1605 may be used by an analysis engine (e.g., the illustrative analysis engine 300 shown in FIG. 3) to generate an application architecture model (e.g., the illustrative application architecture model 310 shown in FIG. 3).

The inventors have recognized and appreciated that an external component used by a software application (e.g., framework, library, middleware, etc.) may include a large amount of code. For example, the Express framework's source code includes around 12,000 lines of JavaScript code. Therefore, it may be desirable to provide an abstraction that represents semantics of a resource in a concise way. Without such an abstraction, an analysis engine may be unable to analyze a resource quickly enough to deliver results in real time.

In some embodiments, a framework model may include a specification of relevant information about a resource. For example, a framework model may be defined using a query language having one or more constructs such as the illustrative constructs shown in FIG. 8 and discussed above.

In the example shown in FIG. 16, the framework models 1600 and 1605 represent semantics of the Express framework and the Express Session middleware, respectively. For instance, the framework model 1600 may reflect how routes are defined. Additionally, or alternatively, the framework model 1600 may define framework APIs. In some embodiments, the framework model 1600 may include about 100 lines of code, which is a significant reduction from the actual size of the Express framework (about 12,000 lines).

FIG. 16 shows an illustrative source code fragment 1610 that uses the Express framework and the Express Session middleware. In some embodiments, an analysis engine may be programmed to replace references to the Express framework and the Express Session middleware with references to the respective framework models, resulting in illustrative code fragment 1615. In this manner, framework models (e.g., the illustrative framework models 1600 and 1605 shown in FIG. 6) may be loaded, rather than source code of the Express framework and the Express Session middleware.

FIG. 16 also shows an illustrative source code fragment 1620 that uses an HTTP middleware and a Path middleware. The inventors have recognized and appreciated that some external components may not be relevant for a property of interest and therefore a model for such a resource need not be defined or loaded. This may reduce complexity and thereby improve performance of an analysis engine.

In some embodiments, one or more of the following properties may be of interest.
1. Is an httpOnly flag set to true in a session cookie?
2. In any route related to /users, is there a JavaScript injection?
3. In any route related to user signup, is a user name properly checked?

For these properties, session cookie and routes may be relevant, whereas other middleware such as HTTP and Path may not be relevant. Accordingly, in some embodiments, an analysis engine may be programmed to ignore references to the HTTP middleware and the Path middleware, as well as all subsequent code related to the HTTP middleware and the Path middleware. For instance, a mapping between types of properties and relevant middleware may be defined based on domain knowledge, and the analysis engine may be programmed to use the mapping to identify middleware that may be ignored.

FIG. 17 illustrates an approach for programming an analysis engine to perform a field and type analysis, in accordance with some embodiments. For example, a query language may be used to program the analysis engine to perform a field and type analysis. In some embodiments, the query language may include one or more constructs such as the illustrative constructs shown in FIG. 8 and discussed above.

In some embodiments, a query language may be used to program an analysis engine to track names and types of fields in an object, and/or names and types of member functions in the object. These names and types may be matched with known signatures to infer a role of an object and/or a role of a function using the object.

For instance, a route function in the Express framework may have the following signature, and a query language may be used to program an analysis engine to determine if a function matches this signature.

function test(req, res, . . . )

The request object req may contain one or more of the following fields:
body
session
etc.

The response object res may contain one or more of the following functions:
render, with argument type String×Object
session, with argument type String
etc.

FIG. 17 shows illustrative function declarations 1700, 1705, and 1710. In some embodiments, the analysis engine may be programmed to determine that in the illustrative declaration 1700, a login function has two arguments, req and res, where the object res has a member function render with argument type String×Object. This may match the above signature, and the analysis engine may infer that login is likely a route function. Such an inference may be made even if there is not a perfect match. For instance, the analysis engine may infer that login is a route function even though the object req does not contain any field.

In some embodiments, the analysis engine may be programmed to determine that in the illustrative declaration 1705, a signup function has three arguments, req, res, and next, where req has a field body, and res has a member function render with argument type String×Object and a member function redirect of argument type String. This may match the above signature (even though the name redirect does not match the name session). Therefore, the analysis engine may infer that signup is a route function.

In some embodiments, the analysis engine may be programmed to determine that in the illustrative declaration 1710, a test function has three arguments, req, res, and next, where req has a field body, but res has no member function. Therefore, the analysis engine may determine it is unlikely that test is a route function.

Below are examples of queries that may be used to program an analysis engine to perform a field and type analysis (e.g., by performing syntactic pattern matching).

Looking for a function of the form $f(req^*, res^*)$.
PERFORM _model.routes['/UNKNOWN']['UNKNOWN']=$f$
WHEN function $f(\$1, \$2)$
WHERE $1.ast.name.startsWith('req') AND $2.ast.name.startsWith('res')

Looking for a function with a first argument that has a member function session, body, or params, or a second argument that has a member function render or redirect.
PERFORM _model.routes['/UNKNOWN']['UNKNOWN']=$f$
WHEN function $f(\$1, \$2)$ {$1.session OR $1.body OR $1.params OR $2.render OR $2.redirect}

In some embodiments, an analysis engine may be programmed by a framework model to perform a field and type analysis to infer a role of an object and/or a role of a function using the object. The framework model may include one or more queries written in a query language. An inferred role for an object (or function) may be stored in an application architecture model in association with that object (or function). For instance, one or more discovered routes may be stored in a route model.

FIG. 18A shows an illustrative application 1800 and illustrative component models 1805 and 1810, in accordance with some embodiments. In this example, the application 1800 is written using the Express framework. In some embodiments, an analysis engine may be programmed to apply a framework model for the Express framework (e.g., the illustrative framework model 1600 shown in FIG. 16) to construct an application architecture model for the application 1800. The application architecture model may include one or more component models, such as the component models 1805 and 1810 shown in FIG. 18A. The component model 1805 may be a configuration model, and the component model 1810 may be a route model. For instance, in some embodiments, the component models 1805 and 1810 may be generated using the illustrative framework models 1600 and 1605 shown in FIG. 16. For example, the analysis engine may interpret the framework models 1600 and 1605 the source code 1800, thereby generating the components models 1805 and 1810 as output.

Figure 18B:
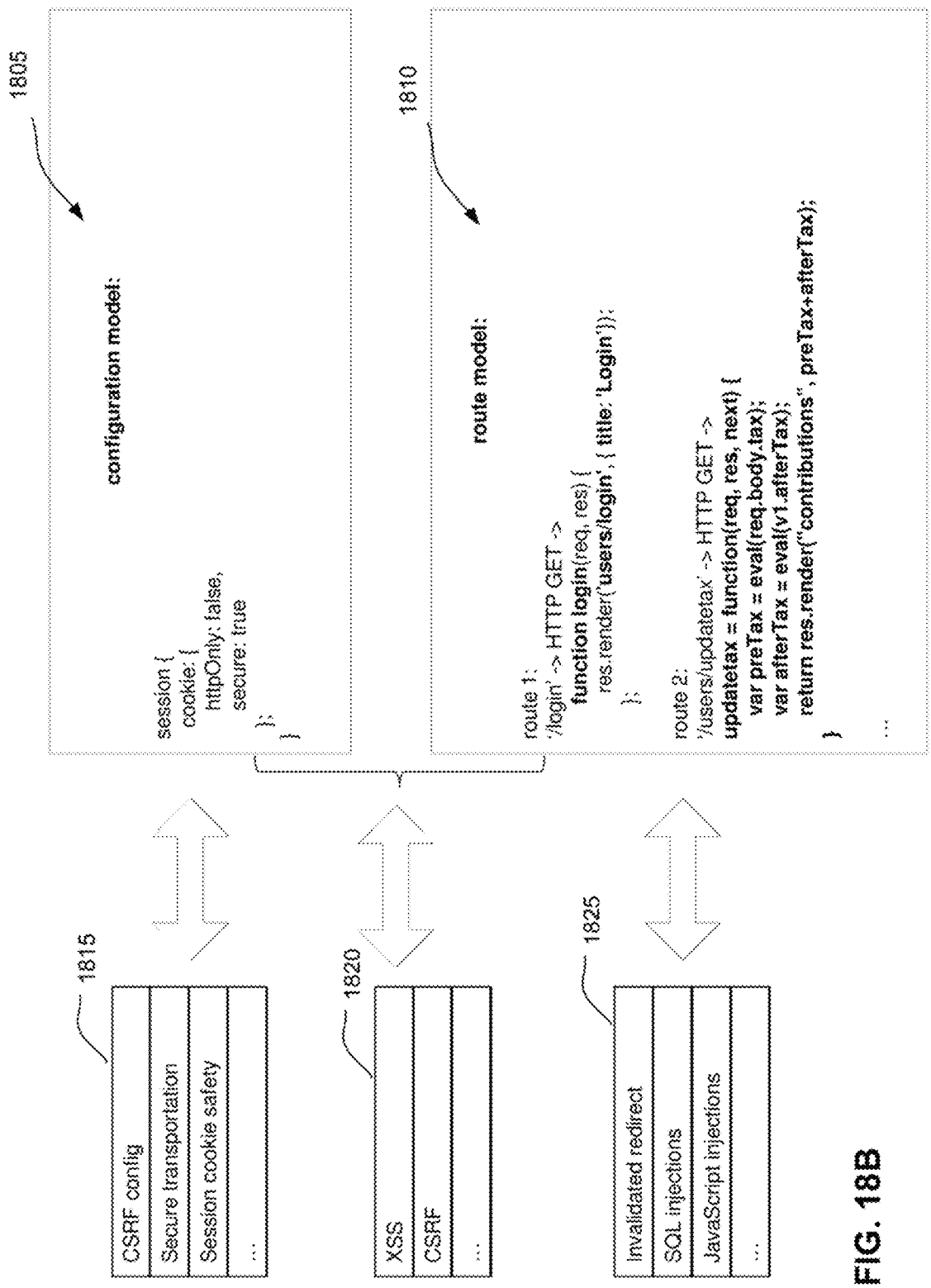
FIG. 18B shows illustrative groups 1815, 1820, and 1825 of security issues that may be checked by an analysis engine, in accordance with some embodiments.

FIG. 18B shows illustrative groups 1815, 1820, and 1825 of security issues that may be checked by an analysis engine, in accordance with some embodiments. The inventors have recognized and appreciated that by constructing models for individual components in an architecture, an analysis engine may be able to quickly identify relevant information to be analyzed and safely disregard irrelevant information. As one example, to check configuration-related issues 1815 such as Cross-Site Request Forgery (CSRF), configuration, secure transportation, session cookie safety, etc., the analysis engine may focus on the configuration model 1805. As another example, to check per-route issues 1825 such as invalidated redirect, SQL injections, JavaScript injections, etc., the analysis engine may focus on the route model 1810. By contrast, both the configuration model 1805 and the route model 1810 may be relevant for security issues in the group 1820, so the analysis engine may analyze both models when checking an issue from the group 1820.

In some embodiments, a mapping between types of properties and respective components may be defined based on domain knowledge, and the analysis engine may be programmed to use the mapping to select one or more relevant components for a certain property to be checked. In this manner, the amount of information analyzed by the analysis engine may be reduced, which may improve the analysis engine's performance, while the risk of missing some relevant information may also be reduced because the component models are constructed based on knowledge of the application's architecture.

Figure 18E:
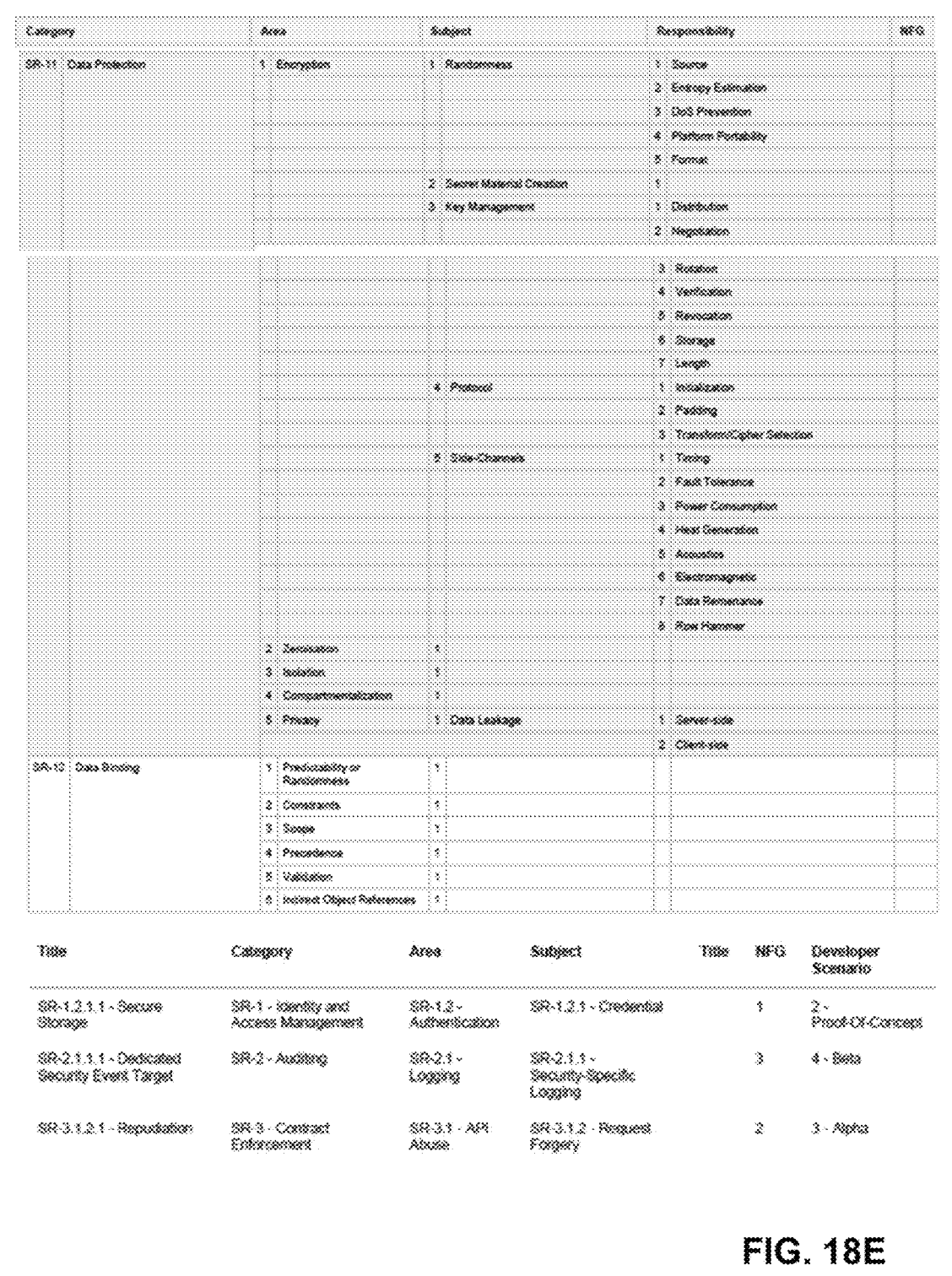

FIGS. 18C-E show an illustrative taxonomy of security responsibilities, in accordance with some embodiments. Such a taxonomy may be created by a security expert and may be use to characterize functional responsibilities of components in various frameworks.

FIG. 18F-G show an illustrative mapping from application components to security responsibilities, in accordance with some embodiments. For example, the mapping shown in FIG. 18F-G may be created by a security expert based on knowledge of a particular framework (e.g., an MVC framework) and may map each component in the framework to one or more security responsibilities (e.g., one or more of the illustrative security responsibilities shown in FIGS. 18C-E). Such a mapping may, in some embodiments, be used to select one or more relevant components for a certain security property to be checked.

It should be appreciated that the taxonomy shown in FIGS. 18C-E and the mapping shown in FIGS. 18F-G are provided solely for purposes of illustration, as aspects of the present disclosure are not limited to any particular taxonomy of security responsibilities, or to any particular way to align application components with a taxonomy.

FIG. 19 shows a plurality of illustrative types of property models that may be used by an analysis engine to check a property of interest, in accordance with some embodiments. For instance, an analysis engine may be programmed to determine which one or more types of property models may be appropriate for use in checking a certain property of interest. Additionally, or alternatively, the analysis engine may be programmed to generate a property model of a selected type for a software application, and analyze the property model to determine whether the software application satisfies a property of interest.

The inventors have recognized and appreciated that different types of property models may be suitable for investigating different types of properties. As one example, a call graph may be used to capture function call relationships, whereas a data flow graph may be used to capture data dependence information (e.g., how a tainted value is propagated). As another example, a type system may be used to record types of variables and objects. As another example, an abstract numeric value estimation may be used to estimate possible values of numeric variables, whereas a string value estimation may be used to estimate possible values of string variables. As another example, a heap shape model may be used to capture pointer relationships between components in a heap. As another example, predicate abstraction may be used to capture relationships between values of variables. FIG. 20 shows an illustrative mapping from types of properties to types of property models, in accordance with some embodiments.

The inventors have further recognized and appreciated that different types of property models may offer different advantages. For instance, as shown in FIG. 19, property model types at the top (e.g., call graph, data graph, and type system) may be more abstract, and hence easier to compute but less precise. By contrast, property model types at the bottom (e.g., abstract numeric value estimation and string value estimation) may be more detailed, and hence more precise but harder to compute. Therefore, it may be beneficial to provide techniques for selecting an appropriate type of property model to achieve a desired balance between efficiency and accuracy.

Figure 21:
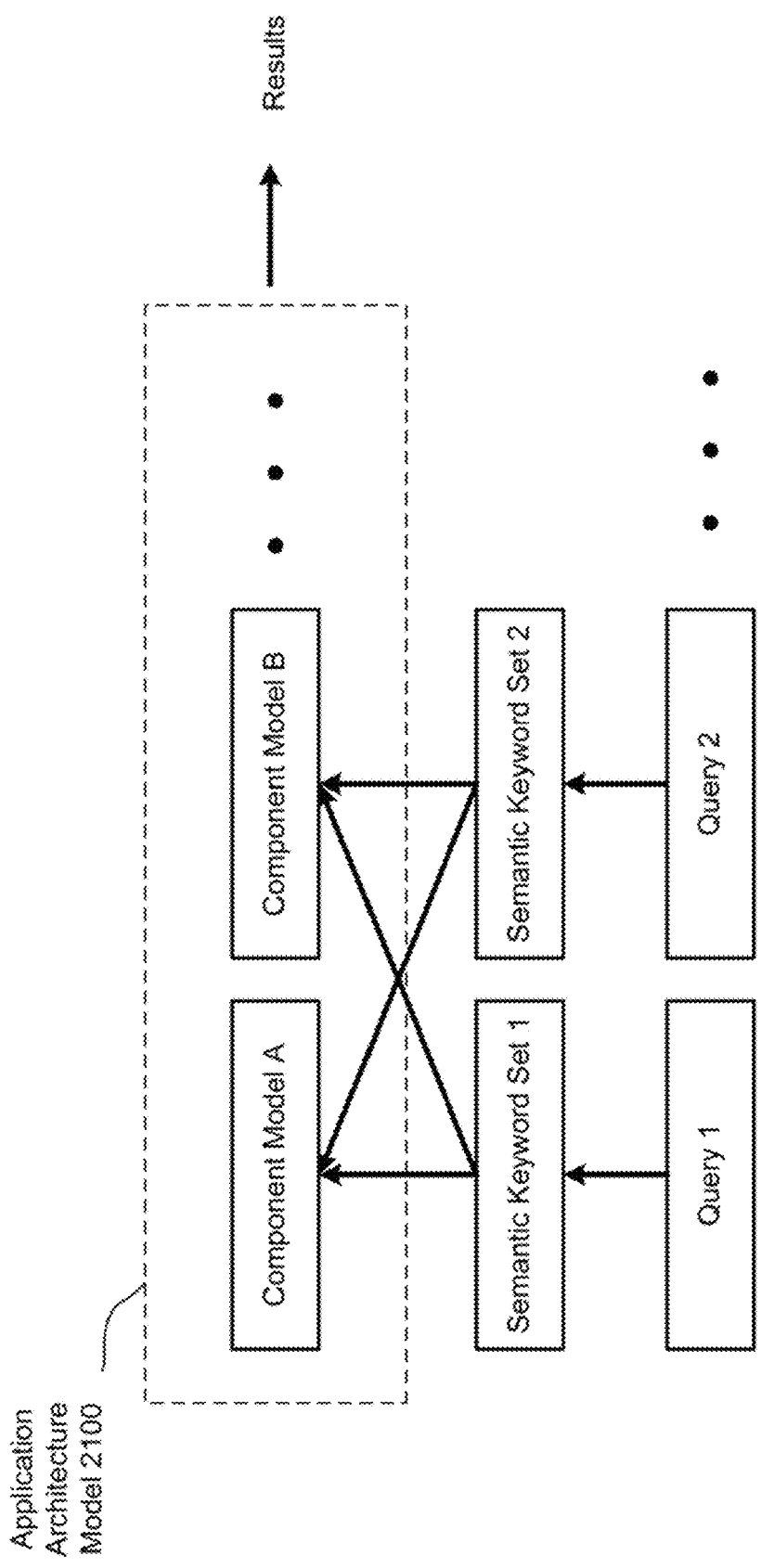
FIG. 21 shows an illustrative process for selecting one or more types of property models and using property models of the selected types to analyze a software application, in accordance with some embodiments.

FIG. 21 shows an illustrative process for selecting one or more property model types and using property models of the selected types to analyze a software application, in accordance with some embodiments. For example, the process shown in FIG. 21 may be used by an analysis engine (e.g., the illustrative analysis engine 105 shown in FIG. 1) to check input program code with respect to one or more properties of interest. For instance, a set of keywords may be retrieved from a property query. Then, for each keyword, a set of one or more relevant component models may be analyzed to generate one or more property models.

FIG. 21 shows an illustrative application architecture model 2100. In some embodiments, the application architecture model 2100 may be built by applying one or more framework models to input program code (e.g., as discussed above in connection with FIG. 15). The application architecture model 2100 may include high-level information such as software architecture (e.g., one or more components and/or connections between the components), program semantics, and/or domain knowledge (e.g., regarding one or more frameworks, libraries, middleware, etc.). For example, the application architecture model 2100 may include models for individual components in a software architecture, such as component model A and component model B shown in FIG. 21.

FIG. 21 also shows illustrative query 1 and illustrative query 2, which may each define a property to be checked. In some embodiments, an analysis engine may be programmed to select one or more property model types for a query such as query 1 or query 2. For instance, a query may be defined using a query language having one or more constructs such as the illustrative constructs shown in FIG. 8 and discussed above. The analysis engine may be programmed to parse the query based on a syntax of the query language, and to identify one or more semantic predicates from the query. In the example shown in FIG. 21, a semantic keyword set 1 is extracted from query 1, a semantic keyword set 2 is extracted from query 2, and so on.

In some embodiments, the analysis engine may select one or more property model types based on the identified semantic predicates. For instance, the analysis engine may use the identified semantic predicates to match the query to one of the illustrative property types shown in FIG. 20, and then use the illustrative mapping shown in FIG. 20 to determine an appropriate type of property model.

In some embodiments, the analysis engine may identify, for a component model in the application architecture model 2100 (e.g., the component model A or the component model B), one or more property model types for which the component model is relevant. For instance, the analysis engine may determine, for each query and each property model type associated with the query, whether the component model is relevant to the property model type (e.g., using one or more techniques described above in connection with FIGS. 18A-B). If the component model is determined to be relevant to the property model type, a property model of that type may be built based on that component model, and the property model may be analyzed. A result of that analysis may be output as a result for the query. In some embodiments, the analysis engine may group and/or prioritize analysis results from checking various property models. However, that is not required, as in some embodiments grouping and/or prioritization may be performed by a guidance engine, or may not be performed at all.

The inventors have recognized and appreciated that the illustrative process shown in FIG. 21 may be used advantageously to improve efficiency of an analysis engine. As one example, if a semantic predicate identified from a query is concerned with only types and Boolean/numeric values of some variables, then only type system analysis and numeric value estimation may be performed, and only for the variables involved.

The inventors have further recognized and appreciated that if a property is disproved using a more abstract model, then there may be no need to build and analyze a more detailed model. Accordingly, in some embodiments, an analysis engine may be program to perform analysis adaptively, for example, beginning with more abstract models and using more detailed models only as needed.

Figure 22:
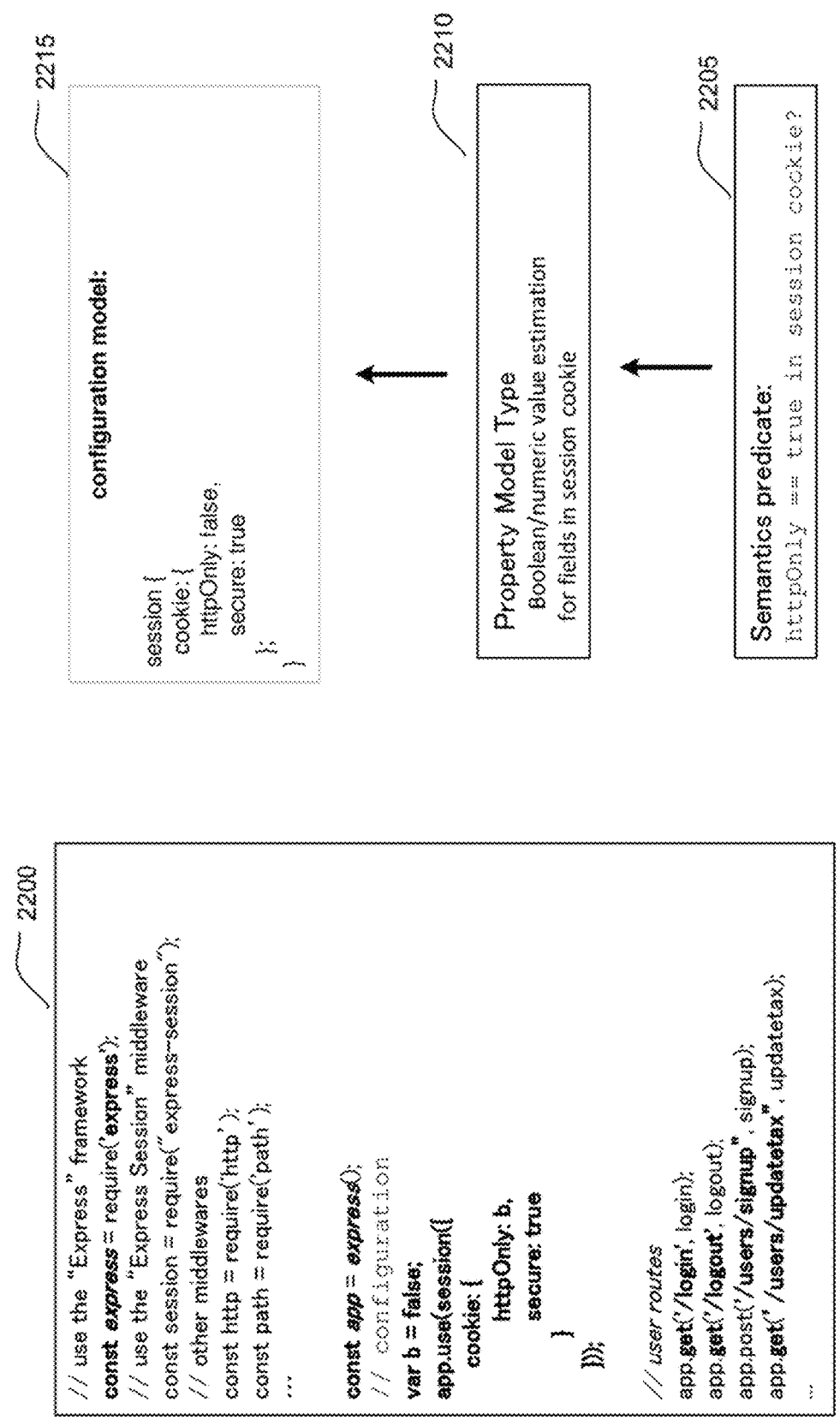
FIG. 22 shows an illustrative application 2200 and an illustrative analysis of the application 2200, in accordance with some embodiments.

FIG. 22 shows an illustrative application 2200 and an illustrative analysis of the application 2200, in accordance with some embodiments. In this example, the application 2200 is written using the Express framework. In some embodiments, an analysis engine may be programmed to apply a framework model for the Express framework (e.g., the illustrative framework model 1600 shown in FIG. 16) to construct an application architecture model for the application 2000. The application architecture model may include one or more component models, such as the illustrative configuration model 2215 shown in FIG. 22.

In some embodiments, a query may be specified based on the following property, and an analysis engine may be programmed to identify from the query a semantic predicate, such as the illustrative semantic predicate 2205 shown in FIG. 22.

Is an httpOnly flag set to true in a session cookie?
Illustrative semantic predicate in a query language:
model.setting.cookie.httpOnly=true In some embodiments, the analysis engine may select, based on the semantic predicate 2205, one or more types of property models. For example, the analysis engine may determine at 2210 (e.g., using one or more techniques described in connection with FIG. 21) that Boolean or numeric value estimation is to be performed for fields in session cookie. The analysis engine may further determine (e.g., using one or more techniques described in connection with FIG. 21) that the configuration model 2215 is relevant for Boolean or numeric value estimation for fields in session cookie. The analysis engine may then perform Boolean or numeric value estimation for fields in session cookie on the configuration model 2215 and output a result that the httpOnly flag is not set to true in session cookie.

Figure 23:
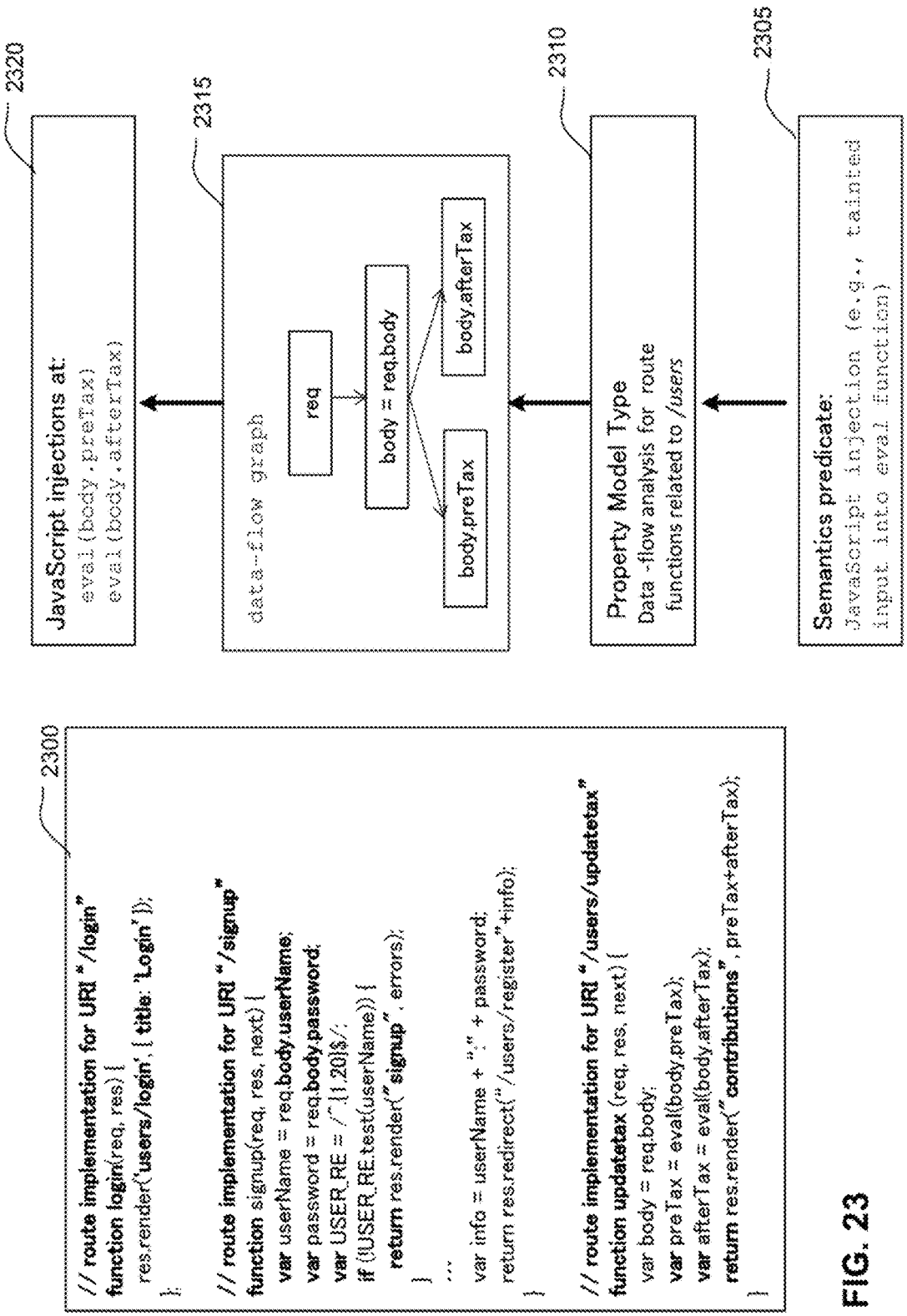
FIG. 23 shows illustrative program code 2300 and an illustrative analysis of the program code 2300, in accordance with some embodiments.

FIG. 23 shows illustrative program code 2300 and an illustrative analysis of the program code 2300, in accordance with some embodiments. The program code 2300 may be an implementation of the illustrative application 2200 shown in FIG. 22.

In some embodiments, a query may be specified based on the following property, and an analysis engine may be programmed to identify from the query a semantic predicate, such as the illustrative semantic predicate 2305 shown in FIG. 23.

In any route related to/users, is there a JavaScript injection?
Illustrative semantic predicate in a query language:
<{eval($1)}> WHERE $1.tainted=true In some embodiments, the analysis engine may select, based on the semantic predicate 2305, one or more types of property models. For example, the analysis engine may determine at 2310 (e.g., using one or more techniques described in connection with FIG. 21) that data flow analysis is to be performed to calculate "tainted" values for route functions related to/users. The analysis engine may then analyze the program code 2300 (or an AST of the program code 2300) and construct a data flow graph 2315. Using the data flow graph 2315, the analysis engine may determine that JavaScript injections are present at eval(body.preTax) and eval(body.afterTax), and may output a result at 2320 accordingly.

Figure 24:
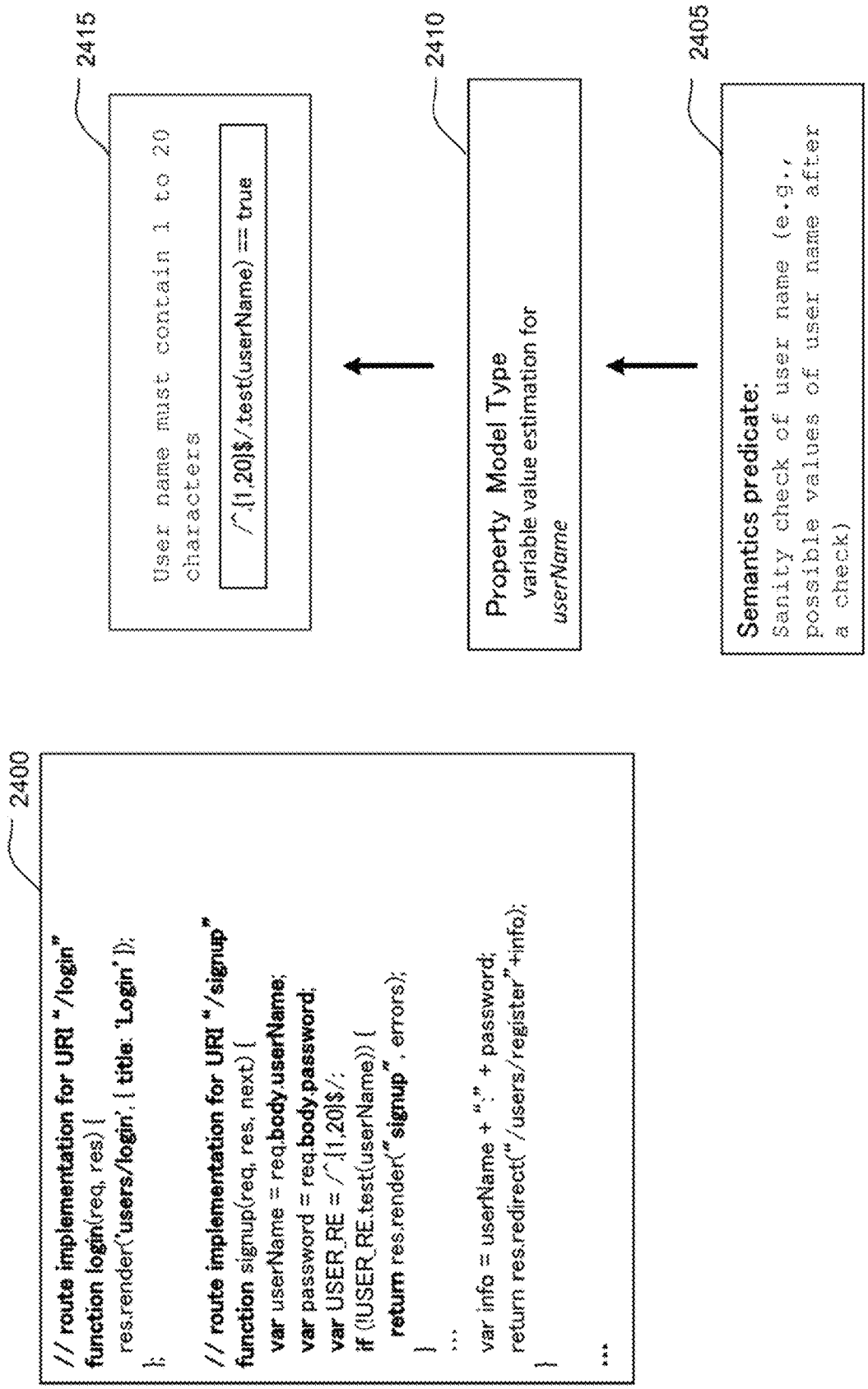
FIG. 24 shows illustrative program code 2400 and an illustrative analysis of the program code 2400, in accordance with some embodiments.

FIG. 24 shows illustrative program code 2400 and an illustrative analysis of the program code 2400, in accordance with some embodiments. The program code 2400 may be an implementation of the illustrative application 2200 shown in FIG. 22.

In some embodiments, a query may be specified based on the following property, and an analysis engine may be programmed to identify from the query a semantic predicate, such as the illustrative semantic predicate 2405 shown in FIG. 24.

In any route related to user signup, is a user name properly checked (e.g. can the user name be empty when the user name is used for redirecting a page)?
Illustrative semantic predicate in a query language:
<{$0.redirect(_+$2)}> WHERE $2=' '.

In some embodiments, the analysis engine may select, based on the semantic predicate 2405, one or more types of property models. For example, the analysis engine may determine at 2410 (e.g., using one or more techniques described in connection with FIG. 21) that variable value estimation is to be performed for userName. The analysis engine may then perform variable value estimation for userName and output a result that the user name must contain one to 20 characters.

Figure 25:
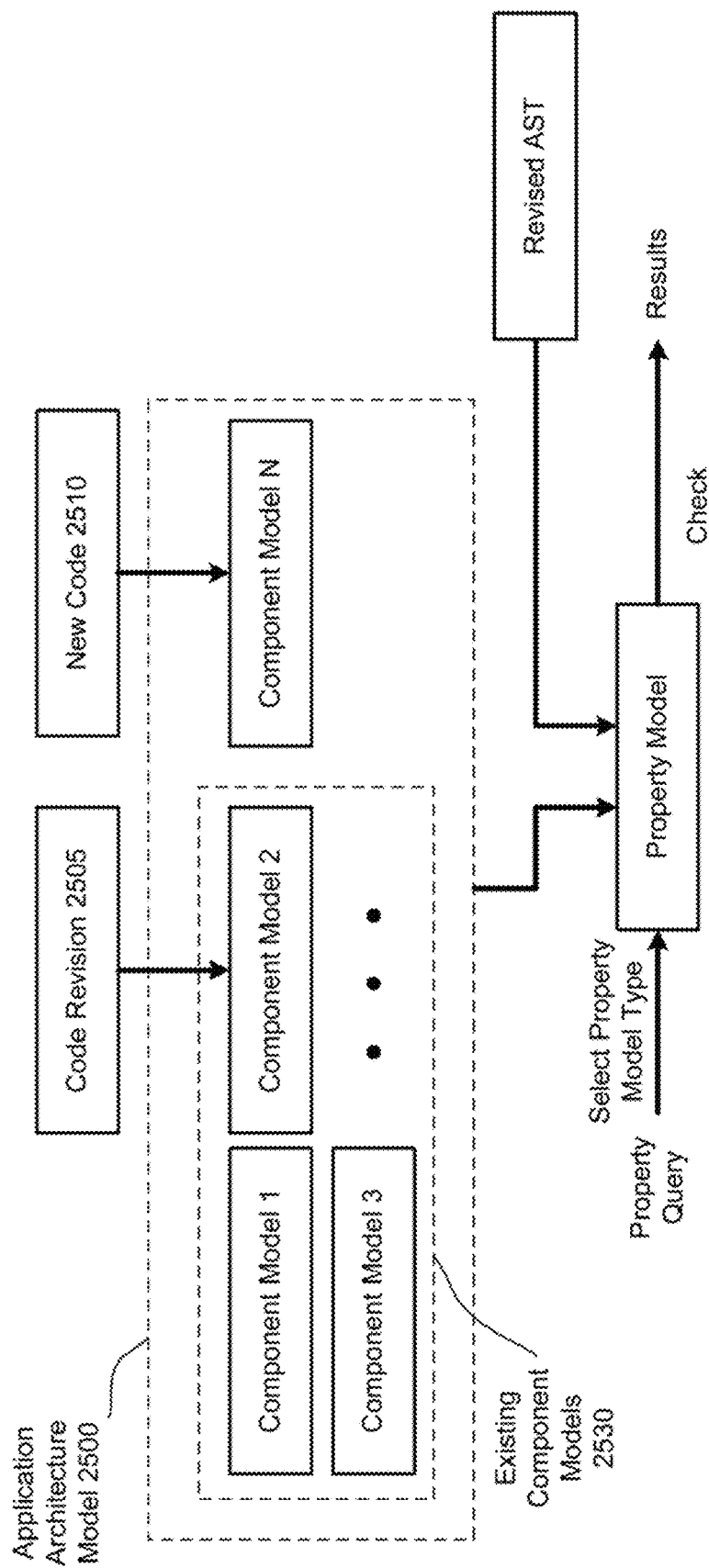
FIG. 25 shows an illustrative application architecture model 2500, in accordance with same embodiments.

FIG. 25 shows an illustrative application architecture model 2500, in accordance with same embodiments. Like the illustrative application architecture model 1530 shown in FIG. 15, the application architecture model 2500 in the example of FIG. 25 includes models for individual components in a software architecture. In some embodiments, the application architecture model 2500 may be an updated version of the application architecture model 1530. For example, an analysis engine may be programmed to update the application architecture model 1530 based on code changes to generate the application architecture model 2500.

The inventors have recognized and appreciated that when a developer modifies program code (e.g., by revising existing code and/or adding new code), regenerating the entire application architecture model 1530 may involve unnecessary computation. For example, the code changes may affect only some, but not all, of the component models in the application architecture model 1530. The inventors have recognized and appreciated that regenerating an unaffected component model may result in an identical component model. Accordingly, in some embodiments, techniques are provided for identifying one or more component models affected by certain changes and regenerating only the affected component models, which may improve an analysis engine's response time significantly.

The inventors have further recognized and appreciated that when a developer modifies program code (e.g., by revising existing code and/or adding new code), re-checking a property that is unaffected by the code changes may involve unnecessary computation. Accordingly, in some embodiments, techniques are provided for determining if a property is affected by certain code changes. An analysis engine may re-check only properties that are affected, which may also improve the analysis engine's response time significantly.

In the example shown in FIG. 25, code changes include code revision 2505. An analysis engine may be programmed to identify one or more component models (e.g., component model 2) that are affected by the code revision 2505. For example, if the code revision 2505 involves changes to a certain function only, and the function relates to a route definition, then the analysis engine may re-analyze only that route. Previous results relating to unchanged code may still be valid.

In the example shown in FIG. 25, code changes include new code 2510. In some embodiments, the analysis engine may be programmed to determine if the new code 2510 adds a component to the software application that is being analyzed. If it is determined that the new code 2510 adds a component to the software application that is being analyzed, the analysis engine may generate a new component model N, as shown in FIG. 25. The analysis engine may be further programmed to determine if any property is affected by the presence of the new component model N. If it is determined that a property is affected by the presence of the new component model N, the analysis engine may re-check that property.

In some embodiments, one or more incremental analysis techniques, such as those described in connection with FIG. 25, may be used to construct an application architecture model asynchronously. For example, different components in a software application may become available at different times. Whenever a new component becomes available, a new component model may be generated for that component, and affected properties may be re-checked. In this manner, an analysis engine may be able to return results quickly at each incremental step, rather than doing all of the computations after all components have become available.

FIG. 26A shows an illustrative application 2600 and an illustrative implementation 2605 of route functions in the application 2600, in accordance with some embodiments. In this example, the application 2600 includes a revision at 2610 to an assignment of a variable b, and the implementation 2605 includes revisions at 2615 to assignments of two variables, preTax and afterTax, as well as a new route function logout at 2620.

Figure 26B:
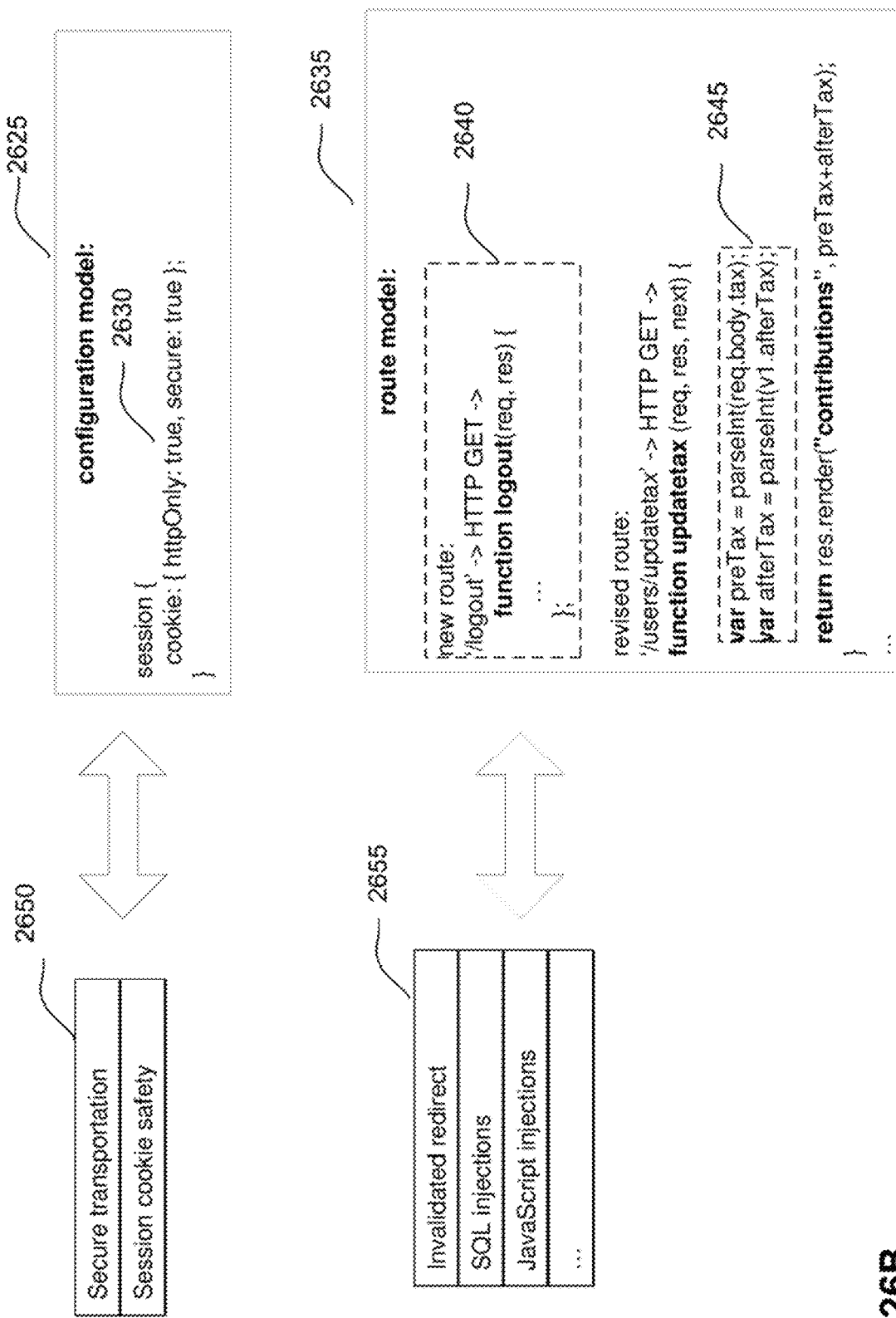
FIG. 26B shows an illustrative revised configuration model 2625 and an illustrative revised route model 2635, in accordance with some embodiments.

FIG. 26B shows an illustrative revised configuration model 2625 and an illustrative revised route model 2635, in accordance with some embodiments. For instance, an analysis engine may be programmed to determine that the revision at 2610 of FIG. 26A affects only the configuration model, and to generate the revised configuration model 2625 to reflect, at 2630, the revision to the assignment of the variable b. Furthermore, the analysis engine may be programmed to determine that only properties 2650 are affected by a change in the configuration model. Therefore, the analysis engine may check only the properties 2650 against the revised configuration model 2625.

Similarly, the analysis engine may be programmed to determine that the revisions at 2615 and 2620 of FIG. 26A affect only the route model, and to generate the revised route model 2635 to reflect, at 2640, the new route function logout and, at 2645, the revisions to the assignments of preTax and afterTax. Furthermore, the analysis engine may be programmed to determine that only properties 2655 are affected by a change in the route model. Therefore, the analysis engine may check only the properties 2655 against the revised route model 2635.

V. Graph-Based Analysis of Software Applications

In some embodiments, one or more results output by an analysis engine may be consumed by a guidance engine programmed to provide customized and actionable guidance to a developer when a problem is identified. For instance, the guidance engine may be programmed to select, based on the one or more results output by the analysis engine, an appropriate modality for aiding a user who wrote the input program code. Additionally, or alternatively, the guidance engine may be programmed to select, based on the one or more results, appropriate content from a content store. For example, if the one or more results includes a finding indicative of a security vulnerability, the guidance engine may present to the user a textual or video message explaining the vulnerability, and/or an in-depth training module. Additionally, or alternatively, if the one or more results includes a suggested modification to the input program code, the guidance engine may present to the user a textual or video message explaining the suggested modification, and/or modified program code ready to be tested in a sandbox.

Figure 27:
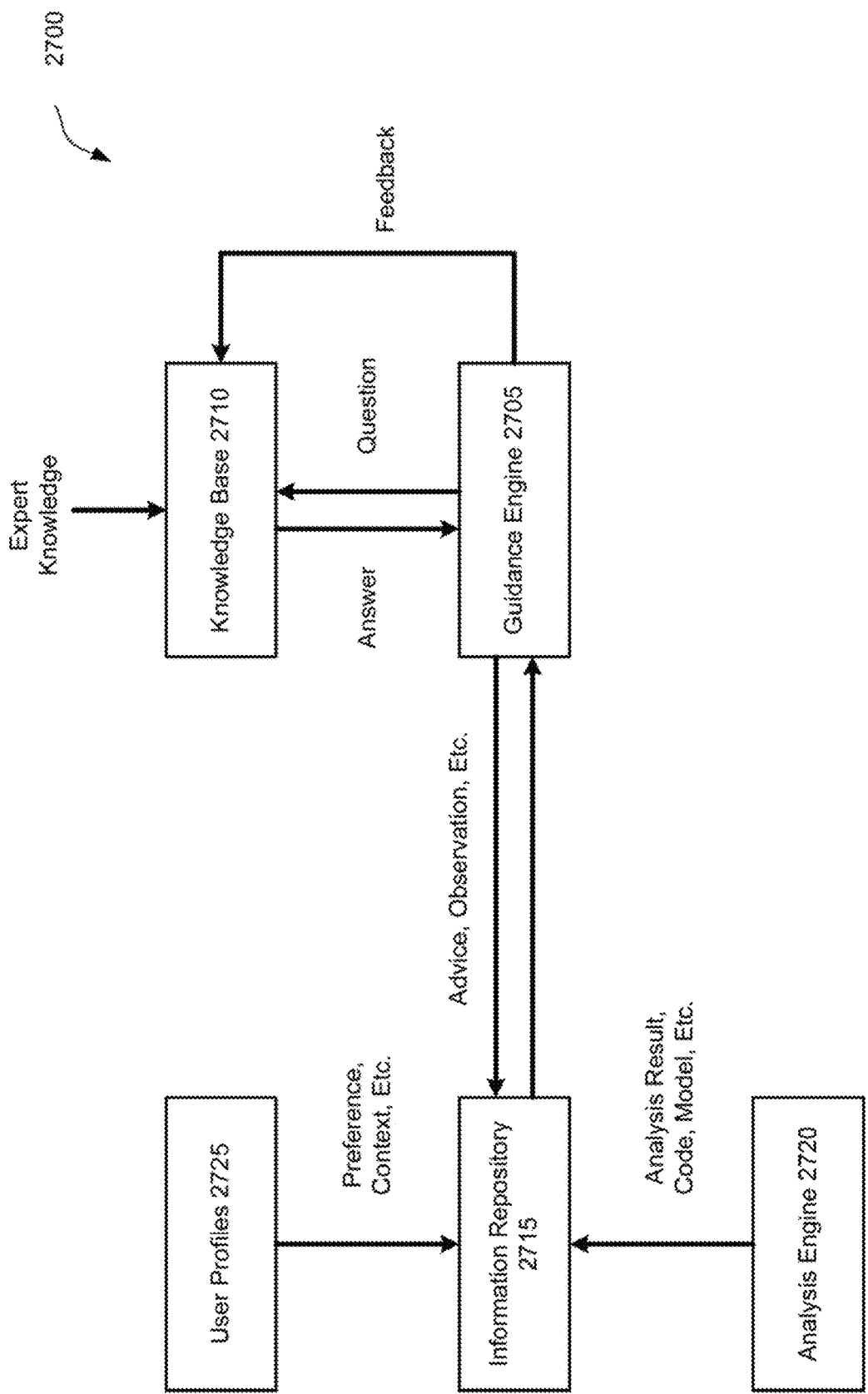
FIG. 27 shows an illustrative system 2700 for providing guidance to a developer, in accordance with some embodiments.

FIG. 27 shows an illustrative system 2700 for providing guidance to a developer, in accordance with some embodiments. In this example, the system 2700 includes a guidance engine 2705, a knowledge base 2710, an information repository 2715, an analysis engine 2720, and user profiles 2725. In some embodiments, the guidance engine 2705 may be an implementation of the illustrative guidance engine 110 shown in FIG. 1, and the analysis engine 2720 may be an implementation of the illustrative analysis engine 105 shown in FIG. 1.

In some embodiments, the knowledge base 2710 may store a collection of information regarding software development. For example, the knowledge base 2710 may store information regarding certain security vulnerabilities and/or how such vulnerabilities manifest in different types of software (e.g., software written using different languages, frameworks, libraries, etc.). Additionally or alternatively, the knowledge base 2710 may store information indicating how certain security vulnerabilities may be patched (e.g., suggested code transformations to fix identified problems). However, it should be appreciated that the techniques described herein may be used to provide guidance relating to any suitable type of properties (e.g., correctness, robustness, safety, liveness, etc.) in addition to, or instead of, security properties.

The information stored in the knowledge base 2710 may be represented in any suitable manner. For instance, in some embodiments, the knowledge base 2710 may include a knowledge graph having one or more nodes and/or one or more edges. Each node may represent a certain concept, such as a code transformation, a condition, a framework, a piece of metadata, a constraint (e.g., a functionality to be preserved when fixing an identified problem), etc. Each edge may represent a relationship between a source node and a target node, where the target node may be different from, or the same as, the source node.

For example, one or more nodes in the knowledge graph may correspond, respectively, to one or more nouns in a query language (e.g., the illustrative nouns shown in FIG. 13). An edge may correspond to a verb that expresses a relationship between two nouns. However, it should be appreciated that aspects of the present disclosure are not limited to the use of a knowledge graph with nouns and verbs.

Figure 28:
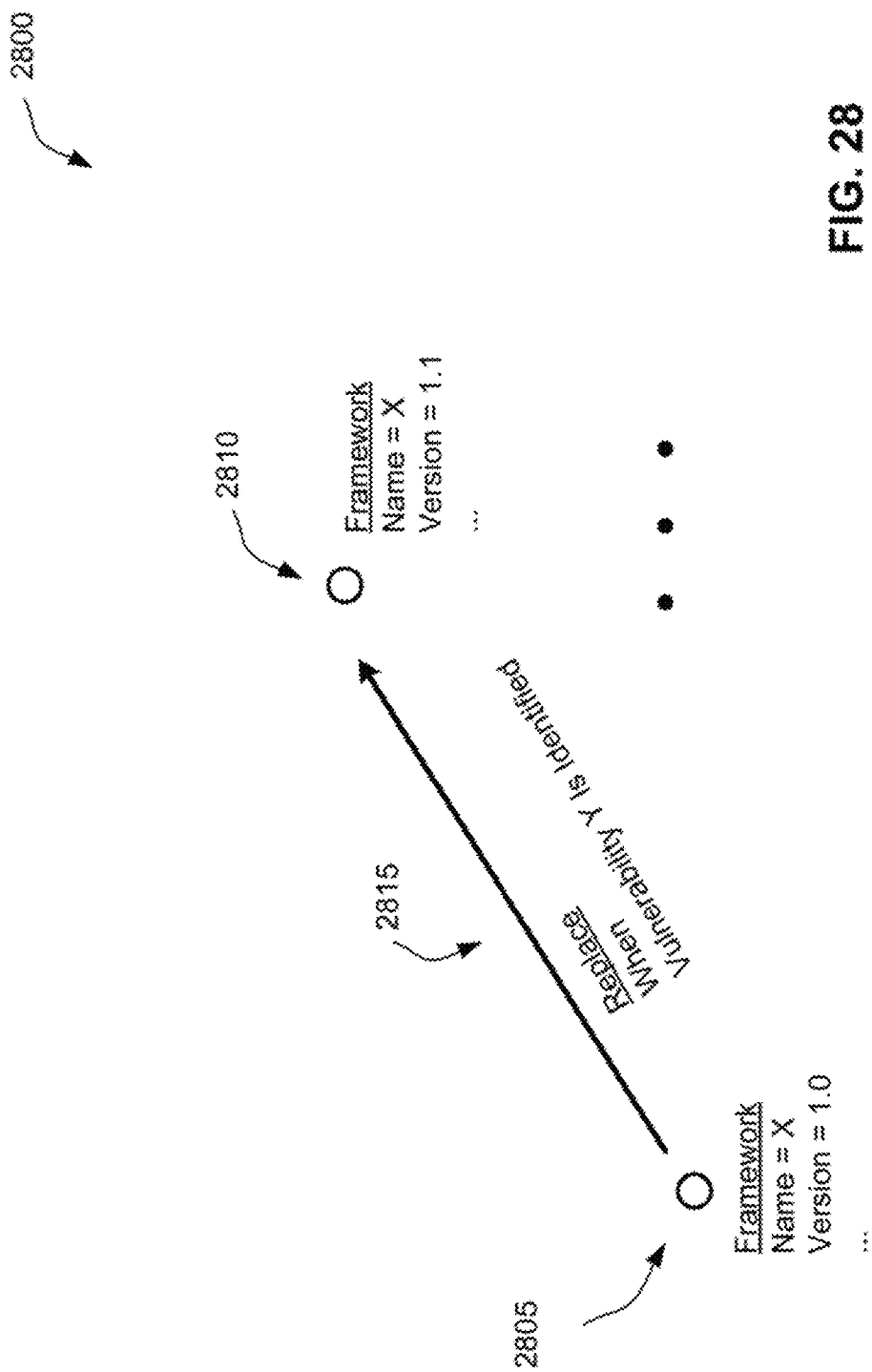
FIG. 28 shows an illustrative knowledge graph 2800, in accordance with some embodiments.

FIG. 28 shows an illustrative knowledge graph 2800, in accordance with some embodiments. In this example, the knowledge graph 2800 includes two nodes, 2805 and 2810. The node 2805 may represent a software development framework (e.g., version 1.0 of a framework X), and the node 2810 may represent another software development framework (e.g., version 1.1 of the framework X). The knowledge graph 2800 may further include an edge 2815 from the node 2805 to the node 2810. The edge 2815 may represent a "Replace" relationship. For example, the edge 2815 may indicate that if a certain pattern (e.g., a vulnerability Y) is identified, then the framework represented by the node 2805 (e.g., version 1.0 of the framework X) should be replaced by the framework represented by the node 2810 (e.g., version 1.1 of the framework X).

It should be appreciated that the knowledge graph 2800 is shown in FIG. 28 and discussed above solely for purposes of illustration, as aspects of the present disclosure are not limited to the use of any particular knowledge graph, or any knowledge graph at all.

Returning to the example of FIG. 27, the guidance engine 2705 may, in some embodiments, be programmed to submit questions to the knowledge base 2710, and the knowledge base 2710 may be programmed to provide answers to the guidance engine 2. For instance, the guidance engine 2705 may submit a query such as, "how to fix the vulnerability Y if version 1.0 of the framework X is used?" The knowledge base 2710 may return an answer such as, "update to version 1.1 of the framework X."

In some embodiments, the knowledge base 2710 may answer queries based on information stored in a knowledge graph (e.g., the illustrative knowledge graph 2800 shown in FIG. 28). For instance, the knowledge base 2710 may be programmed to match information provided in a query (e.g., version 1.0 of the framework X being used, the vulnerability Y being identified, etc.) to one or more relevant nodes (e.g., the illustrative node 2805 shown in FIG. 28) and/or one or more relevant edges (e.g., the illustrative edge 2815 shown in FIG. 28).

In some embodiments, the knowledge base 2710 may be dynamically updated. For instance, the guidance engine 2705 may be programmed to provide feedback to the knowledge base 2710, which may cause the knowledge base 2710 to add, delete, and/or modify one or more pieces of stored information. Such feedback may be generated in any suitable manner, for example, based on input received from a developer (e.g., an instruction to fix a certain vulnerability in a certain way). Alternatively, or additionally, the knowledge base 2710 may be updated by one or more experts (e.g., security experts) based on new knowledge (e.g., newly discovered vulnerabilities).

In the example of FIG. 27, the guidance engine 2705 is programmed to receive input via the information repository 2715. For instance, in some embodiments, the guidance engine 2705 and the information repository 2715 may be implemented using a blackboard architecture. For instance, the information repository 2715 may include a blackboard component for storing problems, solutions, suggestions, and/or other information, while the guidance engine 2705 may include one or more workers programmed to pull information from, and/or push information onto, the blackboard component of the information repository 2715.

In some embodiments, the information repository 2715 may include information received from one or more sources other than the guidance engine 2705. For instance, the information repository 2715 may store information received from the analysis engine 2720. Examples of such information include, but are not limited to, one or more analysis results, one or more portions of source code and/or representations thereof (e.g., an abstract syntax tree), one or more models (e.g., an application architecture model, a property model, etc.), etc.

Additionally, or alternatively, the information repository 2715 may store information from one or more user profiles 2725. Examples of such information include, but are not limited to, one or more preferences of a developer and/or contextual information associated with a software application. Any suitable contextual information may be stored, such as an indication of an industry for which the software application is developed, whether the software application handles personal financial information (e.g., credit card numbers), etc. In some embodiments, such information may be used by the guidance engine 2705 to determine whether there is a problem, and/or how to fix the problem. For instance, if the software application handles personal financial information, the guidance engine 2705 may check whether an appropriate encryption algorithm is used in compliance with relevant regulation.

Figure 29:
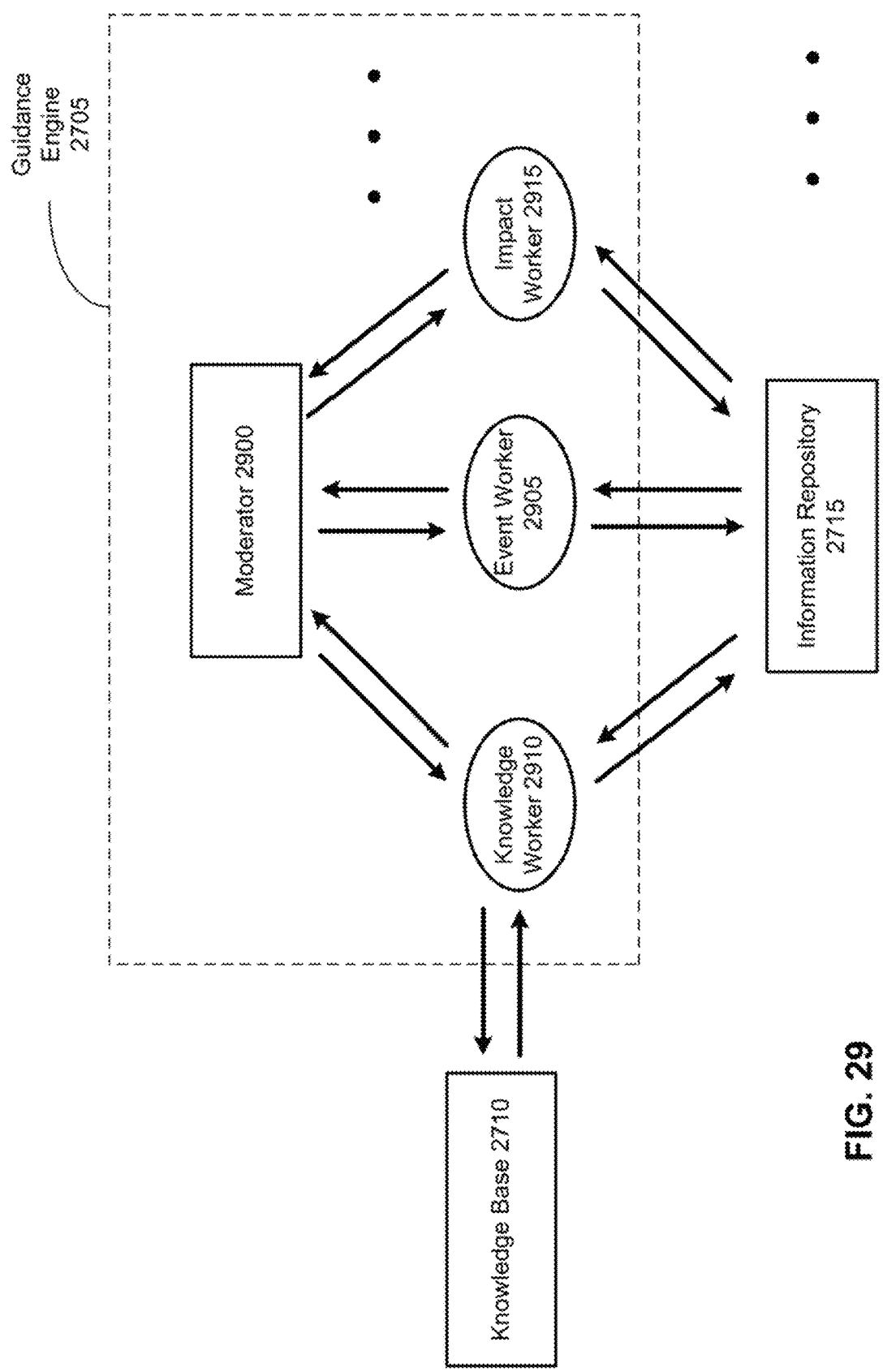
FIG. 29 shows an illustrative implementation of a guidance engine, in accordance with some embodiments.

FIG. 29 shows an illustrative implementation of the guidance engine 2705, in accordance with some embodiments. In this example, the guidance engine includes a moderator 2800 programmed to moderate activities of a plurality of workers, such as event worker 2905, knowledge worker 2910, impact worker 2915, etc. For instance, the moderator 2800 may be programmed to control when each worker accesses information from, and/or adds contributions to, the information repository 2715. In this manner, the moderator 2800 may facilitate a process by which the workers collectively solve a problem (e.g., identifying a security vulnerability and/or providing guidance to address the security vulnerability). The moderator is also configured to determine whether the result received from any expert is stale with respect to data being used by the expert to obtain that result—the moderator is capable of rejecting such stale results out of hand, in accordance with an embodiment.

In some embodiments, a worker may be programmed to handle a particular aspect of a problem. As one example, the event worker 2905 may be programmed to identify, from the information repository 2715, events that match a particular pattern. For instance, the event worker 2905 may be programmed to identify events that match a pattern indicative of a vulnerability Y. If such an event is identified, the event worker 2905 may add a new event to the information repository 2715, indicating that the vulnerability Y is identified. In some embodiments, the new event may include information regarding how the vulnerability Y manifests in a portion of source code (e.g., function declaration, variable assignment, configuration parameter value, etc. that give rise to the vulnerability).

As another example, the knowledge worker 2910 may be programmed to analyze an event from the information repository 2715 and formulate a query to be submitted to the knowledge base 2710. For instance, the knowledge worker 2910 may be programmed to analyze an event indicating that a certain vulnerability (e.g., the vulnerability Y) is identified in a certain software application. The knowledge worker 2910 may be programmed to identify a framework using which the software application is implemented (e.g., version 1.0 of a framework X), and to formulate a query based on the identified framework (e.g., "how to fix the vulnerability Y if version 1.0 of the framework X is used?"). The knowledge worker 2910 may submit the query to the knowledge base 2710 and receive an answer (e.g., "update to version 1.1 of the framework X"). The knowledge worker 2910 may then add the answer to the information repository 2715.

As another example, the impact worker 2915 may be programmed to analyze a proposed code transformation and identify potential impact and/or mitigation strategy. For instance, if the proposed code transformation includes encrypting user credentials using a new algorithm, the impact worker 2915 may determine that previously stored credentials should be decrypted and then re-encrypted using the new algorithm, or existing users may not be able to log in. The impact worker 2915 may then add the identified impact and/or mitigation strategy to the information repository 2715.

Figure 33:
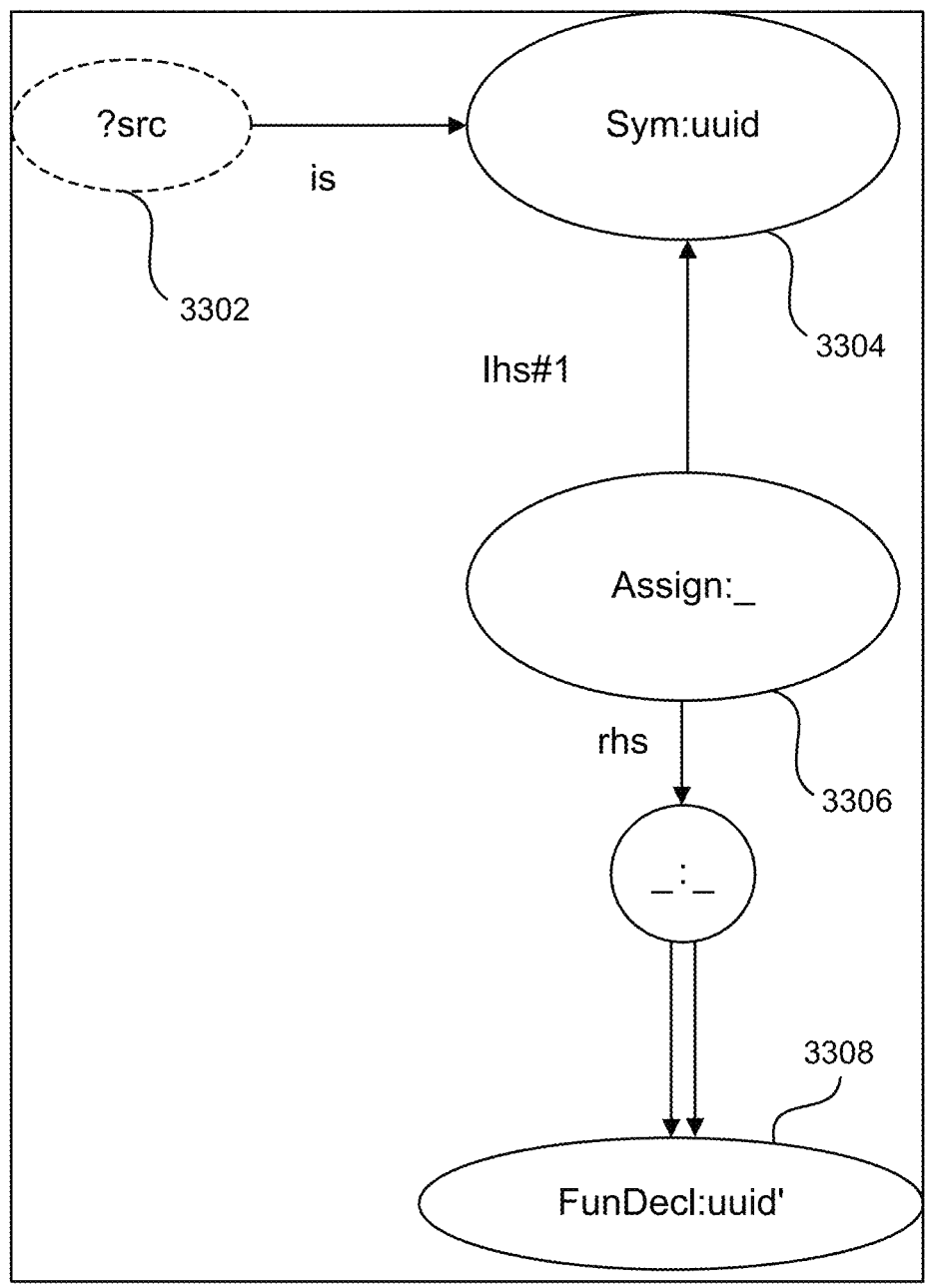
FIGS. 33-36 illustrate exemplary graph-based queries provided to and received from the guidance engine, in accordance with an embodiment.
Figure 34:
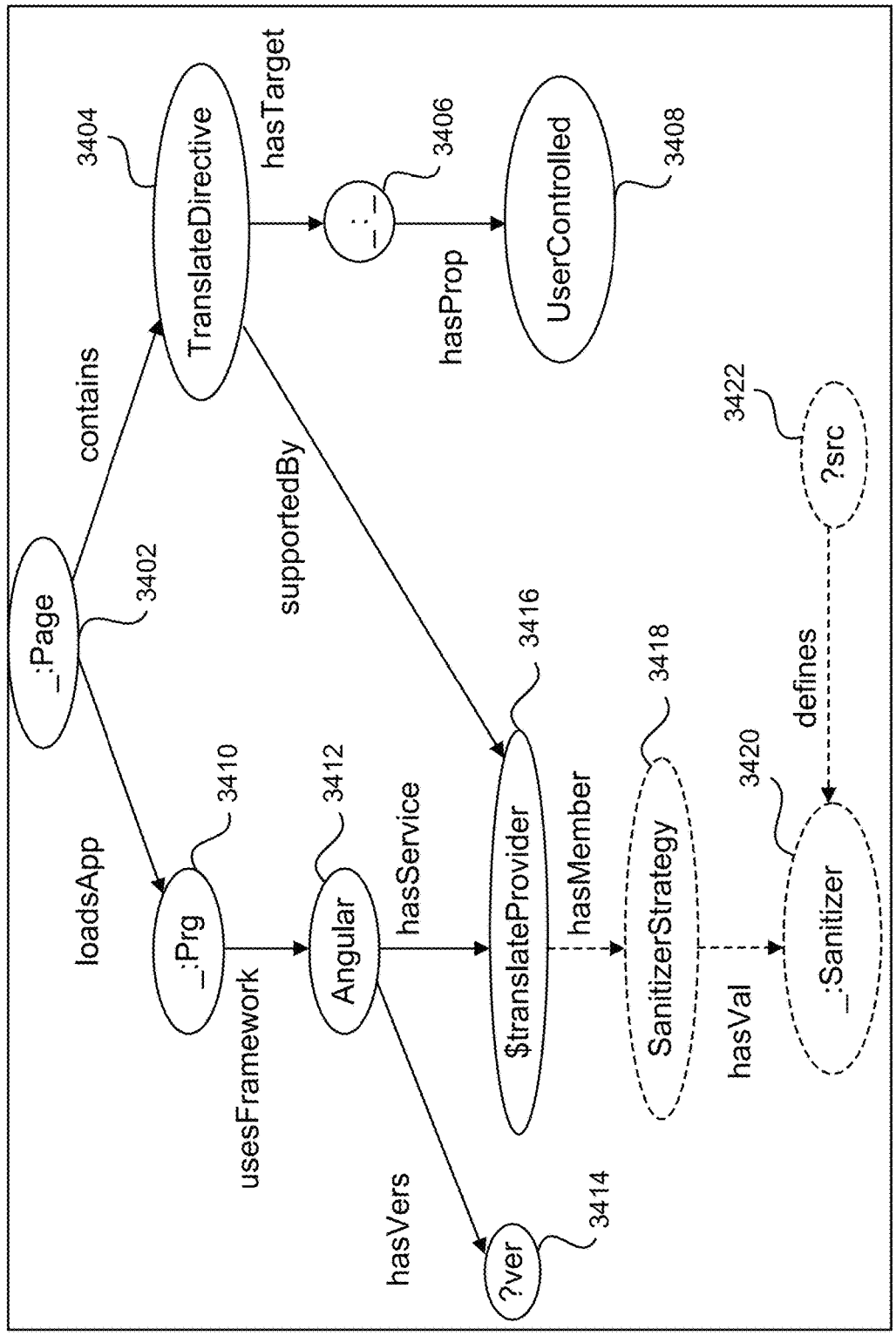
Figure 35:
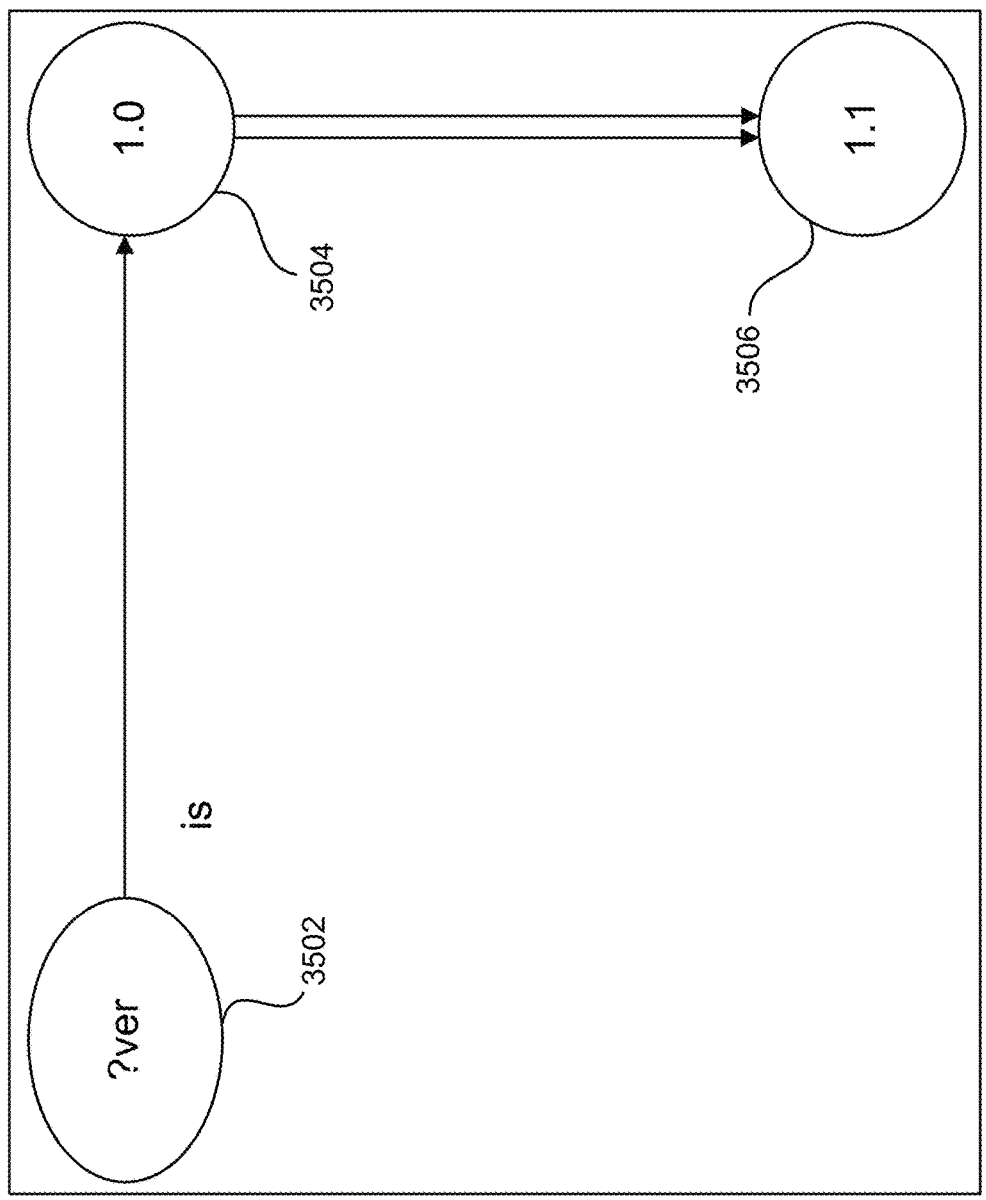
Figure 36:
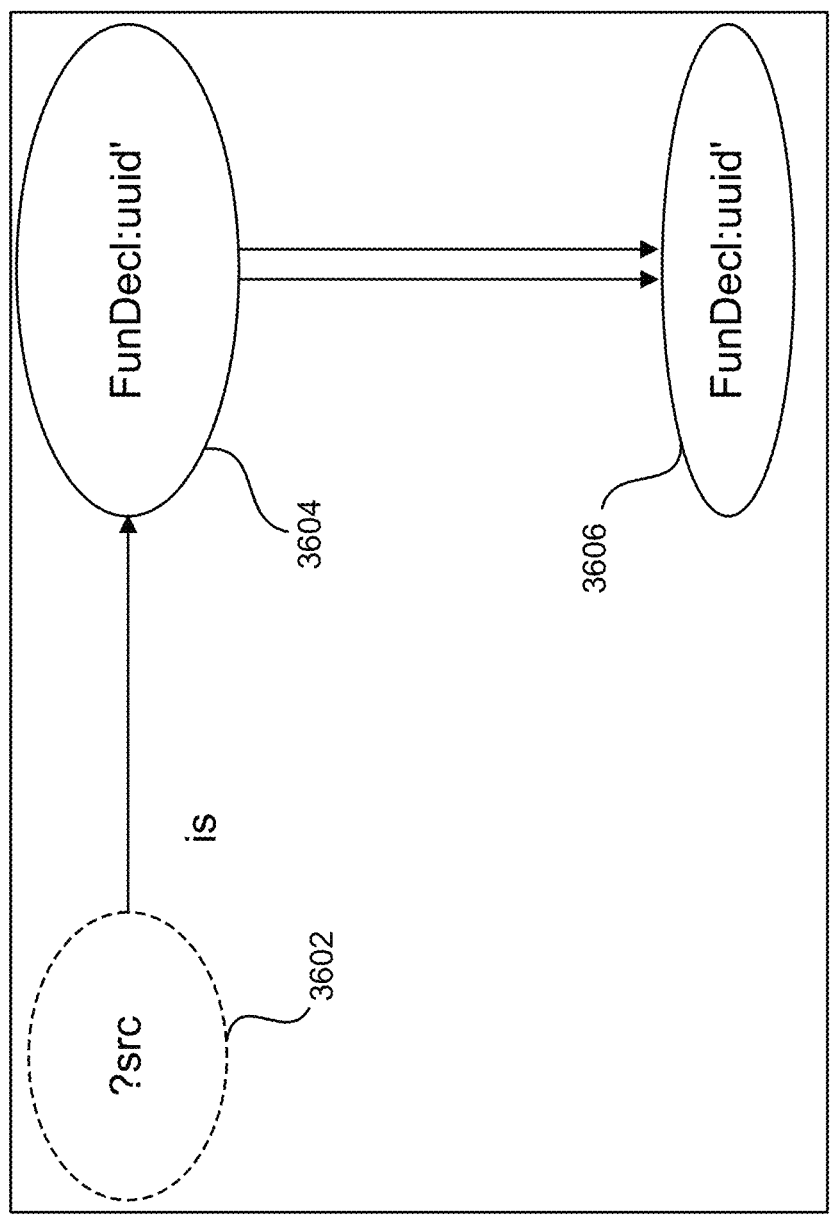

FIG. 34 shows a visual representation of an exemplary query to be submitted to knowledge base 2710 by guidance engine 2705, in accordance with an embodiment. In accordance with an embodiment, these queries are provided in accordance with SPARQL (SPARQL Protocol and RDF Query Language) language constructs, although one skilled in the art will appreciate that any language usable for querying may be substituted. The query of FIG. 34 may be submitted, as discussed above by way of non-limiting example, by a worker such as knowledge worker 2910 of FIG. 29. FIGS. 33, 35, and 36 show a visual representation of a mitigation strategy (including code transformations) responsive to the query of FIG. 34, in accordance with an embodiment. The responsive mitigation strategies of FIGS. 33, 35, and 36 are themselves presented as a SPARQL query, in accordance with an embodiment.

In accordance with an embodiment (including with SPARQL), the query is provided as a graph-based query. The query specifies a portion of a graph, including the holes that the query engine of knowledge base 2710 would need to fill in to respond to the query. One skilled in the relevant arts will appreciate that other structures may be used in order to present the queries of FIGS. 33-36, and the use of the graph-based query constructs shown therein is provided by way of non-limiting example.

In FIGS. 33-36, solid lines are used for portions of the graph that must exist in a matching result. Dotted lines are used to show elements of the query that may be matched against and returned. The nodes within the graphs represent concepts, and edges between the nodes are relationships between those concepts (e.g., application "_:Prg" 3410 in FIG. 34 has a relationship "usesFramework" with framework "Angular" 3412). In accordance with an embodiment, the relationships determine which type of worker (e.g., knowledge, event, etc.) is used in order to resolve the graph-based query. If a node's label is prefixed with an underscore "_", this means that there is imprecision about the match at that point in the graph—it is known that there is an object that maintains that space and relationship with surrounding nodes, but its specific label or name is not known. If the node's label is prefixed with a question mark "?", then not only is the name a variable, but the name is desired as part of the graph provided in response to the query. In accordance with an embodiment, edges may also follow a similar convention for variable matching in a query and for inclusion in the response graph. A solution—the desired set of transforms—to the query is shown in the graphs by way of double lined arrows.

By way of non-limiting example, the graphs may span multiple notional domains. For example, in the graph shown in FIG. 34, three separate domains are considered by the query. These include, in the exemplary embodiment of the query, the HTML domain (e.g., the _:Page, Translate directive, and loadsApp relationship, among others), the modeling domain (e.g., programs like _:Prg, using frameworks like Angular, and the services provided by the frameworks), and static analysis domains (e.g., the notions of JSON objects and members, values associated with those members, and the AST that supports that value assignment). In accordance with an embodiment, the query is able to span any number of domains, including domains relating to source code, configuration files, and expert information, in order to provide the appropriate guidance.

The exemplary structure of these queries allows ambiguity about things (e.g., edges and nodes of the graph) in a very specific way in order to be fully responsive to the query. By way of non-limiting example, a match for "_:Prg" could be found in a few locations, such as in a <script></script> block of code, or defined in a separate JavaScript file and referenced from the HTML file, by way of non-limiting example. That distinction should not matter from the perspective of either the query to detect the issue nor in the query to correct the issue, and denoting the program as matching "_:Prg" allows the query to be responsive in either instance. However, the distinction does matter at the point where the program is written back out from the data store, which represents a separate expert in accordance with an embodiment.

Compartmentalizing the identification of matching programs and how the issue is corrected in this way improves the efficiency in how new checkers or fixers are plugged into the process, enabled by the ability to span the multiple relevant domains. For example, if looking for "code that defines the sanitizer strategy provided by the Angular framework," it is beneficial for the query to encompass all implementations of the sanitizer strategy without the need to specifically enumerate a set of patterns to search for as part of the query.

FIG. 34 illustrates the interplay between additional domains of knowledge by way of an exemplary query, in accordance with an embodiment. For example, the query structure of FIG. 34, a select query, looks for any match on "_:Page" 3402, which contains a TranslateDirective 3404 and a "loadsApp" relationship with any matching program "_:Prg" 3410. In this example, the translate directive has any (wildcard) target 3406 with a property (hasProp) that is "UserControlled" 3408. The TranslateDirective 3404 must be supported by translateProvider 3416. Turning back to the matched program in "_:Prg" 3410, the match must use the Angular framework 3412, that has a version matching "?ver" 3414.

As previously discussed, because "?ver" 3414 is denoted with a question mark, this indicates a node that the query should resolve and provide to the user.

Separately, if the query resolution engine can resolve the hasMember relationship from translateProvider 3416 to a SanitizerStrategy 3418 (following from the previous relationships), it looks for such a response, and further optionally looks for a matching value "_:Sanitizer" 3420. If these matches are found, the query resolution engine obtains, if possible, and returns the matching "?src" source code 3422 that defines the matched "_:Sanitizer" 3420.

FIG. 35 illustrates a responsive guidance graph providing a version transform, in accordance with an embodiment. Following from the example of FIG. 34, the query returns a version number 3414, as part of the responsive graph, of the Angular framework 3412 used by a matching application "_:Prg" 3410. The responsive guidance graph shows that there is a relationship between the returned version number of the Angular framework, denoted by node 3502 where the version number is "1.0", as denoted by the "is" relationship with node 3504 "1.0". The guidance then indicates (denoted by the double arrows) that the version number of the framework should be transformed to version "1.1" at node 3506.

FIG. 36 illustrates an additional responsive guidance graph provided by the guidance engine, in accordance with an embodiment. Following from the example of FIG. 34, if information is available regarding source code "?src" 3422 that defines a matching sanitizer "_:Sanitizer" 3420, then it is further checked for guidance from the guidance engine (as denoted by the question mark "?" preceding "?src"). If matching source code is found in this optional step, this means that a matching sanitizer strategy has been implemented in accordance with the expected approach, such that it can be considered by the guidance engine. In FIG. 36, assuming that matching source code is found, denoted by node 3602, then the worker looks for the source code that is a function declaration "FunDecl:uuid", denoted by the "is" relationship with node 3604. If this function declaration of node 3604 is found in the source code of node 3602, then the guidance engine recommends a transform (denoted by the double arrows) to a different version of the function declaration "FunDecl:uuid'" at node 3606.

FIG. 33 illustrates another responsive guidance graph provided by the guidance engine, in accordance with an embodiment. The guidance provided by the guidance graph of FIG. 33 is similar to that of FIG. 36 in effect, and likewise follows from the example of FIG. 34 where if information is available regarding source code "?src" 3422 that defines a matching sanitizer "_:Sanitizer" 3420, then it is further checked for guidance from the guidance engine (as denoted by the question mark "?" preceding "?src"). If matching source code is found in this optional step, this means that a matching sanitizer strategy has been implemented in accordance with the expected approach, such that it can be considered by the guidance engine. In FIG. 33, assuming that matching source code is found, denoted by node 3302, then the worker looks for a symbolic relationship 3304 that is the left-hand side of an "Assign:_" 3306 assignment in the source code 3302. In the example of FIG. 33, the symbol "uuid" 3304 is a variable being assigned a value denoted by the right-hand side of the "Assign:_" 3306 assignment. The responsive guidance graph indicates that the assignment should be replaced (as indicated by the wildcard "_:_") with a new function declaration "FunDecl:uuid" 3308.

Whereas FIG. 36 describes a transform of in-line code, replacing code for FunDecl:uuid 3604 with code for FunDecl:uuid' 3606, FIG. 33 describes a transform of a similar function by replacing a reference to the function with an entirely new function 3308. These separate approaches can each be returned by the guidance engine as appropriate depending on the manner in which the code, in this case the sanitizer code, is implemented. In some circumstances, in-line code replacement is feasible, whereas in other cases a replacement of the entire source code by having a function pointer refer to the new code is the appropriate implementation.

The inventors have recognized and appreciated various advantages of a blackboard architecture. For instance, in some embodiments, guidance information stored in the information repository 2715 may be reused, so that the guidance engine 2705 may be able to respond to similar problems more quickly in the future. For example, if a certain problem is identified in a first application and a certain patch is used to fix the problem, the guidance engine 2705 may suggest a similar patch when a similar problem is identified in a second application developed for a similar type of organization.

It should be appreciated that details of implementation as shown in FIGS. 27-29 and 33-36 and described above solely for purposes of illustration, as aspects of the present disclosure are not limited to any particular manner of implementation. For instance, aspects of the present disclosure are not limited to the use of a blackboard architecture. In some embodiments, a guidance engine may receive inputs directly from various sources such as an analysis engine. Furthermore, aspects of the present disclosure are not limited to the particular examples of workers shown in FIG. 29. Any suitable worker may be used to provide any suitable expertise. In some embodiments, one or more workers may be different instances of a same software agent. Additionally, or alternatively, one or more workers may be implemented using a microservice architecture. Such a worker may itself include a plurality of workers with different expertise.

In some embodiments, a guidance engine may use an aspect-oriented programming (AOP) language to specify when to render a piece of advice to a developer. For instance, a point cut expression may be written using the AOP language to specify a plurality of join points, where each join point may correspond to a respective pattern. The guidance engine may be programmed to execute such a point cut expression and deliver the piece of advice to the developer when all of the patterns are matched.

Figure 30:
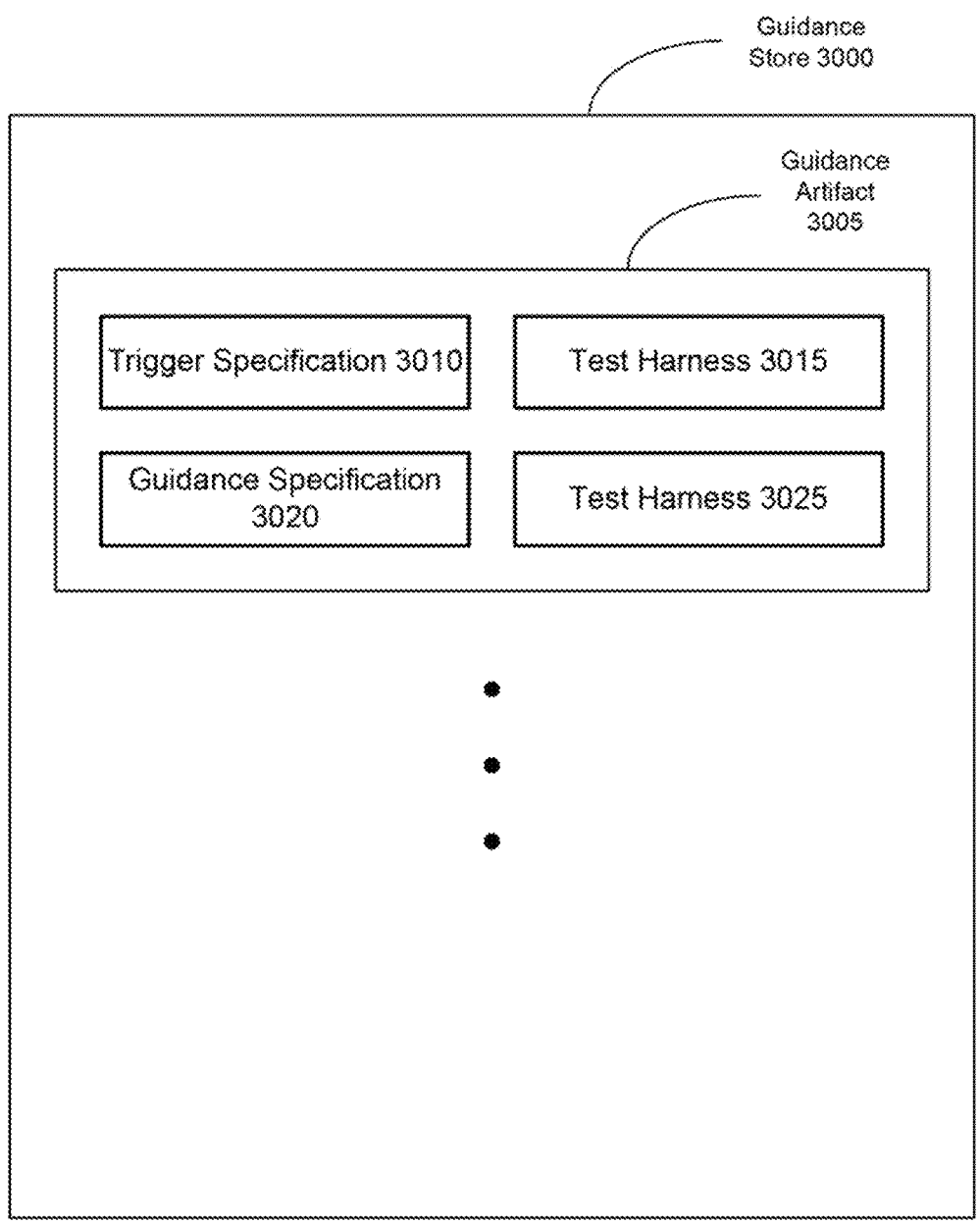
FIG. 30 shows an illustrative guidance store 3000 for storing guidance information, in accordance with some embodiments.

FIG. 30 shows an illustrative guidance store 3000 for storing guidance information, in accordance with some embodiments. In some embodiments, a guidance engine (e.g., the illustrative guidance engine 2705 shown in FIG. 27) may access the guidance store 300 to determine what guidance to render to a developer and/or how such guidance is to be rendered. Additionally, or alternatively, an analysis engine (e.g., the illustrative analysis engine 2720 shown in FIG. 27) may access the guidance store 300 to retrieve one or more queries to be run on a software application. In some embodiments, the guidance store 3000 may be used in addition to, or instead of, a knowledge base such as the illustrative knowledge base 2710 shown in FIG. 27.

In the example shown in FIG. 30, the guidance store 3000 includes one or more guidance artifacts, where a guidance artifact may include a trigger specification and/or a corresponding guidance specification. For instance, in the example shown in FIG. 30, a guidance artifact 3005 includes a trigger specification 3010 and a guidance specification 3020. In some embodiments, the trigger specification 3010 may include one or more pieces of software code that, when executed by an analysis engine (e.g., the illustrative analysis engine 2720 shown in FIG. 27), cause the analysis engine to look for a particular problem in a software application. The trigger specification 3010 may be written in any suitable language, such as JavaScript and/or a query language having one or more of the illustrative constructs shown in FIG. 8 and described above.

In some embodiments, the guidance specification 3020 may include one or more pieces of software code that, when executed by a guidance engine (e.g., the illustrative guidance engine 2705 shown in FIG. 27), cause the guidance engine to provide guidance to a developer. For example, in response to a problem identified by executing the trigger specification 3010, the guidance engine may be programmed to execute the guidance specification 3020 and provide guidance on how to fix the problem.

In some embodiments, the guidance artifact 3005 may include a test harness 3015 for testing the trigger specification 3010 and a test harness 3025 for the guidance specification 3020. The test harness 3015 may include any suitable software code and/or test data for testing the trigger specification 3010. Similarly, the test harness 3025 may include any suitable software code and/or test data for testing the guidance specification 3020. However, it should be appreciated that aspects of the present disclosure are not limited to the use of a test harness for a trigger specification, nor to the use of a test harness for a guidance specification.

It should be appreciated that the guidance artifact 3005 is shown in FIG. 30 and described above solely for purposes of illustration, as aspects of the present disclosure are not limited to the use of any particular type of guidance artifact, or any guidance artifact at all. For instance, in some embodiments, a guidance artifact may include only a trigger specification, without a guidance specification. A finding identified upon executing the trigger specification may be recorded (e.g., on a blackboard component) as an observation of interest. A guidance engine may render guidance as more information is collected that confirms existence of a problem, or may ultimately determine that the finding does not indicate a problem after all.

Figure 31:
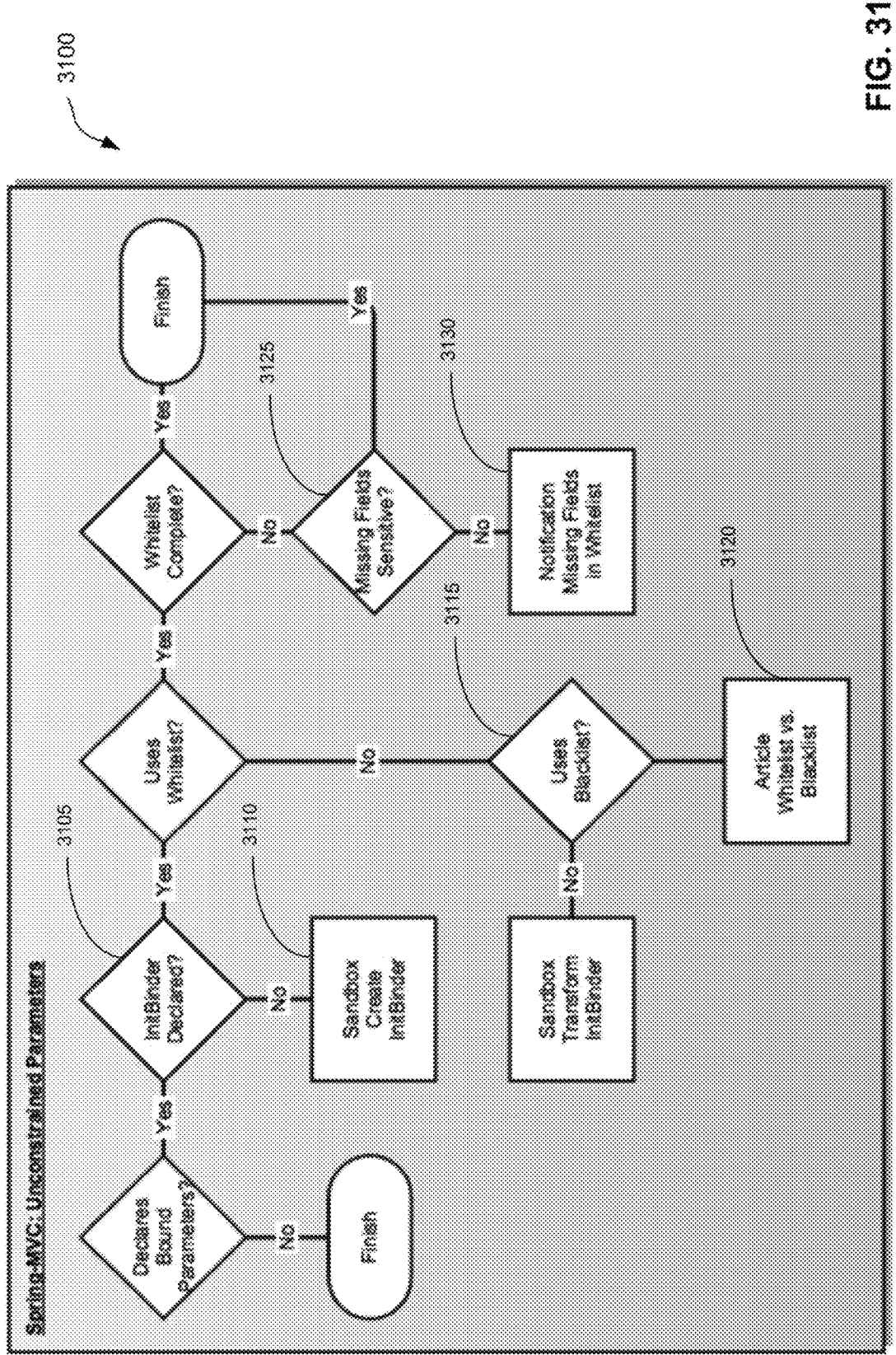
FIG. 31 shows an illustrative decision tree 3100 that may be used by a guidance engine to determine what guidance to render to a developer and/or how such guidance is to be rendered, in accordance with some embodiments.

FIG. 31 shows an illustrative decision tree 3100 that may be used by a guidance engine to determine what guidance to render to a developer and/or how such guidance is to be rendered, in accordance with some embodiments. For instance, the decision tree 3100 may represent program logic implemented by the illustrative guidance specification 3020 shown in FIG. 30.

In the example shown in FIG. 31, the decision tree 3100 includes a plurality of decision nodes, such as nodes 3105, 3115, and 3125, and a plurality of action nodes, such as nodes 3110, 3120, and 3130. At each decision node, a guidance engine (e.g., the illustrative guidance engine 2705 shown in FIG. 27) may be programmed to evaluate one or more conditions. As one example, at the decision node 3105, the guidance engine may determine if a parameter InitBinder is declared. If the parameter InitBinder is declared, the guidance engine may proceed to a next decision node. Otherwise, the guidance engine may proceed to the action node 3010 to set up a sandbox for testing a Create function of the parameter InitBinder.

As another example, at the decision node 3115, the guidance engine may determine if a blacklist is used. If a blacklist is used, the guidance engine may proceed to the action node 3120 to recommend that the developer read an article on the use of whitelists vs. blacklists (e.g., by presenting a link to the article). If a blacklist is not used, the guidance engine may proceed to a different action node.

As another example, at the decision node 3125, the guidance engine may determine if one or more missing fields in a whitelist are sensitive. If no sensitive field is missing from the whitelist, the guidance engine may proceed to the action node 3130 to notify the developer of the one or more missing fields. If at least one missing field is sensitive, the guidance engine may not render any guidance.

In some embodiments, the guidance engine may be programmed to analyze source code of a software application to evaluate a condition at a decision node. For instance, a trigger specification (e.g., the illustrative trigger specification 3010 shown in FIG. 30) may cause an analysis engine to store a relevant portion of source code in a shared repository (e.g., the illustrative information repository 2715 shown in FIG. 27). The guidance engine may then retrieve the code from the shared repository and evaluate the condition based on the retrieved code. Additionally, or alternatively, the analysis engine may share one or more analysis results, and the guidance engine may evaluate the condition based on the one or more analysis results.

It should be appreciated that the decision tree 3100 is shown in FIG. 31 and described above solely for purposes of illustration, as aspects of the present disclosure are not limited to the use of any particular decision tree, or any decision tree at all. For instance, aspects of the present disclosure are not limited to traversing a single path through a decision tree to reach a single piece of guidance. In some embodiments, a single trigger may cause multiple pieces of guidance to be rendered in different modalities.

The inventors have recognized and appreciated that it may be beneficial to determine an appropriate timing for presenting guidance relating to a certain problem. If the guidance is presented to a developer too early, the developer may ignore the guidance because the developer may have more urgent issues to address. On the other hand, if the guidance is presented too late, an impact footprint of the problem may have grown, and more effort may be needed to correct the problem. Accordingly, in some embodiments, techniques are provided for measuring how important and/or urgent a problem is. Such a measurement may be used by a guidance engine to determine when to present what guidance and/or how to present such guidance.

In some embodiments, a priority measurement for a certain vulnerability may be based on a severity measurement for the vulnerability. In turn, the severity measurement may be based on two measurements: a potential impact of an exploitation of the vulnerability, and a likelihood of the vulnerability actually being exploited. These measurements may be determined in any suitable manner. In some embodiments, an impact measurement may be based on one or more of the following:

Confidentiality
This measurement may indicate an extent to which a successful exploitation of the vulnerability may impact user confidentiality. For instance, a measurement of 0 may indicate that no confidential information may be exposed, a measurement of 5 may indicate that some user information (e.g., names, email addresses, phone numbers, etc.) may be exposed, and a measurement of 10 may indicate that critical Personally Identifiable Information (PII) may be exposed (e.g., social security numbers, employee identifiers, passwords, etc.).

Integrity
This measurement may indicate an extent to which a successful exploitation of the vulnerability may impact data integrity. For instance, a measurement of 0 may indicate that any exposure may be limited to read-only data, a measurement of 5 may indicate that some data may be changed but a scope of impact may not be critical, and a measurement of 10 may indicate all data may be compromised.

Availability
This measurement may indicate an extent to which a successful exploitation of the vulnerability may impact availability. For instance, a measurement of 0 may indicate no impact on services, a measurement of 5 may indicate that some non-critical services may become unavailable, and a measurement of 10 may indicate unrecoverable downtime of all services.

In some embodiments, a likelihood measurement may be based on one or more of the following:

Accessibility
This measurement may indicate how easily the vulnerability may be exploited. For instance, a measurement of 0 may indicate that the vulnerability may be difficult to exploit due to constraints such as physical location (e.g., a USB drive must be physically plugged into a server in a secured datacenter), a measurement of 5 may indicate an attacker may need to overcome some constraints to exploit the vulnerability (e.g., via phishing emails, click-jacking attacks, etc.), and a measurement of 10 may indicate that few or no constraints may be in place to prevent an exploitation (e.g., via drive-by downloads, cross-site scripting, etc.).

Complexity
  This measurement may indicate how complex a successful exploitation may be. For instance, a measurement of 0 may indicate that little or no skill or knowledge of an application may be required to successfully exploit the vulnerability (e.g., using fully automated tools, script-kiddies, etc.), a measurement of 5 may indicate that some level of skill and/or knowledge of the application, framework, and/or environment may be needed (e.g., using some tools, custom scripts, social engineering, etc.), and a measurement of 10 may indicate that full understanding of the application, framework, and environment, and a high level of skill may be needed (e.g., no automated exploitation or discovery tools, many custom scripts, in-person social engineering, physical compromise, etc.).
Authentication
  This measurement may indicate a level of authentication needed for a successful exploitation. For instance, a measurement of 0 may indicate an attacker may need to be authenticated as a system or administrative user and may only exploit the vulnerability against other system or administrative level users, a measurement of 0 may indicate an attacker may need to be an authenticated user and may exploit the vulnerability against any other authenticated user, and a measurement of 10 may indicate that the vulnerability may be exploited anonymously against any user.

In some embodiments, a priority measurement for a certain vulnerability may be based on a measurement of developer priority, in addition to, or instead of, severity. A developer priority measurement may be based on one or more of the following:

Functionality
  This measurement may indicate how much impact a bug fix may have on one or more functionalities of an application. For instance, storing passwords in the clear may be insecure, and a potential fix may be to replace the passwords with corresponding cryptographic hashes. This fix may prevent existing users from logging in, unless a corresponding change is made to a login function to compute an appropriate cryptographic hash of a password entered by the user.

Complexity
  This measurement may indicate how much complexity may be involved in implementing a bug fix. This may include technical and/or business complexities. For instance, to implement a new password storage policy, a developer may need to consult with a system architect, a database administrator, a product manager, a business development person, and/or senior management. Additionally, or alternatively, the developer may need to write code to check if a user's password has been changed since the new storage policy was rolled out and, if not, force the user to reset the password.
Stability
  This measurement may indicate how much impact a bug fix may have on performance of an application or one or more parts of the application. For instance, hashing a password may add hundreds of milliseconds at each login. Such degradation may not be significant for most applications. However, some applications (e.g., electronic trading) may be extremely time sensitive, so that losing hundreds of milliseconds per authentication may be unacceptable.
Testability
  This measurement may indicate how easily a solution intended to fix a bug may be tested to determine if the solution actually fixes the bug. For instance, a solution may be adopted more easily if an automated test is available.

Accordingly, in some embodiments, a priority measurement may be calculated as follows, where average may be any suitable function for combining multiple measurements.

```
function priority(confidentiality, integrity, availability, accessibility, complexity_0,
authentication, functionality, complexity_0, stability, testability) {
    var impact = average (confidentiality, integrity, availability);
    var likelihood = average(accessibility, complexity_0, authentication);
    var friction = average (functionality, complexity_1, stability, testability);
    return average (impact, likelihood, friction)
}
```

It should be appreciated that the above definition of priority is provided solely for purposes of illustration, as a priority measure may be calculated in any suitable manner. For instance, priority, impact, likelihood, and friction need not be calculated using the same average function. Moreover, any suitable combination of one or more parameters may be used to calculate any of these measures, in addition to, or instead of, the illustrative parameters used in the above definition of priori In some embodiments, one or more weighted average functions may be used to combine measurements. For instance, a weighted priority measurement may be calculated as follows.

```
function priority(confidentiality, integrity, availability, accessibility, complexity_0,
authentication, functionality, complexity_0, stability, testability) {
    var impact = average (confidentiality, integrity, availability);
    var likelihood = average(accessibility, complexity_0, authentication);
    var friction = average (functionality, complexity_1, stability, testability);
    return weighted_priority(impact, likelihood, friction)
}
function weighted_priority(impact, likelihood, friction, guidance_weighted=0,
business_weighted=0, develoer_weighted=0) {
```

-continued

```
    guidance_weighted = guidance.weight(impact, likelihood, friction,
    guidance_weighted, business_weighted, developer_weighted);
    business_weighted = orgprofile.weight(impact, likelihood, friction,
    guidance_weighted, business_weighted, developer_weighted);
    developer_weighted = userprofile.weight(impact, likelihood, friction,
    guidance_weighted, business_weighted, developer_weighted);
    return weighted_priority(impact, likelihood, friction, guidance_weighted,
    business_weighted, developer_weighted);
}
```

In some embodiments, a guidance engine may be programmed to apply suitable weightings to the measurements impact, likelihood, and friction, for example, via the function guidance.weight in the illustrative definition weighted_priority above.

Additionally, or alternatively, weightings may be applied to the measurements impact, likelihood, and friction, via the function orgprofile.weight in the illustrative definition weighted_priority above. Such weightings may reflect how an organization for which the application is developed may evaluate these measurements.

Additionally, or alternatively, weightings may be applied to the measurements impact, likelihood, and friction, via the function userprofile.weight in the illustrative definition weighted_priority above. Such weightings may reflect how a developer working on the application may evaluate these measurements. For instance, the weightings may reflect the developer's understanding of friction, secure coding guidance customized for the developer, and/or the developer's reputation.

Additionally, or alternatively, further weightings may be applied to the measurements impact, likelihood, and friction, via a recursive call to the function weighted_priority. Such a recursive call may capture any additional information that may have become relevant since a previous round of calculation. Any suitable exit criterion may be used for the recursion. For instance, the recursion may stop when there is no more relevant information to be captured.

It should be appreciated that weightings may be determined in any suitable manner. In some embodiments, one or more weights may be determined based on an application lifecycle stage. For example, security may becoming increasing important as an application progresses through experimentation, proof of concept, alpha, beta, and general availability, and increasing weights may be applied to these stages (e.g., 0, 1, 3, 5, and 10, respectively).

Additionally, or alternatively, one or more weights may be determined based on one or more environmental conditions. For instance, one or more weights may be determined based on presence of one or more transparent environmental controls such as load balancer, identity providers, etc.

Figure 32:
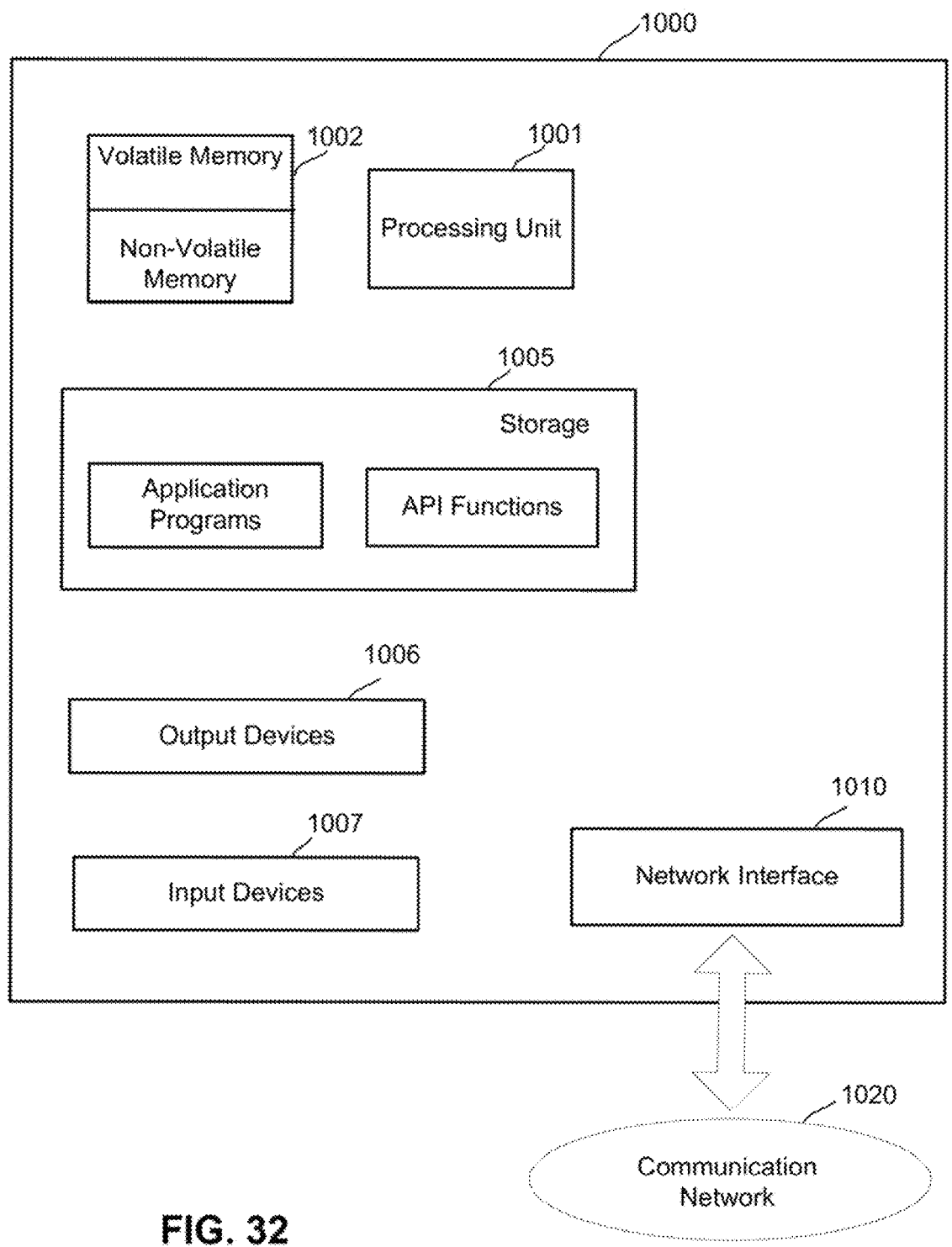
FIG. 32 shows, schematically, an illustrative computer 1000 on which any aspect of the present disclosure may be implemented.

FIG. 32 shows, schematically, an illustrative computer 1000 on which any aspect of the present disclosure may be implemented. In the embodiment shown in FIG. 32, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or external components used by application programs (e.g., software libraries), which may be loaded into the memory 1002.

The computer 1000 may have one or more input devices and/or output devices, such as devices 1006 and 1007 illustrated in FIG. 32. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 32, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method, comprising:
   receiving, by at least one computer processor, a graph-based query that specifies a portion of a graph for analysis and that is based on a relationship of a plurality of properties of a software application;
   responsive to receiving the graph-based query:
      programming, by the at least one computer processor, a first thread to analyze a first aspect of an identified problem in the software application via a first path traversal with respect to the graph, based at least in part on the portion of the graph specified in the graph-based query;
      programming, by the at least one computer processor, a second thread to analyze a second aspect of the identified problem in the software application via a second path traversal with respect to the graph, based at least in part on the portion of the graph specified in the graph-based query; and
      moderating, by the at least one computer processor, access to an information repository by the first thread and the second thread, wherein the moderating comprises updating the information repository and, based on at least one result from the first thread or the second thread, rejecting stale information retrieved by the first thread or the second thread from the information repository; and
   sending, by the at least one computer processor, a response to the graph-based query based on the moderating.

2. The method of claim 1, wherein the response comprises a transform with respect to a given property of the plurality of properties of the software application.

3. The method of claim 2, wherein the transform comprises an in-line replacement of source code of the software application or a replacement of a function of the software application by reference to a new function.

4. The method of claim 1, wherein the plurality of properties of the software application comprises an optional property in the graph-based query based on a determination that an optional relationship to the optional property is present within the software application.

5. The method of claim 1, wherein the graph-based query comprises a relationship between a given property of the plurality of properties of the software application and an additional property of the plurality of properties of the software application, wherein the given property of the plurality of properties of the software application is located in a first notional domain, and wherein the additional property of the plurality of properties of the software application is located in a second notional domain.

6. The method of claim 1, further comprising:
   analyzing an event indicative of a vulnerability from the information repository; and
   selecting a given property of the plurality of properties of the software application based on the vulnerability.

7. The method of claim 1, further comprising:
   updating the information repository based on the response to the graph-based query.

8. A system, comprising:
a memory coupled to at least one computer processor and configured to perform operations comprising:
receiving a graph-based query that specifies a portion of a graph for analysis and that is based on a relationship of a plurality of properties of a software application;
responsive to receiving the graph-based query:
programming a first thread to analyze a first aspect of an identified problem in the software application via a first path traversal with respect to the graph, based at least in part on the portion of the graph specified in the graph-based query;
programming a second thread to analyze a second aspect of the identified problem in the software application via a second path traversal with respect to the graph, based at least in part on the portion of the graph specified in the graph-based query; and
moderating access to an information repository by the first thread and the second thread, wherein the moderating comprises updating the information repository and, based on at least one result from the first thread or the second thread, rejecting stale information retrieved by the first thread or the second thread from the information repository; and
sending a response to the graph-based query based on the moderating.

9. The system of claim 8, wherein the response comprises a transform with respect to a given property of the plurality of properties of the software application.

10. The system of claim 9, wherein the transform comprises an in-line replacement of source code of the software application or a replacement of a function of the software application by reference to a new function.

11. The system of claim 8, wherein the plurality of properties of the software application comprises an optional property in the graph-based query based on a determination that an optional relationship to the optional property is present within the software application.

12. The system of claim 8, wherein the graph-based query comprises a relationship between a given property of the plurality of properties of the software application and an additional property of the plurality of properties of the software application, wherein the given property of the plurality of properties of the software application is located in a first notional domain, and wherein the additional property of the plurality of properties of the software application is located in a second notional domain.

13. The system of claim 8, the operations further comprising:
analyzing an event indicative of a vulnerability from the information repository; and
selecting a given property of the plurality of properties of the software application based on the vulnerability.

14. The system of claim 8, the operations further comprising:
updating the information repository based on the response to the graph-based query.

15. A non-transitory computer-readable storage device having instructions stored thereon that, when executed by at least one computing device, cause the at least one computing device to perform operations comprising:
receiving a graph-based query that specifies a portion of a graph for analysis and that is based on a relationship of a plurality of properties of a software application;
responsive to receiving the graph-based query:
programming a first thread to analyze a first aspect of an identified problem in the software application via a first path traversal with respect to the graph, based at least in part on the portion of the graph specified in the graph-based query;
programming a second thread to analyze a second aspect of the identified problem in the software application via a second path traversal with respect to the graph, based at least in part on the portion of the graph specified in the graph-based query; and
moderating access to an information repository by the first thread and the second thread, wherein the moderating comprises updating the information repository and, based on at least one result from the first thread or the second thread, rejecting stale information retrieved by the first thread or the second thread from the information repository; and
sending a response to the graph-based query based on the moderating.

16. The non-transitory computer-readable storage device of claim 15, wherein the response comprises a transform with respect to a given property of the plurality of properties of the software application.

17. The non-transitory computer-readable storage device of claim 16, wherein the transform comprises an in-line replacement of source code of the software application or a replacement of a function of the software application by reference to a new function.

18. The non-transitory computer-readable storage device of claim 15, wherein the plurality of properties of the software application comprises an optional property in the graph-based query based on a determination that an optional relationship to the optional property is present within the software application.

19. The non-transitory computer-readable storage device of claim 15, wherein the graph-based query comprises a relationship between a given property of the plurality of properties of the software application and an additional property of the plurality of properties of the software application, wherein the given property of the plurality of properties of the software application is located in a first notional domain, and wherein the additional property of the plurality of properties of the software application is located in a second notional domain.

20. The non-transitory computer-readable storage device of claim 15, the operations further comprising:
analyzing an event indicative of a vulnerability from the information repository; and
selecting a given property of the plurality of properties of the software application based on the vulnerability.

* * * * *